(12) United States Patent
Witkowski et al.

(10) Patent No.: US 8,868,544 B2
(45) Date of Patent: Oct. 21, 2014

(54) USING RELATIONAL STRUCTURES TO CREATE AND SUPPORT A CUBE WITHIN A RELATIONAL DATABASE SYSTEM

(75) Inventors: Andrew Witkowski, Foster City, CA (US); Gregory Dorman, New York, NY (US); David Greenfield, Waltham, MA (US)

(73) Assignee: Oracle International Corporation, Redwood Shores, CA (US)

( * ) Notice: Subject to any disclaimer, the term of this patent is extended or adjusted under 35 U.S.C. 154(b) by 1242 days.

(21) Appl. No.: 10/423,356

(22) Filed: Apr. 25, 2003

(65) Prior Publication Data

US 2004/0034616 A1 Feb. 19, 2004

Related U.S. Application Data

(60) Provisional application No. 60/375,726, filed on Apr. 26, 2002, provisional application No. 60/379,870, filed on May 10, 2002.

(51) Int. Cl.
G06F 17/30 (2006.01)
G06F 17/00 (2006.01)

(52) U.S. Cl.
CPC .............................. *G06F 17/30592* (2013.01)
USPC ........................................................ 707/713

(58) Field of Classification Search
USPC .......... 707/2, 3, 5, 100, 102, 103 R; 365/200; 705/26, 36 R
See application file for complete search history.

(56) References Cited

U.S. PATENT DOCUMENTS

| | | | |
|---|---|---|---|
| 5,367,675 A * | 11/1994 | Cheng et al. ........................... 1/1 |
| 5,799,300 A * | 8/1998 | Agrawal et al. .................... 707/5 |
| 5,871,019 A | 2/1999 | Belohlavek |
| 5,918,232 A * | 6/1999 | Pouschine et al. ........ 707/103 R |
| 5,926,818 A | 7/1999 | Malloy |
| 5,937,408 A | 8/1999 | Shoup et al. |
| 5,943,668 A | 8/1999 | Malloy et al. |
| 5,943,677 A | 8/1999 | Hicks |
| 5,987,467 A * | 11/1999 | Ross et al. ..................... 707/100 |
| 6,119,103 A | 9/2000 | Basch et al. |
| 6,163,774 A * | 12/2000 | Lore et al. ................... 705/36 R |
| 6,185,572 B1 | 2/2001 | Blackman et al. |

(Continued)

OTHER PUBLICATIONS

Ramsak, et al. "Interactive ROLAP on large datasets: a case study with UB-trees", Jul. 16-18, 2001, Database Engineering & Applications, 2001 International Symposium on. p. 167-176.*

(Continued)

*Primary Examiner* — Christyann Pulliam
*Assistant Examiner* — Charles Adams
(74) *Attorney, Agent, or Firm* — Hickman Palermo Truong Becker Bingham Wong LLP

(57) ABSTRACT

A method and mechanism for performing an operation based on multidimensional data in a relational database. A first query is submitted to a relational database engine of the relational database management system, thereby causing a relational cube to be generated. The first query includes instructions to select a portion of multidimensional data for inclusion in the relational cube. The first query includes instructions to group the selected portion of multidimensional data using at least two or more levels of granularity of at least one dimension. The first query also includes instructions to generate a materialized view. Based on a received request for an operation, a second query is submitted to the relational database engine for execution against the relational cube, thereby causing the operation to be performed.

15 Claims, 20 Drawing Sheets

(56) References Cited

U.S. PATENT DOCUMENTS

| | | | |
|---|---|---|---|
| 6,205,447 B1* | 3/2001 | Malloy .................. | 707/102 |
| 6,285,994 B1 | 9/2001 | Bui et al. | |
| 6,381,596 B1 | 4/2002 | Bayer | |
| 6,385,301 B1 | 5/2002 | Nolting et al. | |
| 6,385,604 B1* | 5/2002 | Bakalash et al. ............. | 707/3 |
| 6,421,665 B1 | 7/2002 | Brye et al. | |
| 6,438,537 B1 | 8/2002 | Netz et al. | |
| 6,480,848 B1 | 11/2002 | DeKimpe et al. | |
| 6,493,699 B2 | 12/2002 | Colby et al. | |
| 6,513,029 B1* | 1/2003 | Agrawal et al. ................ | 707/2 |
| 6,546,402 B1* | 4/2003 | Beyer et al. .................. | 707/201 |
| 6,553,366 B1 | 4/2003 | Miller et al. | |
| 6,560,594 B2* | 5/2003 | Cochrane et al. ............... | 707/2 |
| 6,601,062 B1 | 7/2003 | Deshpande et al. | |
| 6,609,123 B1 | 8/2003 | Cazemier et al. | |
| 6,609,132 B1 | 8/2003 | White et al. | |
| 6,615,203 B1* | 9/2003 | Lin et al. .................. | 1/1 |
| 6,629,102 B1 | 9/2003 | Malloy et al. | |
| 6,665,682 B1 | 12/2003 | DeKimpe et al. | |
| 6,684,206 B2 | 1/2004 | Chen et al. | |
| 6,691,301 B2 | 2/2004 | Bowen | |
| 6,704,721 B1 | 3/2004 | Hellerstein | |
| 6,711,575 B1 | 3/2004 | Applewhite et al. | |
| 6,721,760 B1 | 4/2004 | Ono et al. | |
| 6,826,556 B1 | 11/2004 | Miller et al. | |
| 6,931,418 B1 | 8/2005 | Barnes | |
| 6,941,310 B2 | 9/2005 | Ahad et al. | |
| 6,980,980 B1* | 12/2005 | Yeh .................. | 707/2 |
| 7,020,647 B1* | 3/2006 | Egan et al. ................ | 707/2 |
| 7,028,046 B2* | 4/2006 | Anjur et al. ............... | 707/102 |
| 7,117,271 B2 | 10/2006 | Haverstock et al. | |
| 7,152,073 B2 | 12/2006 | Gudbjartsson et al. | |
| 7,194,465 B1 | 3/2007 | MacGregor | |
| 2001/0049685 A1* | 12/2001 | Carey et al. ............... | 707/103 R |
| 2001/0054034 A1 | 12/2001 | Arning et al. | |
| 2002/0059195 A1 | 5/2002 | Cras et al. | |
| 2002/0087516 A1 | 7/2002 | Cras et al. | |
| 2002/0091681 A1 | 7/2002 | Cras et al. | |
| 2002/0091707 A1 | 7/2002 | Keller | |
| 2002/0103807 A1 | 8/2002 | Yamashita | |
| 2002/0126545 A1* | 9/2002 | Warren et al. .............. | 365/200 |
| 2002/0138353 A1* | 9/2002 | Schreiber et al. ............. | 705/26 |
| 2002/0168621 A1 | 11/2002 | Cook et al. | |
| 2002/0184187 A1 | 12/2002 | Bakalash et al. | |
| 2002/0188507 A1 | 12/2002 | Busche | |
| 2002/0188598 A1* | 12/2002 | Myllymaki .................. | 707/2 |
| 2003/0014417 A1 | 1/2003 | Kelkar | |
| 2003/0084053 A1 | 5/2003 | Govrin et al. | |
| 2003/0088540 A1 | 5/2003 | Edmunds et al. | |
| 2003/0093424 A1 | 5/2003 | Chun et al. | |
| 2003/0101202 A1 | 5/2003 | Kelkar et al. | |
| 2003/0145004 A1 | 7/2003 | Egilsson et al. | |
| 2003/0208506 A1 | 11/2003 | Greenfield et al. | |
| 2004/0006574 A1 | 1/2004 | Witkowski et al. | |
| 2004/0236767 A1 | 11/2004 | Soylemez et al. | |

OTHER PUBLICATIONS

Ross, et al. "Serving datacube tuples from main memory", Jul. 26-28, 2000, Scientific and Statistical Database Management, 2000. Proceedings. 12th International Conference on. p. 182-195.*

"Treating Data Transformations as Objects", Sep. 1, 1992, IBM Technical Disclosure Bulletin, vol. 45, Issue 4A, pp. 200-205.*

Park et al. "Rewriting OLAP Queries using Mateirialized Views and Dimension Hierarchies in Data Warehouses", 17th International Conference on Data Engineering, 2001, Publication Date: 2001.*

Oracle Corporation, "Oracle Express, Analyzer Briefing Designer's Guide, Release 6.3," Sep. 1999, A70078-01, pp. 1-198 (text provided on CD-ROM).

Oracle Corporation, "Oracle Express, Database Administration Guide, Release 6.3.2.1," Jan. 2001, Part No. A82800-02, pp. 1-380 (text provided on CD-ROM).

"How to:SQL Server 7 Distributed Query with OLAP Server" Jul. 2000 (available at http://86.83.48.191/Shared%20Documents/sql/olap/distrqry.htm) (last accessed Sept 22, 2011).

* cited by examiner

FIG. 3A

TABLE 300

(BEFORE SPREADSHEET CLAUSE)

| r | p | t | s | c |
|---|---|---|---|---|
| west | wine | 1998 | 10,000 | 1,000 |
| west | beer | 1998 | 15,000 | 1,500 |
| west | coke | 1998 | 30,000 | 3,000 |
| west | wine | 1999 | 20,000 | 2,000 |
| west | beer | 1999 | 30,000 | 3,000 |
| west | coke | 1999 | 60,000 | 6,000 |
| east | wine | 1998 | 15,000 | 1,500 |
| east | beer | 1998 | 20,000 | 2,000 |
| east | coke | 1998 | 40,000 | 4,000 |
| east | wine | 1999 | 20,000 | 2,000 |
| cast | beer | 1999 | 25,000 | 2,500 |
| east | coke | 1999 | 45,000 | 4,500 |

FIG. 3B

TABLE 350

(AFTER SPREADSHEET CLAUSE)

| r | p | t | s | c |
|---|---|---|---|---|
| west | wine | 1998 | 10,000 | 1,000 |
| west | beer | 1998 | 15,000 | 1,500 |
| west | coke | 1998 | 30,000 | 3,000 |
| west | wine | 1999 | 20,000 | 2,000 |
| west | beer | 1999 | 30,000 | 3,000 |
| west | coke | 1999 | 60,000 | 6,000 |
| west | wine | 2000 | 20,000 | - |
| west | beer | 2000 | 22,500 | - |
| east | wine | 1998 | 15,000 | 1,500 |
| east | beer | 1998 | 20,000 | 2,000 |
| east | coke | 1998 | 40,000 | 4,000 |
| east | wine | 1999 | 20,000 | 2,000 |
| east | beer | 1999 | 25,000 | 2,500 |
| east | coke | 1999 | 45,000 | 4,500 |
| east | wine | 2000 | 25,000 | - |
| east | beer | 2000 | 27,500 | - |

360 → (west, wine, 2000, 20,000)
362 → (west, beer, 2000, 22,500)
364 → (east, wine, 2000, 25,000)
366 → (east, beer, 2000, 27,500)

Fig. 4A

TABLE 400
(BEFORE SPREADSHEET CLAUSE)

| r | p | t | s | c |
|---|---|---|---|---|
| west | wine | 1998 | 10,000 | 1,000 |
| west | beer | 1998 | 15,000 | 1,500 |
| west | coke | 1998 | 30,000 | 3,000 |
| west | wine | 1999 | 20,000 | 2,000 |
| west | beer | 1999 | 30,000 | 3,000 |
| west | coke | 1999 | 60,000 | 6,000 |

Fig. 4B

TABLE 462

(AFTER SPREADSHEET CLAUSE)

| r | p | t | s | c |
|---|---|---|---|---|
| west | wine | 1998 | 10,000 | 1,000 |
| west | beer | 1998 | 15,000 | 1,500 |
| west | coke | 1998 | 30,000 | 3,000 |
| west | wine | 1999 | 20,000 | 2,000 |
| west | beer | 1999 | 30,000 | 3,000 |
| west | coke | 1999 | 60,000 | 6,000 |
| west | beer | 2000 | 45,000 | - |
| west | beer | 2001 | 75,000 | - |
| west | beer | 2002 | 120,000 | - |
| west | beer | 2003 | 195,000 | - |
| west | beer | 2004 | 315,000 | - |
| west | beer | 2005 | 510,000 | - |

450 → (row: west, beer, 2000, 45,000)
452 → (row: west, beer, 2001, 75,000)
454 → (row: west, beer, 2002, 120,000)
456 → (row: west, beer, 2003, 195,000)
458 → (row: west, beer, 2004, 315,000)
460 → (row: west, beer, 2005, 510,000)

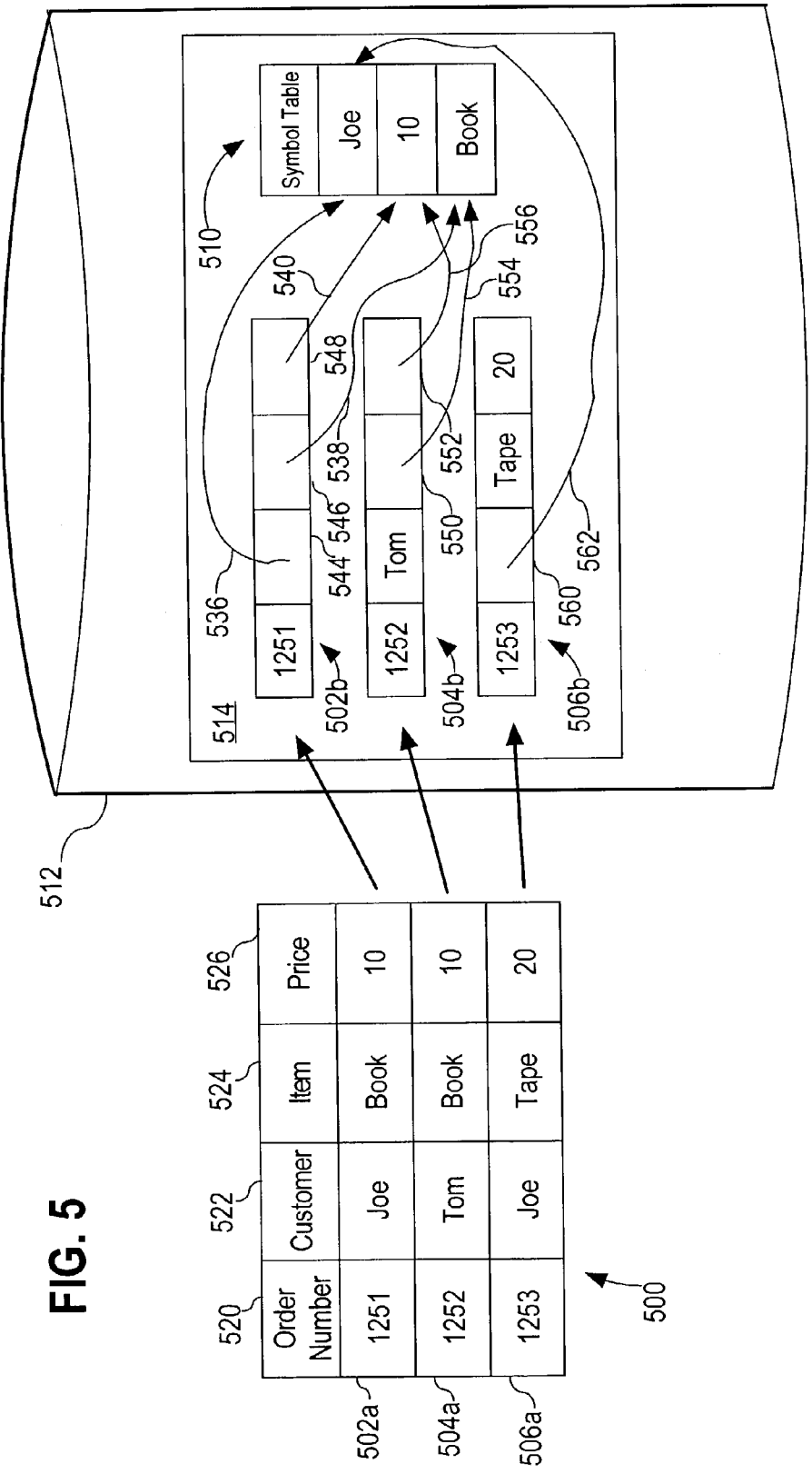

COLUMNS 1502

| ROWS 1501 | 1502-1 () | 1502-2 D1L1 | 1502-3 D1L2 | 1502-4 D1L3 | 1502-5 D1L4 | 1502-6 () | 1502-7 D2L1 | 1502-8 D2L2 | 1502-9 D2L3 |
|---|---|---|---|---|---|---|---|---|---|
| 1501-1 | X | X | X | X | X | X | X | X | X |
| 1501-2 | X | X | X | X | X | X | X | X | |
| 1501-3 | X | X | X | X | X | X | X | | |
| 1501-4 | X | X | X | X | X | X | | | |
| 1501-5 | X | X | X | X | | X | X | X | X |
| 1501-6 | X | X | X | X | | X | X | X | |
| 1501-7 | X | X | X | X | | X | X | | |
| 1501-8 | X | X | X | X | | X | | | |
| 1501-9 | X | X | X | | | X | X | X | X |
| 1501-10 | X | X | X | | | X | X | X | |
| 1501-11 | X | X | X | | | X | X | | |
| 1501-12 | X | X | X | | | X | | | |
| 1501-13 | X | X | | | | X | X | X | X |
| 1501-14 | X | X | | | | X | X | X | |
| 1501-15 | X | X | | | | X | X | | |
| 1501-16 | X | X | | | | X | | | |
| 1501-17 | X | | | | | X | X | X | X |
| 1501-18 | X | | | | | X | X | X | |
| 1501-19 | X | | | | | X | X | | |
| 1501-20 | X | | | | | X | | | |

FIG. 15

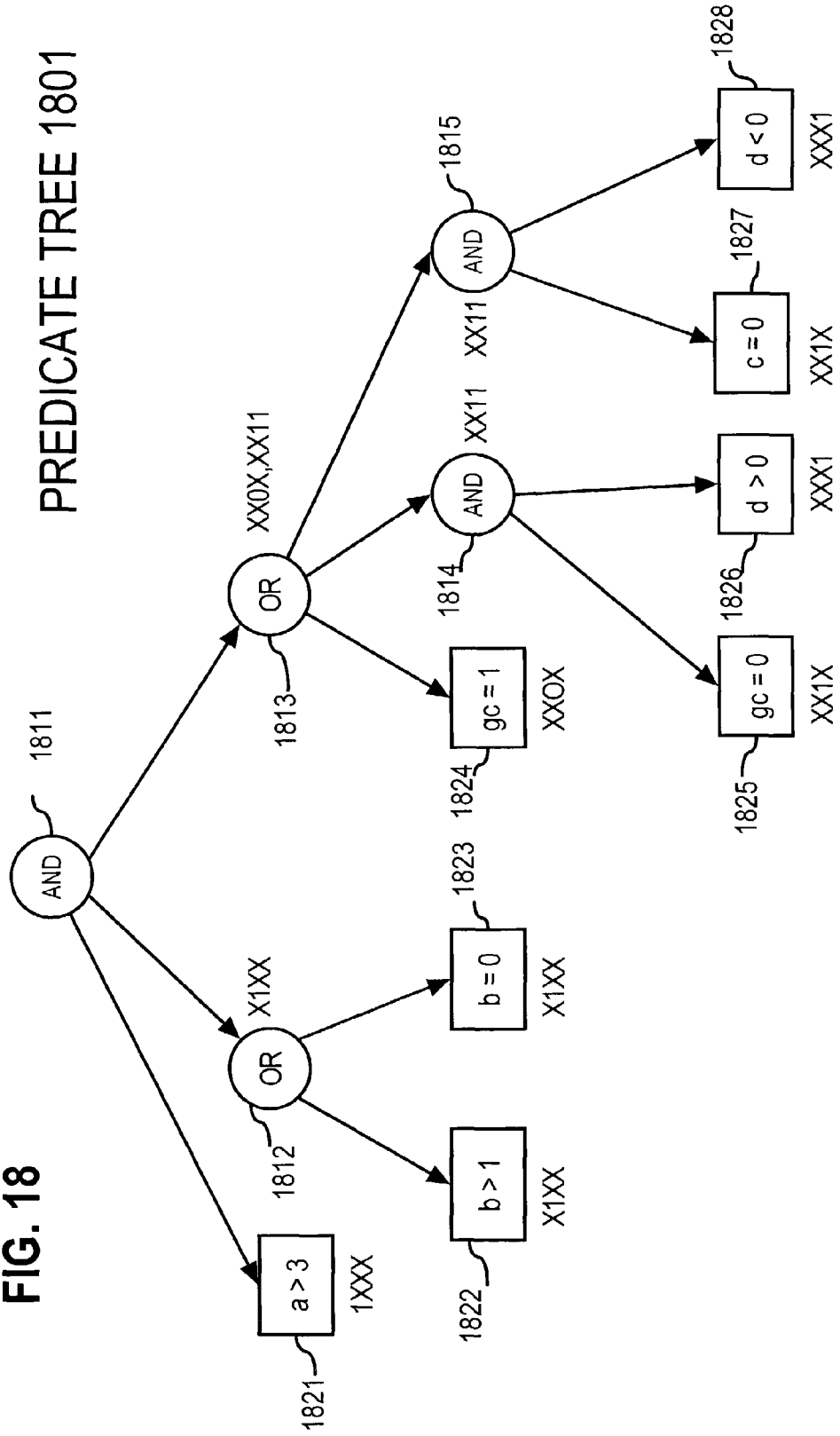

USING RELATIONAL STRUCTURES TO CREATE AND SUPPORT A CUBE WITHIN A RELATIONAL DATABASE SYSTEM

RELATED APPLICATIONS

This application claims the benefit of U.S. Provisional Application Ser. No. 60/375,726, filed Apr. 26, 2002, entitled "Integrating Online Analytical Processing (OLAP) Functionality into a Relational Database Management System (RDBMS)," naming as inventors Andrew Witkowski, Gregory Dorman, David Greenfield, Ekrem Soylemez, James Carey, and A. A. Hopeman, the entire disclosure of which is hereby incorporated by reference for all purposes as if fully set forth herein. This application also claims the benefit of U.S. Provisional Application Ser. No. 60/379,870, filed May 10, 2002, entitled "Online Analytical Processing (OLAP) Operations and Access Structures for Data Stored in a Relational Database," naming as inventors Andrew Witkowski, Gregory Dorman, and David Greenfield, the entire disclosure of which is hereby incorporated by reference for all purposes as if fully set forth herein.

FIELD OF THE INVENTION

The present invention relates to relational database management systems and, more specifically, to techniques for storing multidimensional data in relational database management systems.

BACKGROUND OF THE INVENTION

In the context of database systems, a "dimension" is a list of values that provide categories for data. A dimension acts as an index for identifying values of a variable. For example, if sales data has a separate sales figure for each month, then the data has a MONTH dimension. That is, the data is organized by month. A dimension is similar to a key in a relational database. Data that is organized by two or more dimensions is referred to as "multidimensional data".

Any item of data within a multidimensional measure can be uniquely and completely selected by specifying one member from each of the measure's dimensions. For example, if a sales measure is dimensioned by MONTH, PRODUCT, and MARKET, specifying "January" for the MONTH dimension, "Stereos" for the PRODUCT dimension, and "Eastern Region" for the MARKET dimension uniquely specifies a single value of the measure. Thus, dimensions offer a concise and intuitive way of organizing and selecting data for retrieval, updating, and performing calculations.

Multidimensional data may be stored in relational database systems ("ROLAP" systems) or in specialized, "multidimensional" database systems ("MOLAP" systems). Multidimensional database systems provide structures and access techniques specifically designed for multidimensional data, and therefore provide relatively efficient storage and access to multidimensional data. However, when stored in specialized multidimensional database systems, only applications that are specially built to interact with those multidimensional database systems are able to access and manipulate the data.

On the other hand, when stored in relational database systems, all applications that support interaction with relational databases have access to the data. Such database applications communicate with the relational database system by submitting commands that conform to the database language supported by the relational database system, the most common of which is the Structured Query Language (SQL).

Relational database systems store data in the form of related tables, where each table has one or more columns and zero or more rows. The conventional mechanism for storing multidimensional data in a relational database system is to store the data in tables arranged in what is referred to as a star schema. In relational database systems, a star schema is distinguished by the presence of one or more fact tables and one or more dimension tables. Fact tables store measures, and contain foreign keys to dimension tables. Dimension tables store values for hierarchical dimensions. FIG. 1 illustrates an exemplary star schema with two dimensions.

Referring to FIG. 1, it illustrates a database 100 that includes tables 102, 104 and 106. Table 102 is named "store" and contains information about each of the stores in which sales may occur. Each row in store table 102 contains a unique store-id and information about the particular store that corresponds to the store-id. Table 104 is named "product" and contains information about each type of product that may be sold in any of the stores. Each row in product table 104 contains a unique product-id and information about the particular product.

Table 106 is named "sale" and contains information about each sale in each of the stores represented in the store table 102. Each row in sale table 106 includes a dollar amount, a store-id to indicate the store at which the sale was made, a product-id to indicate the product sold in the sale, and the date of the sale. Typically, the number of sales will be vastly greater than both the number of stores at which the sales are made and the number of products carried by the stores. Detailed information about the store and product involved in a sale transaction does not have to be stored in the rows of table 106 because such detailed information is available in tables 102 and 104, respectively. Instead, the rows of table 106 simply contain values (store-ids and product-ids) that reference information stored in the other tables 102 and 104. Therefore, tables 102, 104 and 106 constitute a star schema in which table 106 is the fact table and tables 102 and 104 are dimension tables.

The data stored in fact table 106 only has two dimensions, and therefore fact table 106 only has two columns dedicated to storing foreign key values for those dimensions. In general, a fact table must dedicate one column for storing foreign key values for each of the dimensions associated with the multidimensional data stored in the fact table. Thus, a fact table that stores data associated with twenty dimensions would have to dedicate twenty columns to the storage of foreign key values.

An alternative approach to managing multidimensional data in a relational database involves storing the data in relational files but maintaining all multidimensional structure, metadata, administration, and access control using multidimensional database system techniques. Accessing relationally-stored data using multidimensional techniques poses numerous difficulties. For example, when all administration and access to the multidimensional data are controlled exclusively through the multidimensional database system engine, two database management systems must be administered. Further, database applications that access data using conventional relational commands (e.g. SQL commands) are unable to access the multidimensional data.

The approaches described above for storing multidimensional data in relational database systems demonstrate the tradeoffs made by prior approaches, which have either (1) sacrificed the benefits of multidimensional storage to enjoy the benefits of modern relational systems, such as conventional relational access, or (2) sacrificed the benefits of relational storage to attain the efficiency of multidimensional storage.

BRIEF DESCRIPTION OF THE DRAWINGS

The present invention is depicted by way of example, and not by way of limitation, in the figures of the accompanying drawings and in which like reference numerals refer to similar elements and in which:

FIG. 3A depicts a Table 300 as it existed prior to the application of a spreadsheet clause;

FIG. 3B depicts a Table 350 that illustrates the additional new row information after the application of a spreadsheet clause;

FIG. 4A depicts a Table 400 as it existed prior to the application of a spreadsheet clause;

FIG. 4B depicts a Table 462 that illustrates the additional new row information after the application of a spreadsheet clause;

FIG. 5 shows a data storage structure according to an embodiment of the invention;

FIG. 15 is a table depicting groupings specified by an aggregate query;

FIG. 18 is a diagram depicting a predicate tree according to an embodiment of the present invention.

DETAILED DESCRIPTION OF EMBODIMENTS

Figure 1:
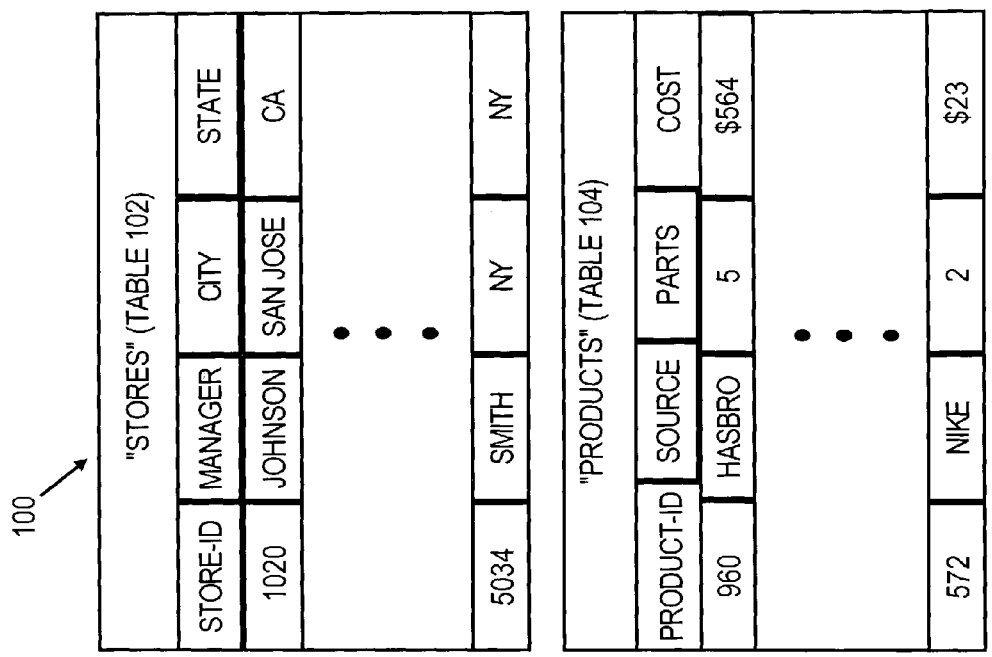
FIG. 1 is a block diagram that illustrates a star schema.

An approach for online analytical processing (OLAP) operations and access structures for data stored in a relational database (RDB) is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are depicted in block diagram form in order to avoid unnecessarily obscuring the present invention. In particular, the following description contains specific values that are to be regarded as examples for the particular implementations and embodiments being described, and other implementations and embodiments may use values that are different from those provided herein.

In the following description, the various features shall be discussed and grouped under the headings listed below:

I. INTRODUCTION
II. CREATING RCUBES
III. RELATIONAL EDGES
IV. PERFORMING OPERATIONS ON RCUBES
V. ACCESS STRUCTURES FOR RCUBES
VI. REWRITE EXAMPLES
VII. ADDITIONAL EXAMPLES
VIII. IMPLEMENTATION MECHANISMS
IX. EXTENSIONS AND ALTERNATIVES

I. INTRODUCTION

The OLAP Cube, Measures, Dimensions and Hierarchies are concepts in OLAP (On Line Analytical Processing), and they may be implemented in MOLAP (Multidimensional OLAP) engines. Such engines typically contain a Data Definition Language for defining these concepts, a language or an API to navigate through cubes during analysis, and access structures to improve performance for the OLAP queries One approach for implementing OLAP uses a technique herein called a RCUBE (Relational Cube). The RCUBE approach does not use any local multi-dimensional storage structures. Instead, the data resides in the relational tables of a relational database management system, and the queries are executed directly against those relational tables. In addition, the data stored in the relational tables may be accessed using pure ANSI SQL, without the use of a non-SQL API.

ANSI SQL includes language facilities, called CUBE, ROLLUP and GROUPING SETS, which can be used to implement OLAP in an RDBMS, such as with the RCUBE approach described herein. In addition, the techniques described herein extend SQL to support the concepts of relational dimensions and hierarchies, thus providing a linguistic platform for RCUBE.

Techniques are described below for how to construct queries for creating RCUBEs, navigating RCUBEs, posing typical OLAP questions in SQL, how to build supporting relational access structures for RCUBE, and the translation of OLAP API requests into SQL calls.

II. CREATING RCUBES

RCUBES are the building blocks for RCUBE queries. Embodiments of the invention may utilize any of the following three illustrative, non-limiting examples of RCUBES:

1) Concatenated cube,
2) Grouping set cube, and
3) Embedded Dimension cube.

The three illustrative examples of RCUBES shall be described with reference to the following example. Consider a fact f and two-dimension tables time_dt and geog_dt. The time_dt(y, q, m) records time hierarchy year->quarter->month, and geog_dt(c, s, ci) records geography hierarchy country->state->city respectively. The fact f (fk_m, fk_ci, sales, units) stores foreign keys to dimension tables and measures sales and units.

A cube represents all aggregations of measures along the dimensional hierarchy.

The Concatenated Cube ("CON_CUBE") may have the following form:

Example 1

```
create view con_cube as
    select
        y, q, m, c, s, ci, sum(sales) sales, sum(units) units,
            grouping_id(y, q, m) time_gid, grouping_id(c, s, ci)
            geog_gid,
    from
        f, time_dt, geog_dt
    where
        f.fk_m = time_dt.m and f.fk_ci = geog_dt.ci
    group by
        rollup (y, q, m), rollup(c, s, ci)
```

Observe that a Concatenated Cube stores its parental lineage for each level in a hierarchy. For example, for the quarter (q) level, the Concatenated Cube also stores the parent of the quarter (q) level, namely year (y). Observe further that the Concatenated Cube has grouping_id( ) columns allowing one to distinguish the level of grouping.

The Grouping Set Cube ("GET_CUBE") may have the following form:

Example 2

```
create view gset_cube as
    select
        y, q, m, c, s, ci, sum(sales) sales, sum(units) units,
            grouping_id(y, q, m) time_gid, grouping_id(c, s, ci)
            geog_gid
    from
        f, time_dt, geog_dt
    where
        f.fk_m = time_dt.m and f.fk_ci = geog_dt.ci
    group by grouping set
    (
        (m, ci), (m, s), (m, c), (m),
        (q, ci), (q, s), (q, c), (q),
        (y, ci), (y, s), (y, c), (y),
        (c), (s), (ci),
    )
```

In contrast to the Concatenated Cube, the Grouping Set Cube doesn't store parental lineage. As a result, the Grouping Set Cube may be advantageous if the parental lineage is not needed because it requires less storage space than the Concatenated Cube.

The Embedded Dimension Cube ("ED_CUBE") may have the following form:

Example 3

```
create view ed_cube as
    select
        ed(y, q, m) ed_time,
        ed(c, s, ci) ed_geog
        sum(sales) sales, sum(units) units,
            grouping_id(y, q, m) time_gid, grouping_id(c, s, ci)
            geog_gid
    from
        f, time_dt, geog_dt
    where
        f.fk_m = time_dt.m and f.fk_ci = geog_dt.ci
    group by
        rollup (y, q, m), rollup(c, s, ci)
```

Where the ED function has this form:

```
ED(y, q, m) =
    case when grouping(y)=0 and grouping(q)=1 then y
         when grouping(q)=0 and grouping(m)=1 then q
         else m
```

Observe that the ED function takes all levels in the hierarchy and produces a single value. For example, for the time dimension, when the cube groups by y (year) level the ED returns y, when cube groups by q (quarter) level ED returns q, etc. Thus, instead of having three columns (y,q,m) in the cube for the time dimension, there is only one column named ed_time.

The above form of the Embedded Dimension Cube assumes that level values are unique within a dimension. For example, in the geog_dt dimension, the names of the cities are different than the names of the states and countries. The Embedded Dimension Cube advantageously requires less storage space than the Grouping Set Cube.

III. RELATIONAL EDGES

The RCUBEs described above, one building block for implementing relational cubes, may be thought of as relational "cube measures." Other building blocks of cubes are "edges." Thus, in addition to having relational cubes, there can be relational edges, such shown below in Example 4.

Example 4

```
create view ed_cube_time as
    select
        ed(y, q, m) ed_time,
        par_ed(y,q,m) ed_parent_time,
        grouping_id(y, q, m) time_gid,
        y,q,m
    from
        time_dt
    group by
        rollup (y, q, m),
```

Here the PAR_ED function has this form:

```
PAR_ED(y, q, m) =
    case when grouping(y)=0 and grouping(q)=1 then NULL
         when grouping(q)=0 and grouping(m)=1 then y
         else q
```

In the above example, the term "par_ed" refers to the hierarchical parent of the current value of the dimension. For example, when the time dimension represents month, then its parent is the corresponding quarter, and when the time dimension represents quarter, then its parent is the corresponding year. Note that there is one such relational "edge" view per dimension of the relational cube.

IV. PERFORMING OPERATIONS ON RCUBES

According to various embodiments, RCUBEs may be navigated using several operations, such as, e.g., being 'sliced' and 'diced' to present selected aggregation levels (slices) at different values of hierarchy (dices) to the user. Other operations performed on RCUBEs by various embodiments include 'drill,' 'pivot,' performing array calculations, and performing inter-row calculations. Queries on RCUBEs may be nested to produce OLAP queries, such as, e.g., "Return the current Market Share of top 10 products of last year." Operations performed on RCUBEs by embodiments of the invention shall be described below in further detail.

Slice and Dice

Example 5 illustrates a slice and dice query using the CON_CUBE. The following query represents total sales in cities ('boston', 'la', 'sf') or in states ('ca', 'ma') and in months ('1999-m1', '1999-m2') or quarters ('1999-q1', '1999-q2').

Example 5

```
select y, q, m, c, s, ci, sales, units
from con_cube
where
(
    ci in ('boston', 'la', 'sf') and
    geog_gid = 0
    or
    s in ('ca', 'ma') and geog_gid = 1
)
and
(
    m in ('1999-m1', '1999-m2') and
    time_gid = 0
    or
    q in ('1999-q1', '1999-q2') and
    time_gid = 1
)
```

Drill

In addition to "slice" and "dice," RCUBEs may undergo the so-called "drill" operation. Drill operations typically follow "slice" and "dice" selections from "edges" and can be of two kinds: (a) hierarchically ordered and (b) order preserving.

"Hierarchical Drills" and "Order Preserving Drills" are both ways to increase the size of a dimension member selection by adding the children of some target member. The difference between the two types of drills consists primarily in the order of the final selection. To illustrate the distinction we will show the effects of each kind of drill on the "AMERICAS" member of the selection {"USA", "EUROPE", "AMERICAS",}. Assume that the children of "AMERICAS" are "CANADA", "USA", and "MEXICO".

In a "Hierarchical Drill" the selection is always reordered so that children appear after their parents and siblings are ordered according to some default ordering (which is usually alphabetical). A particular feature of this kind of drill is that the order of the pre-drill selection is lost; another is that there will be no duplicate members in the final selection. The effect of a hierarchical drill under "AMERICAS" in the selection {"USA", "EUROPE", "AMERICAS"} would be to produce the selection {"AMERICAS", "CANADA", "MEXICO", "USA", "EUROPE"}.

In an "Order Preserving Drill" the newly added children are added after the drilled parent, but in all other respects the order of the original selection is preserved. A feature of this kind of drill is that duplicate values may appear. The effect of an order preserving drill under "AMERICAS" in the selection {"USA", "EUROPE", "AMERICAS"} would be to produce the selection {"USA", "EUROPE", "AMERICAS", "CANADA", "MEXICO", "USA"}.

Example 6 illustrates a "hierarchically ordered drill" on a time edge:

Example 6

```
select ed_time, ed_time_parent, gid_time, y, q, m from
(
select ed_time, ed_time_parent, gid_time, y, q, m from ed_cube_time
where
    m in ('1999-m1', '1999-m2') and time_gid = 0
    or
    q in ('1999-q1', '1999-q2') and time_gid = 1
/* original slice */
union all
select ed_time, ed_time_parent, gid_time, y, q, m from
ed_cube_time
where
ed_time_parent = '1999-q2'
/* drill on one of the members of the original selection */
)
order by y,q,m;
```

Example 7 illustrates an "order-preserving drill" on a time edge:

Example 7

```
select ed_time, ed_time_parent, gid_time, y, q, m from
(
select ed_time, ed_time_parent, gid_time, y, q, m,
        ed_time as ed_time2, ed_time_parent as
        ed_time_parent2, gid_time as
gid_time2, y as y2, q as q2, m as m2
    from ed_cube_time
    where
        m in ('1999-m1', '1999-m2') and
        time_gid = 0
        or
        q in ('1999-q1', '1999-q2') and
        time_gid = 1
    order by ed_time descending
/* original ordered slice */
union all
    select ed_time, ed_time_parent, gid_time, y, q, m,
        '1999-q2' as ed_time2, '1999' as
        ed_time_parent2, 1 as gid_time2, '1999' as
y, '1999-q2' as q2, NULL as m2
    from ed_cube_time
    where
        ed_time_parent = '1999-q2'
/* drill on one of the members of the original selection */
)
order by ed_time2 descending
        y asc, q asc, m asc
```

The above selection is ordered "as original" for all the members of the initial selection, but hierarchically for all descendents of the drill.

During drill operations SQL may be executed recursively. Edge queries typically are executed first, and then the resulting values are used to provide predicates to "slice" SQL on the measure query.

Array Calculations

Array calculations are another part of OLAP. Examples of array calculations include time series, financials, and shares. SQL WINDOW functions are used in order to enable array calculations in SQL. Example 8 is an example query that produces array indexes for the time edge.

Example 8

```
create or replace view time_index as
select
    ed_time, ed_time_parent, gid_time, y, q, m,
    row_number( ) over(order by y,q,m) as ed_index,
    row_number( ) over(partition by gid_time order by y,q,m)
        as level_index
from ed_cube_time;
```

Once array indexes are produced, business functions that require array computations may be performed. Example 9 is an example of Net Present Value array computation, assuming an annual IRR of 1.06:

Example 9

```
select y, q, m, c, s, ci,
    sum(M.sales / power (decode(T.gid_time, 0, 1.005, 1,
    1.015, 3, 1.06),
    T.level_index)))
        from ed_cube M, time_index T
    where
    M.ed_time=T.ed_time and M.gid_time=T.gid_time
    group by M.ed_geog, T.gid_time
```

Example 10 is an example of "prior period" array computation:

Example 10

```
select y, q, m, c, s, ci,
    lag(m.sales,1) over (partition by ed_geog, t.gid_time order
        by y,q,m)
    (M.sales) over (partition by M.ed_geog, T.gid_time range
        between 1 preceeding and 1 preceeding) as PP
from ed_cube M, time_index T
where
    M.ed_time=T.ed_time and M.gid_time=T.gid_time;
```

Inter-Row Calculations

Inter-row calculations are another technique for navigating cubes. Examples of inter-row calculations that may be used to navigate relational cubes are described in Section X.

V. ACCESS STRUCTURES FOR RCUBES

The RCUBEs described above are examples of logical entities for construction of OLAP queries. In addition to such logical entities, supporting relational access structures may be used (e.g., indexes and materialized views) to improve performance.

Materialized Views

Materialized Views are examples of one approach for improving query performance by pre-computing (partial) results. RCUBEs can be fully or partially materialized. For example, CON_CUBE can be fully materialized as

Example 11

```
create materialized view con_cube_full_mv
    refresh fast
    enable query rewrite
as
    select
        y, q, m, c, s, ci,
        sum(sales) sales, sum(units) units,
        count(sales) count_sales, count(units) count_units,
        count(*) count_star,
        grouping_id(y, q, m, c, s, ci) gid,
    from
        f, time_dt, geog_dt
    where
        f.fk_m = time_dt.m and f.fk_ci = geog_dt.ci
    group by
        rollup (y, q, m), rollup(c, s, ci)
```

Or CON_CUBE can be partially materialized as in the following example:

Example 12

```
create materialized view con_cube_partial_mv
    refresh fast
    enable query rewrite
as
    select
        y, q, m, c, s, ci,
        sum(sales) sales, sum(units) units,
        count(sales) count_sales, count(units) count_units,
        count(*) count_star,
        grouping_id(y, q, m, c, s, ci) gid,
    from
        f, time_dt, geog_dt
    where
        f.fk_m = time_dt.m and f.fk_ci = geog_dt.ci
    group by grouping sets
    (
        (y, q, m, c, s, ci),
        (y, q, c, s),
        (y,c)
    )
```

If the cube is partially materialized, then aggregations that are present in the query and not in the materialized view may be computed dynamically from either the base data or from the materialized view. Thus, for a given implementation, the particular approach taken may be based on the desired trade-off between storage space taken by the materialized view and the query response time.

Materializations can reside in a single container as in case of con_cube_full_mv or con_cube_partial_mv. A container is a 'normal' relational table where one can store the materialization. For example:

create materialized view mv
enable query rewrite
as
select t.year, p.prod, sum(f.sales) sales
from product p, times t, fact f
where p.prod_id=f.prod_id and t.time_id=f.time_id
group by t.year, p.prod;

creates a materialized view mv. The table named mv with columns year, prod, sales is referred to as a container table, where the results of the mv query may be stored.

Additionally, materializations can reside in federated materialized views, where there is one grouping for the materialized view. For example, con_cube_partial_mv can be represented as three materialized views (MVs), as illustrated below in Examples 13-15.

Example 13

```
create materialized view lineage_y_q_m_c_s_ci_mv
    refresh fast
    enable query rewrite
as
    select
        y, q, m, c, s, ci,
        sum(sales) sales, sum(units) units,
        count(sales) count_sales, count(units) count_units,
        count(*) count_star
    from
        f, time_dt, geog_dt
    where
        f.fk_m = time_dt.m and f.fk_ci = geog_dt.ci
    group by y, q, m, c, s, ci;
```

Example 14

```
create materialized view lineage_y_q_c_s_mv
    refresh fast
    enable query rewrite
as
    select
        y, q, c, s,
        sum(sales) sales, sum(units) units,
        count(sales) count_sales, count(units) count_units,
        count(*) count_star
    from
        f, time_dt, geog_dt
    where
        f.fk_m = time_dt.m and f.fk_ci = geog_dt.ci
    group by y, q, c, s
```

Example 15

```
create materialized view lineage_y_c_mv
    refresh fast
    enable query rewrite
as
    select
        y, c,
        sum(sales) sales, sum(units) units,
        count(sales) count_sales, count(units) count_units,
        count(*) count_star
    from
        f, time_dt, geog_dt
    where
        f.fk_m = time_dt.m and f.fk_ci = geog_dt.ci
    group by y, c
```

Similar to logical RCUBEs, materialized views can either store parental lineage or store the lowest level of groupings. For example, instead of Example 14 and Example 15, one could employ Example 16 and Example 17 without lineage:

Example 16

```
create materialized view m_ci_mv
    refresh fast
    enable query rewrite
as
    select
        m, ci,
        sum(sales) sales, sum(units) units,
        count(sales) count_sales, count(units) count_units,
        count(*) count_star
    from
        f, time_dt, geog_dt
    where
        f.fk_m = time_dt.m and f.fk_ci = geog_dt.ci
    group by m, ci;
```

Example 17

```
create materialized view q_s_mv
    refresh fast
    enable query rewrite
as
    select
        q, s,
        sum(sales) sales, sum(units) units,
        count(sales) count_sales, count(units) count_units,
        count(*) count_star
    from
        f, time_dt, geog_dt
    where
        f.fk_m = time_dt.m and f.fk_ci = geog_dt.ci
    group by q, s
```

Examples 16 and 17 store no lineage. Note that multiple materialized views may reside within a single data warehouse, i.e., materialized views that store lineage and materialized views that do not store lineage may be stored within the same data warehouse.

Users have an option of either using an existing multiple MV (which may contain a single grouping) for answering RCUBE queries, or constructing a new MV in one container, which may be easier to manage.

For edges, corresponding materializations may be created, as shown below.

Example 18

```
create materialized view ed_cube_time_MV as
    select
        ed(y, q, m) ed_time,
        par_ed(y,q,m) ed_parent_time,
        grouping_id(y, q, m) time_gid,
        y,q,m
    from
        time_dt
    group by
        rollup (y, q, m), rollup(c, s, ci);
```

Partitioning

Partitioning may be used to accelerate the processing of RCUBE queries. If a materialized view contains more than one grouping, the MV may be partitioned so that a single partition contains only a single grouping or a few groupings. RANGE or LIST partitioning may be used. For example, consider con_cube_full_mv of Example 11. This MV may be partitioned using RANGE partitioning on the gid column such that each partition contains exactly one grouping, as shown below.

Example 19

```
create materialized view con_cube_full_mv
    refresh fast
    enable query rewrite
    partition by range (gid)
    (
        partition p01 values less than(1),
        partition p02 values less than(2),
        ...
        partition pmax values less than(MAXVALUE)
    )
as
    select
        y, q, m, c, s, ci,
        sum(sales) sales, sum(units) units,
        count(sales) count_sales, count(units) count_units,
        count(*) count_star,
        grouping_id(y, q, m, c, s, ci) gid
    from
        f, time_dt, geog_dt
    where
        f.fk_m = time_dt.m and f.fk_ci = geog_dt.ci
    group by
        rollup (y, q, m), rollup(c, s, ci)
```

In the above example, the valid values of gid are partitioned. A potential benefit of partitioning the MV is that OLAP queries are usually resolved to few groupings, and thus to few partitions. Partition pruning may be used to speed up the access to the MV. In certain embodiments double partitioning may be employed. For example, double partitioning using gid (grouping id) and time may be used.

Indexing

Bitmap, btree, functional and IOT indexing can effectively be used to speed up the RCUBE queries. Once materializations are created on for the RCUBE cubes, bitmap indexes may be created to speed up the access through the MVs. For example, in case of con_cube_full_mv, indexes may be created on all dimensional columns:

create bitmap index bmi_y on con_cube_full_mv (y) computes statistics;
. . .
create bitmap index bmi_ci on con_cube_full_mv (ci) computes statistics;

An interesting case of indexing arises for the MV that supports the ED_CUBE. This MV has Embedded Dimension columns, one per dimension. This MV may be created as an Index Organized Table ("IOT") on the ED columns, or by a btree index on the concatenation of the ED columns.

For example, the MV to support ED_CUBE is shown below. This MV is constructed as an IOT with a primary key on ed_time and ed_geog.

Example 20

```
create materialized view iot_ed_cube_mv
    constraint iot_pk primary key (ed_time, ed_geog)
    organization index
    enable query rewrite
as
```

-continued

```
    select
        ed(y, q, m) ed_time,
        ed(c, s, ci) ed_geog,
        sum(sales) sales, sum(units) units,
        grouping_id(y, q, m, c, s, ci) gid
    from
        f, time_dt, geog_dt
    where
        f.fk_m = time_dt.m and f.fk_ci = geog_dt.ci
    group by
        rollup (y, q, m), rollup(c, s, ci)
```

In addition, this MV can be partition by gid, and btree indexes on each ED column may be used. This organization is efficient for accessing aggregates with qualified dimensions, i.e., ed_time and ed_geog. Selective btree indexes and bitmap indexes may be used as well.

Edge MVs are likewise indexed, e.g., the b-tree index on ed_time_parent column. One may also use bitmaps indexes on y,q,m and gid.

Compression

Materialized views with lineage, like the con_cube_full_mv, may store redundant lineage information, thus taxing the storage requirements. Compression methods can be applied to reduce the redundancy. Section XI provides further description and examples of such compression methods that can be used with materialized views and RCUBEs. Compressed MVs with lineage take as little storage as compressed MVs without lineage when data is ordered. Embodiments of the invention advantageously provide for caring lineage in the MV, and thus avoiding joinbacks that retrieve the lineage during the query time.

Optimizations

Additional optimizations techniques may be applied to RCUBEs including, but not limited to, the following: (a) Group Pruning, (b) Union Rewrite with MV, and (c) Bitmap index pruning.

VI. REWRITE EXAMPLES

Materialized views, such as those described above, can be used for rewriting typical OLAP queries as demonstrated herein with an example of a simple 'slice and dice' OLAP query, such as shown in Example 5.

OLAP queries are expressed using a cube view, for example, a cube view con_cube from Example 1. An example of such query is shown in Example 5, which selects total sales in cities ('boston', 'la', 'sf') or in states ('ca', 'ma') and in months ('1999-m1', '1999-m2') or quarters ('1999-q1', '1999-q2'):

Example 5

```
select y, q, m, c, s, ci, sales, units
from con_cube
where
(
    ci in ('boston', 'la', 'sf') and geog_gid = 0
    or
    s in ('ca', 'ma') and geog_gid = 1
)
```

```
        and
        (
            m in ('1999-m1', '1999-m2') and time_gid = 0
            or
            q in ('1999-q1', '1999-q2') and time_gid = 1
        )
```

Before the materialized view rewrite, one or more of several query transformations may be performed as described herein, including but not limited to, the following: view expansion, group pruning, view merging, an optional expansion of cube to UNION ALL, and pushing predicates inside the view.

After cube view expansion, the query of Example 5 may be expressed as:

Example 21

```
select y, q, m, c, s, ci, sales, units
from
(
    select
        y, q, m, c, s, ci, sum(sales) sales, sum(units) units,
        grouping_id(y, q, m) time_gid, grouping_id(c, s, ci)
        geog_gid,
    from
        f, time_dt, geog_dt
    where
        f.fk_m = time_dt.m and f.fk_ci = geog_dt.ci
    group by
        rollup (y, q, m), rollup(c, s, ci)
) con_cube
where
(
    ci in ('boston', 'la', 'sf') and geog_gid = 0
    or
    s in ('ca', 'ma') and geog_gid = 1
)
and
(
    m in ('1999-m1', '1999-m2') and time_gid = 0
    or
    q in ('1999-q1', '1999-q2') and time_gid = 1
)
```

A "Group Pruning" technique may be applied to the above query. Section XII provides further description and examples of group pruning techniques that may be used with RCUBEs. Using group pruning, the concatenated rollup in the con_cube view can be converted to a grouping set where only groupings needed by the outer query are present. The above query after group pruning may have the form:

Example 22

```
select y, q, m, c, s, ci, sales, units
from
(
    select
        y, q, m, c, s, ci, sum(sales) sales, sum(units) units,
        grouping_id(y, q, m) time_gid, grouping_id(c, s, ci)
        geog_gid,
    from
        f, time_dt, geog_dt
    where
        f.fk_m = time_dt.m and f.fk_ci = geog_dt.ci
    group by grouping set
    (
        (y, q, m, c, s, ci),
        (y, q, m, c, s),
        (y, q, c, s, ci),
        (y, q, c, s),
    )
) con_cube
where
(
    ci in ('boston', 'la', 'sf') and geog_gid = 0
    or
    s in ('ca', 'ma') and geog_gid = 1
)
and
(
    m in ('1999-m1', '1999-m2') and time_gid = 0
    or
    q in ('1999-q1', '1999-q2') and time_gid = 1
)
```

Note that Example 22 may be represented in an alternative UNION ALL form (e.g., this may be performed as a transformation for some materialized view rewrites) as:

Example 23

```
select y, q, m, c, s, ci, sales, units
from
(
    select
        y, q, m, c, s, ci, sum(sales) sales, sum(units) units,
        grouping_id(y, q, m) time_gid, grouping_id(c, s, ci)
        geog_gid,
    from
        f, time_dt, geog_dt
    where
        f.fk_m = time_dt.m and f.fk_ci = geog_dt.ci
    group by y, q, m, c, s, ci
    union all
    select
        y, q, m, c, s, null, sum(sales) sales, sum(units) units,
        grouping_id(y, q, m) time_gid, grouping_id(c, s, ci)
        geog_gid,
    from
        f, time_dt, geog_dt
    where
        f.fk_m = time_dt.m and f.fk_ci = geog_dt.ci
    group by y, q, m, c, s
    union all
    select
        y, q, null, c, s, ci, sum(sales) sales, sum(units) units,
        grouping_id(y, q, m) time_gid, grouping_id(c, s, ci)
        geog_gid,
    from
        f, time_dt, geog_dt
    where
        f.fk_m = time_dt.m and f.fk_ci = geog_dt.ci
    group by y, q, c, s, ci
    union all
    select
        y, q, null, c, s, null, sum(sales) sales, sum(units) units,
        grouping_id(y, q, m) time_gid, grouping_id(c, s, ci)
        geog_gid,
    from
        f, time_dt, geog_dt
    where
        f.fk_m = time_dt.m and f.fk_ci = geog_dt.ci
    group by y, q, c, s
) con_cube
where
(
    ci in ('boston', 'la', 'sf') and geog_gid = 0
    or
    s in ('ca', 'ma') and geog_gid = 1
)
and
(
    m in ('1999-m1', '1999-m2') and time_gid = 0
``` or
    q in ('1999-q1', '1999-q2') and time_gid = 1
)

After these transformation, the query of Example 22 may be rewritten using the con_cube_full_mv.

Observe that after group prunning the inner view, con_cube, has four groupings: (y, q, m, c, s, ci), (y, q, m, c, s), (y, q, c, s, ci) and (y, q, c, s). These four groupings correspond to groupings in the con_cube_full_mv identified by gid IN (0, 1, 8, 9) correspondingly. Thus, after rewrite, the query of Example 22 may have the form:

Example 24

```
select y, q, m, c, s, ci, sales, units
from
(
    select
        y, q, m, c, s, ci, sales, units,
        bitmask(000111, gid) time_gid, bitmask(111000, gid) geog_gid,
    from
        con_cube_full_mv
    where
        gid in (0, 1, 8, 9)
) con_cube
where
(
    ci in ('boston', 'la', 'sf') and geog_gid = 0
    or
    s in ('ca', 'ma') and geog_gid = 1
)
and
(
    m in ('1999-m1', '1999-m2') and time_gid = 0
    or
    q in ('1999-q1', '1999-q2') and time_gid = 1
)
```

After view merging, the query of Example 24 may be converted into:

Example 25

```
select y, q, m, c, s, ci, sales, units
from
    con_cube_full_mv
where
(
    ci in ('boston', 'la', 'sf') and bitmask(111000, gid) = 0
    or
    s in ('ca', 'ma') and bitmask(111000, gid) = 1
)
and
(
    m in ('1999-m1', '1999-m2') and bitmask(000111, gid) = 0
    or
    q in ('1999-q1', '1999-q2') and bitmask(000111, gid) = 1
)
and
(
    gid in (0, 1, 8, 9)
)
```

Similarly, the query of Example 5 may be rewritten using partially materialized cube: con_cube_partial_mv. Observe that con_cube_partial_mv doesn't contain the exact groupings of the query, but that the exact grouping can be derived by rolling up individual groupings from the MV. The query of Example 5 may undergo the transformations as shown in Examples 21-23. The transformation of Example 23 (transformation to UNION ALL) may be used for the rewrite. In that form the individual branches of UNION ALL can be rewritten using the con_cube_partial_mv, as shown in Example 26.

Example 26

```
select y, q, m, c, s, ci, sales, units
from
(
    select
        y, q, m, c, s, ci, sales, units,
        bitmask(000111, gid) time_gid, bitmask(111000, gid) geog_gid
    from
        con_cube_partial_mv
    where
        gid = 0
union all
    select
        y, q, m, c, s, null, sales, units,
        bitmask(000111, gid) time_gid, bitmask(111000, gid) geog_gid
    from
        con_cube_partial_mv
    where
        gid = 0
    group by y, q, m, c, s
union all
    select
        y, q, null, c, s, ci, sales, units,
        bitmask(000111, gid) time_gid, bitmask(111000, gid) geog_gid
    from
        con_cube_partial_mv
    where
        gid = 0
    group by y, q, c, s, ci
union all
    select
        y, q, null, c, s, null, sales, units,
        bitmask(000111, gid) time_gid, bitmask(111000, gid) geog_gid
    from
        con_cube_partial_mv
    where
        gid = 9
) con_cube
where
(
    ci in ('boston', 'la', 'sf') and geog_gid = 0
    or
    s in ('ca', 'ma') and geog_gid = 1
)
and
(
    m in ('1999-m1', '1999-m2') and time_gid = 0
    or
    q in ('1999-q1', '1999-q2') and time_gid = 1
)
```

After pushing predicates inside the UNION ALL view, the query of Example 26 may be expressed as:

Example 27

```
select y, q, m, c, s, ci, sales, units
from
(
    select
        y, q, m, c, s, ci, sales, units,
        bitmask(000111, gid) time_gid, bitmask(111000, gid) geog_gid
    from
        con_cube_partial_mv
    where
    (
        gid = 0
```

-continued

```
        )
        and
        (
            ci in ('boston', 'la', 'sf')
            or
            s in ('ca', 'ma')
        )
        and
        (
            m in ('1999-m1', '1999-m2')
            or
            q in ('1999-q1', '1999-q2')
        )
    union all
        select
            y, q, m, c, s, null, sales, units,
            bitmask(000111, gid) time_gid, bitmask(111000, gid) geog_gid
        from
            con_cube_partial_mv
        where
        (
            gid = 0
        )
        and
        (
            s in ('ca', 'ma')
        )
        and
        (
            m in ('1999-m1', '1999-m2')
            or
            q in ('1999-q1', '1999-q2')
        )
        group by y, q, m, c, s
    union all
        select
            y, q, null, c, s, ci, sales, units,
            bitmask(000111, gid) time_gid, bitmask(111000, gid) geog_gid
        from
            con_cube_partial_mv
        where
        (
            gid = 0
        )
        and
        (
            ci in ('boston', 'la', 'sf')
            or
            s in ('ca', 'ma')
        )
        and
        (
            q in ('1999-q1', '1999-q2')
        )
        group by y, q, c, s, ci
    union all
        select
            y, q, null, c, s, null, sales, units,
            bitmask(000111, gid) time_gid, bitmask(111000, gid) geog_gid
        from
            con_cube_partial_mv
        where
        (
            gid = 9
        )
        and
        (
            s in ('ca', 'ma')
        )
        and
        (
            q in ('1999-q1', '1999-q2')
        )
) con_cube
```

Observe that in a query written in the form shown in Example 27, the outer predicates are pushed into the UNION ALL query blocks. This approach provides for possible index access to the partial materialized view con_cube_artial_mv; consequently, query response time may be improved.

Not only can the query be rewritten with materialized views stored in one container like con_cube_mv or con_cube_partial_mv, but the query may also be rewritten with MVs stored in multiple containers, like lineage_y_q_m_c_s_ci_mv, lineag_y_q_c_s_mv, lineage_y_c mv. For example, the query of Example 27 can be rewritten in terms of these MVs as follows:

Example 28

```
select y, q, m, c, s, ci, sales, units
from
(
    select
        y, q, m, c, s, ci, sales, units
    from
        lineage_y_q_m_c_s_ci_mv
    where
    (
        ci in ('boston', 'la', 'sf')
        or
        s in ('ca', 'ma')
    )
    and
    (
        m in ('1999-m1', '1999-m2')
        or
        q in ('1999-q1', '1999-q2')
    )
union all
    select
        y, q, m, c, s, null, sales, units
    from
        lineage_y_q_m_c_s_ci_mv
    (
        s in ('ca', 'ma')
    )
    and
    (
        m in ('1999-m1', '1999-m2')
        or
        q in ('1999-q1', '1999-q2')
    )
    group by y, q, m, c, s
union all
    select
        y, q, null, c, s, ci, sales, units,
        bitmask(000111, gid) time_gid, bitmask(111000, gid) geog_gid
    from
        lineage_y_q_m_c_s_ci_mv
    where
    (
        ci in ('boston', 'la', 'sf')
        or
        s in ('ca', 'ma')
    )
    and
    (
        q in ('1999-q1', '1999-q2')
    )
    group by y, q, c, s, ci
union all
    select
        y, q, null, c, s, null, sales, units
    from
        lineage_y_q_m_c_s_ci_mv
    where
    (
        s in ('ca', 'ma')
    )
    and
    (
        q in ('1999-q1', '1999-q2')
    )
) con_cube
```

VII. ADDITIONAL EXAMPLES

Example Schema

The following section shall provide additional examples of embodiments of the invention using a simple star schema as follows:

| Dimension Tables | |
|---|---|
| Time: | Year, Quarter, Month |
| Product: | Total, Division, Category, Product |
| Geography: | World, Region, Country, City |

| Fact Tables | |
|---|---|
| Fact: | Sales, Costs, Month_Key, Product_Key, City_Key |

Categorization of SQL

An end user of an OLAP product may generally think of OLAP data in terms of dimensions and measures. For example, to define an OLAP report, the end user may do the following steps:
 (1) Pick a set of measures (This implies a set of related dimensions).
 (2) Define the required initial selections from the dimensions.
 (3) Lay out the report by placing the dimensions on the row, column, and page edges of the report (Some products have additional edges).
 (4) View the data.
 (5) Modify the report by standard OLAP actions, such as "Drill" and "Pivot."

To respect this end user view, one approach to OLAP is to divide the SQL into two categories. The two categories are described briefly below and in more detail in the following sections.

Dimension Queries—SQL queries that return the selected dimension members.

Measure Queries—SQL queries that return the measure values for the selected dimension members.

Dimension Queries

(1) The Basic Hierarchical Dimension Query

A dimension may have a number of hierarchies, and each hierarchy is the logical union of its levels. A hierarchy may be represented by a single SQL statement. For example, a hierarchy is illustrated in the SQL statement of Example 29.

Example 29

```
SELECT   ed(total, division, category, product) as ed_product
         total,
         division,
         category,
         product,
         GROUPING_ID(total, division, category, product) AS gid
FROM     product
GROUP BY total, ROLLUP (division, category, product)
ORDER BY total ASC NULLS FIRST,
         division ASC NULLS FIRST,
         category ASC NULLS FIRST,
         product ASC NULLS FIRST
```

Many dimension queries may be derived from this simple statement.

(2) Simple Selections

The simplest type of selection happens when the end user explicitly picks values from a list. Note that these values may come from different levels. The SQL may be formed by inlining the basic hierarchy SQL statement and adding a WHERE clause. Note that the WHERE clause must be applied outside of the inline view so that it does not change the meaning of the query. An illustrative example is shown in Example 30.

Example 30

```
SELECT
    product_et, total, division, category, product, gid
FROM
    (SELECT
        (CASE GROUPING_ID(total, division, category, product)
            WHEN 0 THEN product
            WHEN 1 THEN category
            WHEN 3 THEN division
            ELSE total
        END) AS product_et
        total,
        division,
        category,
        product,
        GROUPING_ID(total, division, category, product)
            AS gid
    FROM product
    GROUP BY
        total, ROLLUP (division, category, product)) V1
WHERE
    product_et IN ('Milk', 'Dairy', 'Food')
ORDER BY
    total ASC NULLS FIRST,
    division ASC NULLS FIRST,
    category ASC NULLS FIRST,
    product ASC NULLS FIRST
```

This example takes advantage of the uniqueness of dimension values, so it is not necessary to qualify gid.

(3) Level Selections

Another type of selection occurs when the user asks only for members at a particular level, e.g., a division. The SQL may be formed by selecting members based on the GROUPING_ID column, as shown below in Example 31. Note that while the SQL in Example 31 appears more complex that it needs to be (e.g., a simple GROUP BY could be used rather than the ROLLUP clause), the formulation shown fits better with some of the access structures described herein and is optimized using "Partition Pruning."

Example 31

```
SELECT
    product_et, total, division, category, product, gid
FROM
    (SELECT
        (CASE GROUPING_ID(total, division, category,
        product)
            WHEN 0 THEN product
            WHEN 1 THEN category
            WHEN 3 THEN division
            ELSE total
        END) AS product_et
        total,
        division,
        category,
        product,
        GROUPING_ID(total, division, category, product)
        AS gid
    FROM product
    GROUP BY
        total, ROLLUP (division, category, product)) V1
WHERE
    gid = 3
ORDER BY
    total ASC NULLS FIRST,
    division ASC NULLS FIRST,
    category ASC NULLS FIRST,
    product ASC NULLS FIRST
```

(4) Asymmetric Selections

There are times when two dimension selections will be connected. For example, consider the query that asks for "all products such that the total sales for NY is greater than 100,000 for the current quarter." The following example below lists fictional products in a table that sold more than 100,000 units for three quarters. In this example, the list of products can be seen to vary by quarter. For example, 'Cream' had sales greater than 100,000 in Q2, 2001, but not in the other quarters.

| An Asymmetric Selection | |
|---|---|
| Q1.2001 | |
| Milk | 155,000 |
| Butter | 130,000 |
| Eggs | 110,000 |
| Q2.2001 | |
| Milk | 150,000 |
| Butter | 130,000 |
| Cream | 120,000 |
| Q3.2001 | |
| Milk | 145,000 |
| Eggs | 105,000 |

A selection where one dimension depends upon another, such as the example above, is referred to as 'asymmetric'. An asymmetric selection may be represented by SQL statements that combine more than one dimension query together to form tuples. An application can render the above table based on the information contained in the tuples returned from the query. For example, the application needs to determine from the tuples that it should draw the box around the "Q1.2001" member to be three cells deep, while the box containing the "Q3.2001" member should only be two cells deep.

(5) Drilling

Using the "drill" operation, the user may expand, or "drill down on," any aggregate dimension member to see the elements beneath it. These child members can be added to the list of dimension members selected.

| Example: Drilling on the 2001 member | |
|---|---|
| Before | After |
| 2000 | 2000 |
| 2001 | 2001 |
| 2002 | Q1.2001 |
|  | Q2.2001 |
|  | Q3.2001 |
|  | Q4.2001 |
|  | 2002 |

(A) Hierarchical Drilling

In hierarchical drilling, the selection is ordered "hierarchically," and there are no duplicates. The query of Example 32 is an example of hierarchical drilling. The SQL of Example 32 assumes that "[PRIOR SELECTION]" is an inline view that defines a product selection. (Either of the statements from sections (2) or (3) above can suffice.) The SQL defines two drills—the first on the "Food" member, and the next on the "Dairy" member. The result of this query is that the children of "Food" and "Dairy" will be expanded (or drilled) in the selection.

Example 32

```
SELECT
    product_et, total, division, category, product, gid
FROM
    [PRIOR SELECTION]
UNION
SELECT
    product_et, total, division, category, product, gid
FROM
    (SELECT
        (CASE GROUPING_ID(total, division, category,
        product)
            WHEN 0 THEN product
            WHEN 1 THEN category
            WHEN 3 THEN division
            ELSE total
        END) AS product_et
        total, division, category, product,
        GROUPING_ID(total, division, category, product)
        AS gid
    FROM product
    GROUP BY
        total, ROLLUP (division, category, product)) V1
WHERE
    (CASE GROUPING_ID(total, division, category, product)
        WHEN 0 THEN category
        WHEN 1 THEN division
        WHEN 3 THEN total
        ELSE NULL
    END) IN ('Food', 'Dairy')
ORDER BY
    total ASC NULLS FIRST,
    division ASC NULLS FIRST,
    category ASC NULLS FIRST,
    product ASC NULLS FIRST
```

(B) Order Preserving Drilling

Assume that the original (predrilled) selection is represented by the SQL shown in Example 33, where "[PRIOR SELECTION]" is some inline view and "<V1.order columns>" are the columns that define the ordering of the selection. Note that these columns can define an arbitrary ordering.

Example 33

```
SELECT
    V1.product_et, V1.total, V1.division, V1.category,
    V1.product, gid
FROM
    [PRIOR SELECTION] V1,
ORDER BY
    <V1.order columns>
```

Suppose now that we wish to drill under the 'Dairy' Member, and then under the 'Milk' member, but that we wish to maintain the original ordering of the selection. Only the children are to be ordered hierarchically. The SQL to perform this order preserving drill operation is shown in Example 34.

Example 34

```
SELECT
    V1.product_et, V1.total, V1.division, V1.category,
    V1.product, gid
FROM
    [PRIOR SELECTION] V1,
    (SELECT
        (CASE GROUPING_ID(total, division, category,
        product)
            WHEN 0 THEN product
            WHEN 1 THEN category
            WHEN 3 THEN division
            ELSE total
        END) AS product_et,
        CASE GROUPING_ID(total, division, category,
        product)
            WHEN 0 THEN category
            WHEN 1 THEN division
            WHEN 3 THEN total
            ELSE NULL
        END) AS parent_et,
        total, division, category, product,
        GROUPING_ID(total, division, category, product)
        AS gid
    FROM product
    GROUP BY
        total, ROLLUP (division, category, product)) V2
WHERE V1.product_et = V2.product_et
    OR (V1.product_et = 'Dairy'
    AND
    V2.parent_et IN ('Dairy', 'Milk'))
ORDER BY
    <V1.order columns>
    V2.total ASC NULLS FIRST,
    V2.division ASC NULLS FIRST,
    V2.category ASC NULLS FIRST,
    V2.product ASC NULLS FIRST
```

(C) Asymmetric Drilling

The above method can be modified to handle "asymmetric drilling." This happens, for example, when we wish to drill under 'Dairy' and 'Milk,' but only for the city 'New York.' An example of asymmetric drilling is shown in Example 35.

Example 35

```
SELECT
    V1.product_et, V1.total, V1.division, V1.category,
    V1.product, gid
FROM
    [PRIOR SELECTION] V1,
    (SELECT
        (CASE GROUPING_ID(total, division, category,
        product)
            WHEN 0 THEN product
            WHEN 1 THEN category
            WHEN 3 THEN division
            ELSE total
        END) AS product_et,
        CASE GROUPING_ID(total, division, category,
        product)
            WHEN 0 THEN category
            WHEN 1 THEN division
            WHEN 3 THEN total
            ELSE NULL
        END) AS parent_et,
        total, division, category, product,
        GROUPING_ID(total, division, category, product)
        AS gid
    FROM product
    GROUP BY
        total, ROLLUP (division, category, product)) V2,
    (SELECT
        CASE GROUPING_ID(world, region, country, city)
            WHEN 0 THEN city
            WHEN 1 THEN country
            WHEN 3 THEN region
            ELSE world
        END) AS geog_et,
        world, region, country, city,
        GROUPING_ID(world, region, country, city)
        geog_gid
    FROM
        geography
    GROUP BY
        world, ROLLUP(region, country, city)) V3
WHERE V1.product_et = V2.product_et
    OR (V1.product_et = 'Dairy'
    AND
    V3.geog_et = 'New York'
    AND
    V2.parent_et IN ('Dairy', 'Milk'))
ORDER BY
    <V1.order columns>
    V2.total ASC NULLS FIRST,
    V2.division ASC NULLS FIRST,
    V2.category ASC NULLS FIRST,
    V2.product ASC NULLS FIRST
        Measure Queries
```

(1) Basic Measure Queries

As with dimension queries, there is a canonical base for measure queries. An example of this is shown below.

Example 36

```
SELECT
    SUM(sales) AS sales,
    year, quarter, month, GROUPING_ID(year, quarter,
    month) time_gid,
    total, division, category, product, GROUPING_ID
    (total, division,
```

```
        category, product) prod_gid
        world, region, country, city, GROUPING_ID(world,
        region, country,
        city) geog_gid
    FROM
        fact, time, product, geography
    WHERE
        time_key = time
        AND product_key = product
        AND city_key = city
    GROUP BY
        year, ROLLUP(quarter, month),
        total, ROLLUP(division, category, product)
        world, ROLLUP(region, country, city)
```

This embodiment of the invention views the measure as an entire, or 'solved,' cube. All level combinations are present in this form of the SQL, even if only one level combination is desired. At least some of the optimizations described herein are intended to optimize the performance of this type of query by limiting the actual execution of the query to only a set of desired level combinations. In contrast to relational OLAP (ROLAP), it is the OLAP application's responsibility to managed the level combinations. For example, in such a ROLAP approach, a separate SQL statement may be executed for every level combination desired. Managing the level combinations in this fashion adds to the complexity of writing such a ROLAP application.

(2) IN List Generation

In order to optimally select the correct measure values, the following approach may be used:
(1) Execute the dimension queries to get the selected dimension members, and
(2) Use the list of selected dimension members to define IN list WHERE clauses on the dimension queries.
In the following example, the three dimension queries have returned results:

| | |
|---|---|
| Time: | 2002, Q1.2001, Q2.2001 |
| Product: | Milk, Dairy, Food |
| Geography: | SF, USA |

To generate an optimized SQL query, each dimension member may be categorized by its relevant grouping ID to take advantage of the available access structures and optimizations, as shown in Example 37.

Example 37

```
SELECT *
FROM
    (SELECT
        SUM(sales) AS sales,
        year, quarter, month,
        GROUPING_ID(year, quarter, month) time_gid,
        total, division, category, product,
        GROUPING_ID(total, division, category, product)
        prod_gid
        world, region, country, city,
        GROUPING_ID(world, region, country, city)
        geog_gid
    FROM
        fact, time, product, geography
    WHERE
        time_key = time
        AND product_key = product
        AND city_key = city
    GROUP BY
        year, ROLLUP(quarter, month),
        total, ROLLUP(division, category, product)
        world, ROLLUP(region, country, city)) V1
    WHERE
        (time_gid = 1 AND quarter IN ('Q1.2001',
        'Q2.2001')
        OR
        time_gid = 3 AND year IN ('2002'))
        AND
        (prod_gid = 0 AND product IN ('Milk')
        OR
        prod_gid = 1 AND category IN ('Dairy')
        OR
        prod_gid = 3 AND division IN ('Food'))
        AND
        (geog_gid = 0 AND city IN ('SF')
        OR
        geog_gid = 1 AND country IN ('USA'))
```

(3) Handling Missing Rows

The typical expectation of an OLAP product is that all requested dimension member combinations should appear on the report, even if the measure value is missing or NULL for that combination. Thus, SQL may be separated into dimension queries and measure queries. The end user views the logical cross product of all of the dimension queries. If any particular member combination is missing from the measure query (e.g. the one specified in section (2) above), then the application may render the missing row using a value indicating no data is available, e.g., by using a NULL value.

(4) Calculated Measures

In addition to predefined measures, such as sales and costs, the traditional OLAP application is expected to handle various 'calculated,' or 'derived' measures. Examples of calculated measures include "period ago" and "moving average." In traditional OLAP implementations, the OLAP product generates calculated measures by accessing the local multidimensional data cache. In contrast, embodiments of the invention generate calculated measures by purely using SQL. The SQL for the calculated members is designed to blend in seamlessly with the predefined measures.

For purposes of illustration, a small number of non-limiting, illustrative examples of calculated measure SQL statements are provided below. Most of these examples are standard analytic SQL; however, they have an important distinction in that they are applied to a fully solved cube rather than to a simple fact table.

The SQL in this section follows a number of conventions. [MEASURE] refers to an inline view for a measure query (such as the one in section (1) above), and
[TIME] refers to an inline view for a time hierarchy (similar to the product hierarchy SQL in section (3) above).

Example 38

N Period Moving Average

```
SELECT *,
    AVG (M.sales) OVER (
        PARTITION BY    <other dim keys>, T.gid
```

```
            ORDER BY R
            RANGE BETWEEN N-1 PRECEEDING AND
            CURRENT ROW
        ) moving_ave
FROM    [MEASURE] M,
        (SELECT *,
            ROW_NUMBER( ) OVER(ORDER BY <enddates>) R
        FROM [TIME]) T
WHERE
    SYS_OP_MAP_NONNULL(M.year) =
    SYS_OP_MAP_NONNULL(T.year)
    AND SYS_OP_MAP_NONNULL(M.quarter) =
    SYS_OP_MAP_NONNULL(T.quarter)
    AND SYS_OP_MAP_NONNULL(M.month) = S
    YS_OP_MAP_NONNULL(T.month)
    AND M.time_gid = T.gid
```

In the above example, the term "SYS_OP_MAP_NON-NULL" is a non-ANSI SQL term that refers to a function that joins two NULL values.

Example 39

Period Ago

```
SELECT *,
    FIRST_VALUE (M.sales) OVER (
        PARTITION BY       <other dim keys>, T.gid
        ORDER BY R
        RANGE BETWEEN 1 PRECEEDING AND 1
        PRECEEDING
    ) periodAgo
FROM [MEASURE] M,
    (SELECT *,
        ROW_NUMBER( ) OVER(ORDER BY <enddates>) R
    FROM [TIME]) T
WHERE
    SYS_OP_MAP_NONNULL(M.year) =
    SYS_OP_MAP_NONNULL(T.year)
    AND SYS_OP_MAP_NONNULL(M.quarter) =
    SYS_OP_MAP_NONNULL(T.quarter)
    AND SYS_OP_MAP_NONNULL(M.month) =
    SYS_OP_MAP_NONNULL(T.month)
    AND M.time_gid = T.gid
```

Example 40

Year Ago

```
SELECT *,
    FIRST_VALUE (M.sales) OVER (
        PARTITION BY      <other dim keys, T.gid>
        ORDER BY T.startDate
        RANGE BETWEEN NUMTOYMINTERVAL(1,'year')
        PRECEDING AND
        NUMTOYMINTERVAL(1,'year')
    PRECEDING
    ) yearAgo
FROM [MEASURE] M,
    [TIME] T
WHERE
    SYS_OP_MAP_NONNULL(M.year) =
    SYS_OP_MAP_NONNULL(T.year)
    AND SYS_OP_MAP_NONNULL(M.quarter) =
    SYS_OP_MAP_NONNULL(T.quarter)
    AND SYS_OP_MAP_NONNULL(M.month) =
    SYS_OP_MAP_NONNULL(T.month)
        AND M.time_gid = T.gid
```

In the above example, the term "FIRST_VALUE" is a non-ANSI SQL term that refers to a function that selects the first row from a group, and the term "NUMTOYMINTERVAL" is a non-ANSI SQL term that refers to a function that converts a number to an INTERVAL YEAR TO MONTH literal, based upon a specified unit.

Example 41

Ancestor Share (Defined as Sales/Sales for Current Year*100)

```
SELECT *,
    M. sales /
    FIRST_VALUE (
        CASE T.gid
            WHEN 3 THEN M.sales
            ELSE NULL
        END ) OVER (
            PARTITION BY        <other dim keys, T.Y>) *
            100 ancestorShare
    FROM    [MEASURE] M
```

Optimizations

There are a number of potential optimizations that may be used to improve performance when formulating OLAP SQL, including but not limited to, those described below.

(1) Partition Pruning

The SQL optimizer explicitly looks for predicates of the form
    GID=constant
where GID is an expression of the form GROUPING_ID (level 1, . . . , level N) and where level1, . . . , level N were level columns that took part in an earlier GROUP BY ROLLUP or GROUP BY GROUPING SETS clause. If it finds such a predicate then it analyzes the constant to calculate which of the possible grouping set combinations can make their way into the final result. Any groupings that will fail automatically this test can be 'pruned' from the query.

For example, suppose the query includes a GROUP BY clause as follows:
GROUP BY year, ROLLUP(quarter, month)
    This clause defines three separate groupings:
    (1) year
    (2) year, quarter
    (3) year, quarter, month
If the expression GID is defined as GROUPING_ID(year, quarter, month), then the definition of GROUPING_ID means that GID can only take three values, 3, 1, and 0. These values correspond precisely to the three separate groupings listed above.

Suppose now that there is a predicate of the form
    GID=1
The SQL optimizer will analyze this predicate and determine that the only grouping that can satisfy this predicate is (year, quarter). In particular there is no need to calculate the groupings (year) and (year, quarter, month) and these groupings (also known as "partitions") are removed, or "pruned", from the query.

Due to the above, the generated SQL will be more performant if it includes predicates of the form GID=constant wherever this is appropriate. Note that the form of the predicate is important. For example, even simple modifications of this predicate, such as "GID+0=3" or "GID=3+0", will not be optimized in this way.

(2) Predicate Replication

When formulating OLAP SQL, one can "replicate predicates." The addition of this optimization to the SQL can make a difference to the performance of the query. For example, there are examples of queries that may require days to process without the replication, but may be able to be processed in the same computing environment in a few seconds with it.

The essence of predicate replication is that if you have a predicate of the form:
 GID_1=constant
 AND GID_1=GID_2,
then you should 'replicate' the GID_1=constant predicate to GID_2 to obtain:
 GID_1=constant
 AND GID_1=GID_2
 AND GID_2=constant
The newly "replicated predicate", GID_2=constant, is added here to reap the benefits of "partition pruning" as described in section [0166] above. Without the replication the SQL optimizer would not itself be able to derive the constant restriction on GID_2.

The same holds true for "level" columns. For example, the predicate:
 month_1='Jan.2000'
 AND SYS_OP_MAP_NONNULL(month_1)=
 SYS_OP_MAP_NONNULL(month_2)
may be 'replicated' to create the logically equivalent, but more efficient:
 month_1='Jan.2000'
 AND SYS_OP_MAP_NONNULL(month_1)=
 SYS_OP_MAP_NONNULL(month_2)
 AND month_2='Jan.2000'
In this case the newly replicated predicate, "month_2='Jan.2000'", will give the SQL optimizer a chance to use any predefined indexes on the column month_2. In addition the requirement that the column has an explicit non NULL value may allow the optimizer to prune away any groupings in which month_2 is guaranteed to be NULL.

X. INTER-ROW CALCULATIONS

For explanation purposes, techniques for providing spreadsheet-like computations within a database system are described in reference to extending the Structured Query Language (SQL). However, the described methods and systems may be applied to other database and/or query languages. Thus, the provided examples are not to be construed as limiting embodiments of the inventions to any particular database and/or query language.

For example, in certain embodiments, a query language, such as SQL, is extended to include new SQL clauses to partition a table (or a result of a query) and to perform array-like computations within a partition for providing the following new features:

(1) Symbolic cell addressing. The SQL language is extended to allow columns in individual rows to be treated like cells that can be referenced (and updated) symbolically. For example, in a fact table (region, year, sales), a user can directly reference sales for a given region and year, (e.g., sales[region='west', year=1998]). As depicted, the cells may be referenced symbolically, thus improving on the typical spreadsheet application.

(2) Symbolic array computation. The SQL language is extended to allow a user to specify a series of assignments in a manner that is similar to the spreadsheet formulas. In one embodiment, the SQL extensions allow users to perform operations on individual cells and/or on ranges of cells. In certain embodiments, the SQL extensions support new clauses for aggregating data over a range of cells. For example, the SQL extensions provide for the following the new SQL clauses:

$$s[r=\text{'west'}, y=2000] = s[r=\text{'west'}, y=1999] + s[r=\text{'west'}, y=1998],$$

$$s[r=\text{'east'}, y=2000] = \max(s)[r=\text{'west'}, y \text{ between } 1997 \text{ and } 1999]$$

(3) Shorthands. Shorthands are provided for expressiveness. For example, a shorthand may be provided that allows positional referencing, for example, s['west', 2000] instead of s[r='west', y=2000]. Additionally, a shorthand may be provided that allows for updating multiple cells on the left side using a single assignment rule (akin to spreadsheet macros). For example, the SQL language may be extended to provide for the shorthand s[r=*, y=2000]=s[current(r), 1999] which can be used to assign to all regions (r) in year 2000, sales values (s) as of the year 1999. In this example, the relative addressing is effected by the function current(r) which passes the region values from the left to the right side.

(4) Automatic expression ordering. In certain embodiments, similarly to spreadsheets, expressions in the spreadsheet clause are automatically ordered based on dependencies between cells. For example, given the expressions $$s[r=\text{'west'}, y=2000] = s[r=\text{'west'}, y=1999] + s[r=\text{'west'}, y=1998],$$

$$s[r=\text{'west'}, y=1999] = 50000,$$

$$s[r=\text{'west'}, y=1998] = 40000$$

the last two assignments are processed first.

(5) Scalability of computation. In certain embodiments, the SQL language is extended to allow a user to partition the data and to perform a set of array computations in parallel within a partition. For example, for the expression

```
partition by r dimension by t
(
    s[t=2000] = avg(s)[t between
    1990 and 1999]
)
``` the data is partitioned by a region r and within each partition (which may be processed in parallel) a prediction of the sales in the year 2000 is calculated based on the number of average sales in the years between 1990 and 1999. This partitioning function provides an increase in scalability that does not typically exist in spreadsheet applications.

(6) Recursive model solving. Similarly to spreadsheets, the SQL language is extended to provide for solving recursive references. For example in:

```
dimension by x iterate (4)
(
    s[x=1] = s[x=1]/2
)
``` execution of the operation repeats the recursive s[x=1]:=s[x=1]/2 assignment four (4) times. In certain embodiments, the termination of recursion can be based on the number of specified cycles and/or a particular convergence criteria. This type of operation may be useful in a variety of different business applications.

(7) Stored models. In certain embodiments, a new spreadsheet clause can either appear in a query directly or it can be named, stored and applied to a query later. This gives a user the ability to store business models directly in RDBMS. Thus, causing data and models to reside under a single RDBMS management (including security), potentially making the integration of business models easier. In one embodiment, two mechanisms are provided for storing models: the parameterized view and the spreadsheet template. These models can be useful outside of the Online Analytical Processing (OLAP) context as they provide a way of separating computation from the data that conventional SQL does not support. For example, a parameterized view will allow a user to pass a table or a query block to a view as a parameter. In this case, the view will specify a "computation done" on the parameter so that during view invocation "real" data can be passed by providing a table name or a query.

(8) Materialized views. In certain embodiments, queries with a spreadsheet clause can be stored in a materialized view. Thus, causing a change to the data to result in an automatic maintenance of the model.

Spreadsheet Addressing in SQL

Provided below are examples of how SQL can be extended to include spreadsheet-like operations. For explanation purposes, several of the examples use a fact table with time, product, and region dimensions and one measure sales: fact(t, p, r, s). It should be noted that, although specific examples have been provided for explanation purposes, embodiments of the invention are not limited to any particular example.

Spreadsheet Clause

In multidimensional applications, a fact table generally consists of columns that uniquely identify a row, along with other information that serves as dependent measures or attributes. In one embodiment, a new SQL clause is provided ("spreadsheet clause"), which divides the identifying columns into "partitioning" and "dimension" columns. The dimension columns uniquely identify a row within a partition and serve as array indexes to measures within it. In certain embodiments, the spreadsheet clause includes a list of updates that represent array computation within a partition and which is a part of an SQL query block. For example, the spreadsheet clause structure may be as follows:

```
<existing parts of a query block>
PARTITION BY <cols> DIMENSION BY <cols>
         [ORDERED] [UPSERT | UPDATE |
         UPDATEIF]
         [IGNORE NAV]
         [ITERATE (n) [UNTIL <condition>]]
(
     <update rule>, <update rule>,..., <update rule>
)
```

In this example, each <update rule>("rule") represents an assignment and contains (1) a left side which references a cell (or a range of cells) and (2) right side which contains expressions involving constants, host variables, individual cells or ranges of cells within the partition.

For example, the query

```
Q1    select r, p, t, sum(m) as s, count(m) as c
      from fact
      group by r, p, t
      partition by r dimension by p, t upsert
      (
          s[p='wine', t=2000] = s[p='wine', t=1999],
          s[p='beer', t=2000] = s[p='beer', t=1998] +
          s[p='beer', t=1999]
      )
``` takes the result of the SELECT . . . GROUP BY . . . operation, and then partitions it by region r and predicts that within each region sales of wine in 2000 will be the same as in 1999 and sales of beer in 2000 will be the sum sales in 1998 and 1999.

In one embodiment, the spreadsheet clause operates on the result of the SELECT . . . GROUP BY . . . query without updating any base table. Optional ORDERED UPSERT, etc. sub-clauses are described in detail below.

Cell References

A reference to a cell should qualify all dimensions in the partition and can use either symbolic or positional referencing. Using a symbolic reference, a single dimension is qualified using a boolean condition, as for example:

$s[p=\text{'wine'}, t=2000]$ or $s[p \text{ is null}, t=2000]$

In general, there as many conditions inside the "[ ]" brackets as there are dimensions in the DIMENSION BY clause. A single condition can qualify only one dimension and can be any single column predicate. For example, d=<value>, d is null, d {>,>=,<,<=,< >}<value>, d in <list of values>, d between <value> and <value>, d like <value>. In certain embodiments, a restriction is placed on the conditions such that sub-queries are not allowed. For example, d=<value> selects a single cell. Alternatively, other conditions may be used for selecting multiple cells.

In certain embodiments, for a positional reference, a dimension is implied by its position in the DIMENSION BY clause and is qualified by an expression. For example, for the spreadsheet clause DIMENSION BY (p, t), the reference $s[\text{'wine'}, 2000]$ $s[\text{null}, 2000]$ is equivalent to s[p='wine', t=2000] and s[p is null, t=2000]. In addition, positional and symbolic referencing can be mixed, for example, s['wine', t=2000] is legal. However, in certain embodiments, to ensure consistency in both symbolic and positional referencing, a dimension d must appear in its position as indicated by the DIMENSION BY clause. Thus, for DIMENSION BY (p, t), the clause s['wine', t=2000] is legal while the clause s[t=2000, 'wine'] is generally not legal.

In certain embodiments of the inventions, the conditions qualifying the dimensions of an operation can use constants and host variables as well. Frequently, dimensions on the right side are determined by dimensions on the left side, as in for example:

$s[p=\text{'beer'}, t=2000]=s[p=\text{'beer'}, t=1998]+s[p=\text{'beer'}, t=1999]$ A short hand notation is provided which will cause dimensions on the right side to default to the dimensions that are provided on the left side, thus potentially making the assignments less error prone. In one embodiment, the "." notation is used as the shorthand notation. For example, for the above clause, using the "." shorthand notation, the clause may be expressed as:

$$s[p=\text{'beer'},t=2000]=s[.,t=1998]+s[.,t=1999]$$

In addition, as in other SQL expressions, functions can be applied to expressions on the right hand side of an assignment. For example, in the expression:

$$s[p=\text{'beer'},t=2000]=\text{ceil}(s[p=\text{'beer'},t=1998])$$

the functions is applied to the expression on the right hand side of the assignment.

Range References on the Right Hand Side

In certain embodiments, the SQL language is extended to allow a reference to a set of cells on the right hand side of a rule. In one embodiment, an aggregate operation, such as sum or count, must be applied to that set. To reference a set along a dimension d, a boolean condition is used on one dimension of column d, for example d BETWEEN . . . or d IN . . . or d LIKE . . . d {>,>=,<,<=,<>} . . . etc. For example:

$$s[p=\text{'wine'},t=2000]=\text{avg}(s)[p=\text{'wine'},t \text{ between } 1990 \text{ and } 1999]$$

In general, range references on the right hand side never generate new rows, but instead loop over the existing rows. For example, if in the above rule there are rows with even values of t=1990, 1992, . . . , 1998, but no rows with odd values of t=1991, 1993, . . . , 1999, only the existing even values of t will contribute to the aggregate. In certain embodiments, the aggregate operation can be applied to more than one measure. For example, assume that in addition to sales, s, for each row a weight w is also stored that indicates how much a given year should contribute to a prediction. Then, for the expression:

$$s[p=\text{'wine'},t=2000]=\text{avg}(s*w)[p=\text{'wine'},t \text{ between } 1990 \text{ and } 1999]$$

a sum of the weighted sales in the years between 1990 and 1999 is calculated. In addition, in certain embodiments, an open ended range may be provided using a relational operator {e.g., >,>=,<,<=,<>}. For example, as in the expressions:

$$\text{sum}(s)[p=\text{'wine'},t<1999]$$

sums all years in the partition less than 1999.

In one embodiment, a special notation, for example "*", is provided for an open range on both sides of the expression. For example, the expression $$\text{sum}(s)[p=\text{'wine'},*]$$

sums all years in the partition where product is wine.

In a further embodiment, another way to specify a range of cells is to enumerate a list of cell references enclosed in parenthesis. For example, as in the expressions:

$$[(p=\text{'wine'},t=1998),(p=\text{'wine'},t=1999), \ldots ]$$

or possibly more simply:

$$[(\text{'wine'},1998),(\text{'wine'},1999), \ldots ].$$

These expressions are equivalent to the set produced by the predicate: (p='wine', t=1998) OR (p='wine', t=1999) OR . . . .

Still further, a rule can be expressed as:

$$\text{avg}(s)[(p=\text{'vodka'},t=1990),(p=\text{'wine'},t=1998),(p=\text{'beer'},t=1999)]$$

In one embodiment, when a range of cells is referenced on the right side, existing aggregates (sum, avg, count) are allowed which don't explicitly specify an ordering. In certain embodiments, aggregate functions cannot contain the DISTINCT option. For window functions and inverse distribution functions an ordering of cells is required to properly perform the operations.

In one embodiment, the rules for evaluating an expression on the right hand side are the same as for the non-extended version of the SQL. For example, if a cell evaluates to null or is missing, the result of an expression is null unless it is included in an aggregate where nulls are ignored. To illustrate this point, if a record for the year 1998 is not recorded, then the expression:

$$s[p=\text{'beer'},t=2000]=s[p=\text{'beer'},t=1998]+s[p=\text{'beer'},t=1999]$$

returns value of null. Alternatively, for the following expression, which includes an aggregate, a non-null value is returned since at least one cell in the set evaluates to a non-null value:

$$s[p=\text{'beer'},t=2000]=\text{avg}(s)[p=\text{'beer'},t \text{ between } 1998 \text{ and } 1999]$$

In certain embodiments, the spreadsheet clause includes the UPSERT semantic by default. In one embodiment, if the row representing the left hand side of an assignment is present in the table, the indicated cell is updated; otherwise, a new row is created. For example, if for the following query,

```
Q2   select p, r, t, sum(m) as s, count(m) as c
     from fact
     group by p, r, t
     partition by r dimension by p, t UPSERT
     (
        s['wine', 2000] = s['wine', 1999],
        s['beer', 2000] = avg(s)['beer', t between 1990 and 1999]
     )
``` no rows with the year 2000 exist, two new t=2000 rows per every region (one row for 'wine' one for 'beer') are created in the output. In addition, for the new rows, columns that have not been assigned values are set to null. For example, if the SELECT . . . GROUP BY . . . part of the above query is as depicted in Table 300 of FIG. 3A, then, after applying the spreadsheet clause, the information contained in Table 300 will be updated, as reflected in Table 350 of FIG. 3B, to include new rows 360, 362, 364 and 366.

Looping Constructs on the Left Hand Side

The previous examples have been depicted with the left hand side of an assignment as having a single cell. However, in certain embodiments, an assignment may be performed where the left hand side is a range of cells. In one embodiment, for each left hand side that consists of a range of cells, the right hand side is re-evaluated. However, to perform this function, it is generally necessary to be able to perform relative indexing with respect to the left side. In certain embodiments, a special function, current( ), is introduced which returns the current value of a dimension from the left side. This special function can then be used on the right side of an assignment. For example, consider the following expression:

$$s[p=\text{'beer'},t=2000]=s[\text{current}(p),t=1998]+s[\text{current}(p),t=1999]$$

In this example, the right hand side includes a reference to current(p) which assumes a current value of product p on the left hand side (i.e., 'beer'). Thus, the expression above is equivalent to:

$$s[p=\text{'beer'},t=2000]=s[p=\text{'beer'},t=1998]+s[p=\text{'beer'},t=1999]$$

and which is equivalent to:

$$s[p=\text{'beer'},t=2000]=s[current(p),t=current(t)-2]+s[current(p),t=current(t)-1]$$

Additionally, in certain embodiments, a shorthand notation for the current( ) function may be denoted by ".", as illustrated in the following example:

$$s[p=\text{'beer'},t=2000]=s[.,t=1998]+s[.,t=1999]$$

It is noted that relative indexing may be complemented with looping constructs on the left side. To address this issue, in certain embodiments, two constructs, existential and qualified loops, are provided. For example, an existential looping construct on the left side specifies a range of existing cells using single column predicates like 't between 1990 and 1999' or 't like "199%".' These constructs are used to qualify existing rows. Thus, a range on the left can be designated and relative indexing may be used on the right. For example, consider the following assignment:

$$s[p=\text{'beer'},t \text{ between } 2000 \text{ and } 2005]=s[\text{'beer'},t=current(t)-2]+s[\text{'beer'},t=current(t)-1]$$

For explanation purposes, assume that the data contains values for odd years only, (i.e., t=2001, 2003, and 2005). Then, the right side represents, for each existing year, the sum of two previous years. For example, for year 2001 it will be the sum of year 1999 and 2000.

In addition, in certain embodiments, for numerical, date and string ranges, qualified loops are provided which designate the cells using increments. For example, the SQL can be extended so that existing BETWEEN <v1> AND <v2> clauses are extended to BETWEEN <v1> AND <v2> INCREMENT <n> clauses to allow discrete increments within a range. Additionally, existing LIKE clauses can be extended to LIKE <string with single %> INCREMENT <n>. For example, consider the assignment:

$$s[p=\text{'beer'},t \text{ between } 2000 \text{ and } 2005 \text{ increment } 1]=s[\text{'beer'},t=current(t)-2]+s[\text{'beer'},t=current(t)-1]$$

In this example, the left side designates a range of years between 2000 and 2005 with an increment 1 (i.e., years 2000, 2001, 2002, 2003, 2004, and 2005). Thus, by default, if the data contains values for odd years, for example, t=2001, 2003, and 2005, the odd years will be updated and additional rows will be created for the missing years t=2000, 2002, and 2004.

In the above example, the right side represents, for each year, the sum the two previous years. For example for year 2002, it will be the sum of year 2000 and 2001. However, the above assignment can also be expressed also using an aggregate such as:

```
s[p='beer', t between 2000 and 2005 increment 1] =
    sum(s) ['beer', t between current(t)-2 and current(t)-1]
```

Thus, given this query:

```
Q3   select p, r, t, sum(m) as s, count(m) as c
     from fact
     group by p, r, t
     partition by r dimension by p, t upsert
     (
         s['beer', t between 2000 and 2005 increment 1] =
             sum(s)['beer', t between current(t)-2 and current(t)-1]
     )
``` and the initial data of SELECT . . . GROUP BY . . . as presented in Table 400 of FIG. 4A, execution of the query will generate new rows 450, 452, 454, 456, 458 and 460, as reflected in Table 462 of FIG. 4B.

With regards to this example, the d BETWEEN <v1> AND <v2> INCREMENT <n> is semantically equivalent to (FOR d=<v1> TO <v2>d+<n>). Thus, in this example, d BETWEEN 2005 AND 2000 INCREMENT−1 designates rows d=2005, 2004, . . . 2000 in that order and d BETWEEN 2005 AND 2000 INCREMENT 1 designates an empty range.

Additionally, the INCREMENT operator applies to all data types for which addition & subtraction is supported, i.e., numeric and date types. For the latter, increments of the interval type may be used.

Still further, the LIKE <string with single %> INCREMENT <n> assumes that <string with single %> contains only one '%' character. It replaces '%' with character correspondent of <n> during execution. For example, consider this assignment:

$$s[p=\text{'beer'},y=2000,\text{quarter like } \text{'}Q\%\text{'} \text{ between } 1 \text{ and } 4 \text{ increment } 1]=s[\text{'beer'},y=1999,current(\text{quarter})]$$

Here, the left side designates rows where y=2000 and quarter is 'Q1', 'Q2', 'Q3' 'Q4' while the right side designates rows where year=1999 and quarters as designated on the left side.

In certain embodiments, the current( ) function can be specified only for the same dimension. Thus, the expression $$s[p=\text{'beer'},t \text{ between } 2000 \text{ and } 2005 \text{ increment } 1]=\text{avg}(s[\text{'beer'},t \text{ between } current(t)-1 \text{ and } current(t)-2])$$

is legal (i.e., for each year between 2000 and 2005, an average is calculated for the sales of the two previous years). However, the expression $$s[p=\text{'beer'},t \text{ between } 2000 \text{ and } 2005 \text{ increment } 1]=\text{avg}(s)[\text{'beer'},t \text{ between } current(p)-1 \text{ and } current(p)-2]$$

is not legal as it mixes dimension t and p.

In certain embodiments, other conditions that designate ranges of cells can be used on the left hand side. For example, to double beer sales for all recorded years>1999 the following expression can be used:

$$s[p=\text{'beer'},t>1990]=2*s[p=\text{'beer'},current(t)]$$

In this example, a slight difference is observed between 't between 2000 and 2005' and 't between 2000 and 2005 increment 1.' In particular, the former will operate only on the existing data, i.e., for rows with t=2000, 2004, 2005, it will loop through those three years only. However, in the later, a loop through all years between 2000 and 2005 will be performed.

In certain embodiments, the looping on the left hand side can be specified for more than one dimension. For example, for the expression:

$$s[p \text{ in } (\text{'beer'},\text{'wine'}),t \text{ between } 2000 \text{ and } 2005 \text{ increment } 1]=\text{avg}(s)[current(p),t \text{ between } current(t)-1 \text{ and } current(t)-2]$$

all combinations will be tried and the order of evaluation will be determined by a nested loop starting from the left-most dimension. For example, for the above case, in evaluating the expression, the system first fixes p='beer' and iterate through the 2000, . . . , 2005 years, and then fixes p='wine' and then iterate through these years again.

In general, the qualified looping constructs BETWEEN <v1> AND <v2> INCREMENT <n> can only appear in the spreadsheet clause. The <n> parameter can assume negative values resulting in descending loops. In addition, the qualified looping constructs can be referenced on the right side of a rule. In such a case, the parameters imply a range of cells and thus an aggregate operator must be applied to them. For example, the expression:

s[p='beer',t=2000]=avg(s)['beer',t between 1990 and 1998 increment 2]

predicts sales of beer in 2000 to be the average of sales in even years between 1990 and 1998.

Treatment of Nulls and Missing Values

In certain popular spreadsheets, an un-initialized cell in a numeric expression is treated as a zero ("0"), which provides a convenient programming simplification (i.e., there is no need to test for un-initialized cell, etc). Here, certain embodiments of the invention are required to address two types of undetermined values. One is a NULL value in the existing cells and the other is a non-determined value from a missing cell.

In one embodiment, NULLs are treated the same as with everywhere else in SQL. Missing values are treated as NULLs in direct cell references and as non-existing values in aggregates (similarly to SQL treatment of NULLs).

For example, if in the expression, s['beer',2000]=s['beer',1998]+s['beer',1999]

the row ['beer',1999] is missing, then the resulting expression is NULL. However, for the expression, s['beer',2000]=sum(s)['beer',t between 1998 and 1999]

the missing row is ignored.

In certain cases it may be desirable to distinguish between an existing NULL value and a missing value. For such cases, a predicate may be introduced to resolve the issue. For example, the IS PRESENT(<cell>) predicate may be set to TRUE if the row indicated by the <cell> reference existed BEFORE the execution of the spreadsheet clause. Here, it is noted that the IS PRESENT clause relates to the state before the execution of the spreadsheet clause.

For example, in executing the query:

```
select p, r, t, sum(m) as s, count(m) as c
from fact
group by p, r, t
partition by r dimension by p, t
(
    s['wine',2000] =
        case when is present s['wine', 1999]
            then ['wine', 1999]
            else 0
        end
)
``` the query first checks whether or not the row with [p='wine', t=1999] exists, and if so, uses the information within the row.

A variation on the "is present" predicate is the "presentv" function. It accepts a cell and two expressions e1 and e2, for example "presentv(cell, e1, e2)". If the row containing the cell is determined to exist, it returns e1, otherwise it returns e2. Thus, substituting the "presentv" function in the above query, the query can be expressed as:

s['wine',2000]=presentv(s['wine',1999],s['wine', 1999],0)

Another potentially useful variation of the "is present" predicate is the "presentnnv" (present & not null) function, for example "presentnnv(cell, e1, e2)". The "presentnnv" function checks if the cell is present and not null and is equivalent to:

case when is present <cell> and is not null <cell>
    then <e1>
    else <e2>
end This function can be used to emulate the behavior of some multidimensional tools; if the cell existed and has non-null data, leave it alone, otherwise create it (if didn't exit) and assign a value. For example:

s['wine',2000]=presentnnv(s['wine',2000],s['wine', 2000],200)

In certain embodiments, the "is present" predicate and the presentv and presentnnv functions are available only inside the spreadsheet clause and outside usage will generate an error condition. Although the "is present" and "is null" predicates can be used for testing the existence and null state of each cell, it is generally cumbersome to use. To address this, an option on the spreadsheet clause called IGNORE NAV may be introduced which provides a spreadsheet like behavior for missing and null values. When this option is specified, null and missing value for numeric & date data default to zero ("0") and the string data defaults to an empty string. For example for the expression,

```
select p, r, t, sum(m) as s
from fact
group by p, r, t
partition by r dimension by p, t ignore NAV
(
    s['beer', 2000] = s['beer', 1998] + s['beer', 1999]
)
``` if s['beer', 1998] is missing or null, it will default to zero ("0") for arithmetic operations.

Update Options

In one embodiment, the updates in the spreadsheet clause default to the upsert semantic (i.e., if the cell pointed by the left side exists, then it is updated, otherwise a new row containing that cell is generated). In certain embodiments, this default can be changed to the update semantic by specifying the UPDATE or UPDATEIF options.

Using the UPDATE option, if the left hand side of the assignment does not exist, then a (run time) error is generated. Alternatively, using the UPDATEIF option, if the left hand side does not exist, then the assignment is ignored.

For example, in the query:

```
select p, r, t, sum(m) as s
from fact
group by p, r, t
partition by r dimension by p, t updateif
(
    s[p = 'wine', t=2000] =
        s[current(p), t=1999] + s[current(p), t=1998]
)
``` if a row with [p='wine', t=2000] does not exist, the assignment is ignored.

Rules for the Spreadsheet Clauses

This section provides further examples of how the SQL language is extended for implementing rules in the spreadsheet clause. In general, the columns in the spreadsheet clause (i.e. columns in PARTITION/DIMENSION BY) must form a key to the query. Users can assure that by placing the GROUP BY/DISTINCT in the query or by creating unique key constraints on the tables in the query. If these two compile time recognizable conditions are not satisfied, a uniqueness verification step will be performed during run time which will add overhead to the system, thus potentially affecting its performance.

In certain embodiments, the only columns that can be updated inside the spreadsheet clause are columns that are not in the PARTITION BY/DIMENSION BY list. The columns in the spreadsheet clause can be expressions provided that they are aliased in the SELECT clause of the query. For example, to express that sales in the third millennium will be an average of sales in first and second millennium, the following query may be used:

```
select r, ceil(t/1000) as millennium, sum(m) as s
from fact
group by ceil(t/1000)
partition by r dimension by millennium upsert
(
    s[millenium=3] = avg(s) (millennium between 1 and 2)
)
```

As illustrated, the spreadsheet clause can use aliases from the SELECT list of the query. Additionally, the spreadsheet clause is a part of a query block. Thus, it can be used everywhere a query can be used (i.e. in views, in-line views, subqueries, etc).

In general, the spreadsheet clause is evaluated after all clauses, except for the ORDER BY clause, of a query block have been evaluated, including window functions. The ORDER BY clause is executed last.

For example, in the query,

```
select p, r, t, s
from
(
    select p, r, t, sum(m) as s
    from fact
    group by p, r, t
    partition by r dimension by p, t upsert
    (
        s['wine increase 90–99', 2000] =
            reg_slope(s, t) ['wine', t between 1990 and 1999],
        s['wine', 2000] =
            s['wine', t=1999] * (1+s['wine
            increase 90–99', 2000])
    )
)
where p < > 'wine increase 90-99'
``` the inner query contains the spreadsheet clause. This clause has a temporary variable s[p='wine increase 90-99'] which represents a change in wine production between 1990 and 1999. It may be calculated using the reg_slope aggregate function. The temporary variable that is generated is then used to calculate wine sales in year 2000: s[p='wine', t=2000]. However, in the outer query, the temporary variable is not needed and thus may be filtered out.

Order of Evaluation of Cells within Spreadsheet Clause

Similarly to spreadsheets, the order of evaluation or rules is typically determined using a dependency graph. A cell c1 which depends on other cell c2 will be evaluated after all rules for c2 has been computed.

For example, in the query:

```
select p, r, t, sum(m) as s, count(m) as c
from fact
group by p, r, t
partition by r dimension by p, t upsert
(
    s[r='west',y=2000] = s[r='west',y=1999] +
    s[r='west',y=1998],
    s[r='west',y=1999] = 50000,
    s[r='west',y=1998] = 40000
)
``` cell s[r='west', y=2000] depends on cells s[r='west', y=1999] and s[r='west', y=1998]. Thus, the latter two cells will be evaluated first.

In certain cases, a user can force the specified order of evaluation by providing the ORDERED keyword in the spreadsheet clause. For example in the query:

```
select p, r, t, sum(m) as s
from fact
group by p, r, t
partition by r dimension by p, t ordered upsert
(
    s[r='west',y=2000] = s[r='west',y=1999] + s[r='west',y=1998],
    s[r='west',y=1999] = 50000,
    s[r='west',y=1998] = 40000
)
``` the assignments are performed in the specified sequence. If ORDERED is not present, only one rule can assign to the same cell in the spreadsheet.

Cycles and Simultaneous Equations

Similarly to spreadsheets, the described computations may contain cycles. For example, the query:

```
select x, s
from (select 1 as x, 1024 as s from dual)
dimension by x update
(
    s[1] = s[1]/2
)
``` performs a recursive calculation, s[1]:=s[1]/2, which raises the termination question. In this example, the initial value for s=1024 has been provided by the inner select.

Cycles are not normally allowed in the spreadsheet clause and will typically be detected and result in an error. However, cycles are allowed in the spreadsheet clause if the explicit ITERATE subclause is specified. This clause can either specify a number of iterations to be performed or some convergence condition to be met.

For example, the ITERATE(4) clause:

```
select x, s
from (select 1 as x, 1024 as s from dual)
```

```
    dimension by x update iterate (4)
    (
        s[1] = s[1]/2
    )
``` will iterate 4 times over the s[1]:=s[1]/2. Thus the query will return a single tuple (1, 64). In this example, the ITERATE clause accepts a positive numeric constant as a parameter.

Similarly to spreadsheets, using the pre-update state and the post update state of a cell, a condition can be specified as to when to terminate a recursion. For example, in one embodiment, a new UNTIL <condition> subclause is provided for allowing the termination of recursion. The <condition> can reference "s" pre- and post-update values of a cell and is evaluated after each iteration completes. Thus, a delta change of a cell can be determined and can serve as a convergence criteria. In certain embodiments, a new function, "previous (<cell>)", returns a value of <cell> as the start of each iteration. The UNTIL clause must be used with the ITERATE clause to guarantee that computation will terminate.

For example, in the query,

```
    select x, s
    from (select 1 as x, 1024 as s from dual)
    dimension by x iterate (1000) until (previous(s[1])-s[1] < 1)
    (
        s[1] = s[1]/2
    )
``` the spreadsheet clause will execute 10 times. The parameter "s" will start with an initial value of 1024 and will iterate until the previous value of "s," minus its current value is less than one ("1") (i.e., in this example, ten times).

The described mechanism can be used for simultaneous equations. As usual, for the ITERATE clause, the order of evaluation of rules is given by their order in the spreadsheet clause. Thus for example, in the query:

```
    select x, s
    from (select 1 as x, 10 as s from dual
          union all
          select 2 as x, 20 as s from dual)
    dimension by x update iterate (2)
    (
        s[1] = s[2] + 1,
        s[2] = s[1] * 2
    )
``` rules s[1]=s[2]+1 and s[2]=s[1]*2 reference each other cells.

In this example, the initial value for s[1]=10 and s[2]=20. The rule s[1]=s[2]+1 is first executed followed by s[2]=s[1]*2. After two iterations, s[1]=43 and s[2]=86.

In many scenarios it is convenient to have the iteration number at hand for programming purposes. In one embodiment, a new system variable SYSITERATE is introduced which assumes integer values and stores the iteration number of the spreadsheet clause. The system variable SYSITERATE starts at value of zero ("0") and can be used only within the spreadsheet clause; outside usage resulting in an error condition. In certain embodiments, SYSITERATE can serve a "simple" array looping construct. For example, the query:

```
    select p, r, t, sum(m) as s, count(m) as c
    from fact
    group by p, r, t
    partition by r dimension by p, t upsert iterate(10)
    (
        s[r='west',y=2000+SYSITERATE] =
        s[r='west',y=1990+SYSITERATE]
    )
``` will copy sales in region 'west' from 1990-1999 to cells 2000-2009.

Materialized Views and Spreadsheet Clause

The spreadsheet clause, being part of a query block can be used in materialized views (MVs). In certain embodiments, a materialized view with a spreadsheet clause can only be refreshed with complete refresh. Different algorithms may be used for performing the incremental refreshes.

Rewrite with MVS Containing Spreadsheet Clause

Consider a materialized view M without the spreadsheet clause and a query Q with one. The query Q can be rewritten to access M with no restrictions using rewrite rules.

For example, given the MV

```
       create materialized view mav enable query rewrite
       as
       select c, p, r, t, sum(m) as s, count(m) as c, count(*) as call
       from fact
       group by c, p, r, t;
   and the query:
   Q4  select p, r, t, sum(m) as s
       from fact
       group by p, r, t
       partition by r dimension by p, t
       (
           s['wine', 2000] = 0.2 * avg(s)[current(p),
           t between 1996 and 1999],
           s['beer', 2000] = 0.5 * avg(s)[current(p),
           t between 1995 and 1999]
       )
   it can be rewritten as:
       select p, r, t, sum(m) as s
       from mav
       group by p, r, t
       partition by r dimension by p, t
       (
           s['wine', 2000] = 0.2 * avg(s)[current(p),
           t between 1996 and 1999],
           s['beer', 2000] = 0.5 * avg(s)[current(p),
           t between 1995 and 1999]
       )
```

Observe that in doing so, the materialized view MAV contains more columns in the GROUP BY than the query Q4. Thus it has to be rolled up before applying the spreadsheet clause. Now consider a materialized view M containing the spreadsheet clause. Rewrites using M will be limited as the spreadsheet clause introduces non-trivial data containment problems. The restrictions are as follows.

(1) Q must have the spreadsheet clause and the clauses of M and Q must match exactly.
(2) If M' and Q' are M and Q without the spreadsheet clauses, M' must produce the same set of rows as Q'.

This implies that some of the existing rewrite rules (for example, see above cited patents) can be applied (in particular lossless join rules and column equivalence rules). However, many existing rules, like the rollup rule cannot be used as in this case, M' can contain more rows than Q'.

For example consider the MV:

```
create materialized view mav2 enable query rewrite
as
select p, r, t, sum(m) as s, count(m) as c, count(*) as call
from fact
group by p, r, t
partition by r dimension by p, t
(
    s['wine', 2000] =
        0.2 * avg(s)['wine', t between 1996 and 1999],
    s['beer', 2000] =
        0.5 * avg(s)['beer', t between 1995 and 1999]
)
```

Here, the MV can be used for rewriting the query:

```
select p, r, t, sum(m) as s, count(m) as c, count(*) as call
from fact, product
where product.p = fact.p
group by p, r, t
partition by r dimension by p, t
(
    s['wine', 2000] = 0.2 * avg(s)['wine', t between 1996 and 1999],
    s['beer', 2000] = 0.5 * avg(s)['beer', t between 1995 and 1999]
)
``` if the join between fact><product is lossless. However, the same mav2 cannot be used for a rewrite of a very similar query which contains restrictions in the WHERE clause. For example, in the query:

```
Q5    select p, r, t, sum(m) as s, count(m) as c, count(*) as call
      from fact, product
      where fact.p < > 'wine'
      group by p, r, t
      partition by r dimension by p, t
      (
          s['wine', 2000] =
              0.2 * avg(s)['wine', t between 1996 and 1999],
          s['beer', 2000] =
              0.5 * avg(s)['beer', t between 1995 and 1999]
      )
```

Q5 restricts the fact table to rows where p<>'wine'. Mav2, on the other hand, contains those rows and thus could use them for calculations in the spreadsheet clause. Deciding on what to filter from mav2 in this case can be difficult and thus materialized views with spreadsheet clauses may be less useful for rewrite. Therefore, it is recommended that users should consider using materialized query blocks without the clause.

Recommended Usage of MVS with Spreadsheet Clause

In certain spreadsheet applications, it is conceivable that the select query of the spreadsheet clause will be an aggregation over a large set (i.e., millions of rows). The result, however, will be a relatively small set (up to 10s of thousands of rows). This result will be partitioned into smaller sets (of hundreds of rows), and those rows will be a subject to the spreadsheet clause where up to 80 percent of them will be changed. Thus, it follows that described system may at times have thousands of partitions with hundreds of update rules per partition.

For example, the query:

```
Q6    select p, r, t, sum(m) as s
      from fact
      group by p, r, t
      partition by r dimension by p, t
      (
          s[p='wine', t=2000] = 0.2 * avg(s)[current(p),
              t between 1996 and 1999],
          s[p='beer', t=2000] = 0.5 * avg(s)[current(p),
              t between 1995 and 1999],
          s[p='coke', t=2000] = 0.6 * avg(s)[current(p),
              t between 1994 and 1999],
          ..............
          <hundreds of other update rules>
      )
``` will likely generate thousands of partitions with potentially hundreds of update rules per partition. Materialized views can be effectively used in this scenario if a self-recomputable spreadsheet is needed. In one embodiment, two separate MVs: one for the SELECT . . . GROUP BY . . . query and one for the spreadsheet can be used. For example, the above query can be expressed as a recursive materialized view by:

```
create materialized view mav
    refresh fast
    enable query rewrite
    as
    select p, r, t, sum(m) as s, count(m) as c, count(*) as call
    from fact
    group by p, r, t
and by,
    create materialized view spreadsheet_mv
    enable query rewrite
    as
    select p, r, t, s
    from mav
    partition by r dimension by p, t
    (
        s[p='wine', t=2000] =
            0.2 * avg(s)[current(p), t between 1996 and 1999],
        s[p='beer', t=2000] =
            0.5 * avg(s)[current(p), t between 1995 and 1999],
        s[p='coke', t=2000] =
            0.6 * avg(s)[current(p), t between 1994 and 1999],
        ..............
        <hundreds of other update rules>
    )
```

Here, materialized view MAV can be incrementally maintained. Materialized view SPREADSHEET_MV is much smaller (as it is build on top of MAV) and is maintained by a complete refresh. Thus, a Materialized View enables a user to store and re-compute models, including the simultaneous equation models, within a RDBMS, such as Oracle RDBMS™. Also, as mentioned above, the rewrite capability of MVs may be somewhat limited and thus should typically be in scenarios where refresh is more important than rewrite.

Optimization of Queries with the Spreadsheet Clause

There are several optimizations that may be applied to queries with the spreadsheet clause. One optimization that may be applied is avoiding unnecessary computation in the spreadsheet clause. For example, when the clause is included in a view, and the outer query selects data that are outside of any updates done by the spreadsheet clause. As an example, consider the following query:

```
select p, r, t, s
from
```

```
(
    select p, r, t, s
    from fact
    partition by r dimension by p, t
    (
        s[p='wine', t=2000] = 0.2 * avg(s)[current(p),
            t between 1996 and 1999],
        s[p='beer', t=2000] = 0.5 * avg(s)[current(p),
            t between 1995 and 1999]
    )
)
where p = 'coke';
```

In this example, the query does not select data that is updated by the spreadsheet clause and, therefore, its execution can be pruned out. This type of optimization can generally be determined at compile time. In addition, if the outer query selects data where [p='beer'], then only portion of the spreadsheet clause would need to be executed.

In one embodiment, an optimizer is used to detect and prune-out unnecessary computation done by the spreadsheet clause. For example, an optimizer can be used at compile time to identify and prune unnecessary computations that may exist within a spreadsheet clause.

Example Usage of the Spreadsheet Clause

The following are examples of how a spreadsheet clause may be used within a RDBMS to achieve spreadsheet-like operations in SQL.

Case 1. The objective is to show the sales for New York and New Jersey and the differences between the two, for each product. The differences are to be recorded in a new row with city='Diff.'

```
select product, city, sum(sales) as s
from f
where city in ('NYC', 'New Jersey')
group by product, city
partition by product dimension by city upsert
(
    s['Diff'] = s['NYC'] - s['New Jersey']
)
```

Case 2. The objective is if sales for each product in each city grew (or declined) at the same monthly rate from November 1999 to December 1999 as they did from October 1999 to November 1999, what would the fourth quarter look like for the company and each city?

```
select sum(s),city
from
(
    select product, city, month, sum(sales) as s
    from f
    where year=1999 and month in ('oct','nov')
    group by product, month, city
    partition by product,city dimension by month—UPSERT
    (
        s['dec']=(s['nov']/s['oct'])*s['nov']
    )
)
group by grouping set(( ),(city));
```

Case 3. The objective is to calculate 30% of an individuals net income as interest (net=pay minus tax minus interest). Interest is tax deductible from gross, and taxes are at 38% of salary and 28% capital gains. Want to determine how much the individual should borrow? This is an example of a simultaneous equation (net depends on interest which depends on net), thus the ITERATE clause is included.

```
select sum(balance) as s, account
from ledger
where holder='gregory' and account in('salary', 'cap_gain')
dim (account) iterate(1000) update
(
    s['net'] = s['salary']-s['interest'] -s['tax']
    s['tax'] = (s['salary']-s['interest'])*0.38 + s['cap_gain']*0.28
    s['interest'] = s['net']*0.30
)
```

Case 4. Sales for December are expected to be the average of sales for the past 6 months for each state/product. The objective is to show the sales for last 6 months and to forecast for the sales for December.

```
select sum(sales) as s,state,month
from f
where year=1999 and month between 5 and 11
group by state, month
partition by (state) dim (month) upsert
(
    s[12] = ave(s) [month between 5 AND 11]
)
```

Case 5. Sales of wine in 2000 will increase in comparison to 1999 as they did on the break of last century i.e., between 1899 and 1900. Sales of beer in 2000 will increase in comparison to 1999 as they did between the happy 60-ies war period, i.e., between 1960 and 1969. The objective is to calculate the increase using the regression aggregate function, reg_slope.

```
select p, r, t, sum(m) as s
from fact
group by p, r, t
partition by r dimension by p, t upsert
(
    s['wine', 2000] = s['wine', 1999]
        * (1+reg_slope(s, t) ['wine', t between 1899 and 1900])
    s['beer', 2000] = s['beer', 1999]
        * (1+reg_slope(s, t) ['beer', t between 1960 and 1969])
)
```

Spreadsheet Templates

In certain embodiments, the spreadsheet clause described in this document is a part of a query block that requires an extension to the basic SQL structure. In one embodiment, an extension to the basic SQL structure may be avoided by introducing the concept of a spreadsheet template. The end of the section compares advantages of two approaches.

In one embodiment, the spreadsheet clause is declared as a computational template by extending the <with clause> as defined in ISO/IEC 9075-2:1999 subclause 7.12, <query expression>, which is then used in the main query as a function applied to a table or a query. The spreadsheet template can be stored as an object and later applied to the result of a query and this is the stored version of spreadsheet clause. In certain embodiments, the spreadsheet template has extremely close syntax to that of the spreadsheet clause, so all of the concepts from the spreadsheet clause apply here as well.

In-Line Spreadsheet Template

In certain embodiments, the WITH clause is extended to define the spreadsheet template. The template consists of <template name>, <input columns> and the definition of the spreadsheet clause as described previously in this document—(see "SPREADSHEET CLAUSE"). The following is an example of the format of the template in accordance with certain embodiments of the invention:

```
Q22    WITH SPREADSHEET TEMPLATE <template name>
           IN (<input columns>)
           PARTITION BY <cols> DIMENSION BY <cols>
                   [ORDERED] [UPSERT | UPDATE |
                   UPDATEIF]
                   [IGNORE NAV]
                   [ITERATE (n) [UNTIL <condition>]]
           (
               <update rule>, <update rule>,..., <update rule>
           )
In this example, the WITH clause defines the drink_projection
template.
with spreadsheet template drink_projection
       in (p varchar2, r varchar2, t number, s number)
       partition by r dimension by p, t
       (
           s[p='wine',t=2000] = s[p='wine',t=1999],
           s[p='beer',t=2000] = s[p='beer',t=1998] + s[p='beer',t=1999]
       )
```

This template can then be applied to a query in a manner that is similar to that described for the parameterized view to a query. For example, the entire query with the above template could be:

```
with spreadsheet template drink_projection
       in (p varchar2, r varchar2, t number, s number)
   partition by r dimension by p, t
   (
       s[p='wine',t=2000] = s[p='wine',t=1999],
       s[p='beer',t=2000] = s[p='beer',t=1998] + s[p='beer',t=1999]
   )
   select p, r, t, s
   from drink_projection
   (
       select p, r, t, sum(s) as s
       from fact
       group by p, r, t
   )
```

Stored Template

In certain embodiments, the spreadsheet template is stored as a new database object. In one embodiment, three new DDL statements: CREATE SPREADSHEET TEMPLATE, ALTER SPREADSHEET TEMPLATE and DROP SPREADSHEET TEMPLATE are used.

CREATE SPREADSHEET TEMPLATE is analogous to defining an in-line form of the template (see Q22 above). For example:

```
Q23    CREATE SPREADSHEET TEMPLATE <template name>
           IN (<input columns>)
           PARTITION BY <cols> DIMIMENSION BY <cols>
                   [ORDERED] [UPSERT | UPDATE | UPDATEIF]
                   [IGNORE NAV]
                   [ITERATE (n) [UNTIL <condition>]]
           (
               <update rule>, <update rule>,..., <update rule>
           )
```

Once the template has been defined, it can be used in queries. For example, it can be used in the following query:

```
select p, r, t, s
from drink_projection
(
    select p, r, t, sum(s) as s
    from fact
    group by p, r, t
)
```

ALTER TEMPLATE statement allows <update rules> to be added or dropped from the template. Its format is:

```
ALTER SPREADSHEET TEMPLATE <template name>
[ADD | DROP]
(
    <update rule>, <update rule>,..., <update rule>
)
```

For example, to add an update rule to the drink_projection template to project sales of coke in 2000, the following update query may be used:

```
ALTER SPREADSHEET TEMPLATE drink_projection
ADD
(
    s[p='coke',t=2000] = s[p='coke',t=1998] + s[p='coke',t=1999]
)
```

Similarly, <update rules> can be used to drop a rule from the drink_projection template. In certain embodiments, if there are duplicates of an <update rule>, the duplicates will also be removed.

Multi-Measure Aggregates

In certain embodiments, aggregates over multiple measures are required to specify the same ranges over each measure. For example, the query:

Q25 $s['beer',2000]=\text{sum}(s*w)['beer', t \text{ between } 1998 \text{ and } 1999]$ imposes the requirement that both measures s and w vary over the same range: ['beer', t between 1998 and 1999]. The aggregate is specified over measures only with the range definition factored out. Alternatively, each measure may be specified with its own range, as for example:

$$s['beer', 2000] = \text{sum}(s['beer', t \text{ between } 1998 \text{ and } 1999] * \quad Q26$$
$$w['beer', t \text{ between } 1998 \text{ and } 1999])$$

In certain embodiments, a verification process is executed at the compile time to ensure that the ranges are identical.

However, a syntax that allows each measure to come with its own range would provide for the specifying of different ranges for every measure, as in the following example:

Q27 $\text{sum}(s[d1 \text{ between } 'C' \text{ and } 'D', d2 \text{ between } 1 \text{ and } 2]*p[d1 \text{ between } 'K' \text{ and } 'L', d2 \text{ between } 11 \text{ and } 12])$ In this case, it may be desirable to ensure that each range has the same cardinality. However determining whether each range has the same cardinality, even at run time, may be problematic. For example, assume the data consists of the following:

$(d1,d2)$data: $('C',1),('C',1.3),('C',1.6),('C',2)$ and $('K',11)('K',12),('L',11)('L',12).$ The cardinality of the range [d1 between 'C' and 'D', d2 between 1 and 2] is 4. Likewise, the cardinality of [d1 between 'K' and 'L', d2 between 11 and 12] is 4. However, the shape of the ranges is different. For example, the first range spans only one value in d1 ('C') and its shape is a line, while the second range spans range two values ('K' and 'L') and its shape is a square. It is unlikely that a user would want this situation to occur.

For example, consider the execution of the following expression SUM(B1:B15*C11:C25) in a spreadsheet program. The execution of the expression first produces an internal array of multiples, which is then summed-up into a scalar value. Applying an equivalent expression to the syntax of Q27, the function SUM would be written as follows:

Q28 sum(s[d1='B',d2 between 1 and 15]*s[d1='C', d2 between 11 and 25])

However, now consider the scenario in which the dimensions (d1, d2) can have the following values:

('B',1),('B',5),('B',6.6)('C',11),('C',12.6),('C',24).

In this case, the shape of both ranges are the same (they are lines) and the result would be as follows:

s['B',1]*s['C',1]+s['B',5]*s['C',12.6]+s['B',6.6]*s['C',24].

In one embodiment, to resolve the potential cell matching problem, the system requires that not only cardinality of the ranges are the same, but also that the shapes are the same as well. To achieve this goal, in certain embodiments, for each dimension d a check is made to determine if it qualifies the same number of rows in every range. For example, for the above data, d1 in Q28 qualifies one value in both ranges (i.e., value 'B' in first and 'C' in second range), and d2 qualifies three values in the first range (1, 5, 6.6) and three values in the second range (11, 12.6, 24). Thus, the shapes are the same. In certain embodiments, the verification process that ensures that the shapes match is performed at run time.

In other embodiments, potential cell matching problems are resolved by explicitly enumerating cells either using the IN construct or the INCREMENT operator. Each range can then be verified at compile time as the set of cell can be easily matched for multi-measure aggregates.

For example, for the following query:

Q29 sum(s[d1='B',d2 in (1,2,...,14,15)]*s[d1='C', d2 in (11,12,...,24,25)])

the result is s['B', 1]*s['C', 11], as other points like ('B', 5), ('B', 6.6) do not qualify.

To avoid ambiguity, the system steps through the IN list in order of its elements (i.e., d2=1, d2=2, ... d2=15).

Additionally, Q29 may be rewritten using the INCREMENT operator as follows:

Q30 sum(s[d1='B',d2 between 1 and 15 increment 1]*s[d1='C',d2 between 11 and 25 increment 1])

In this example, the syntax of Q30 works well for numeric and date dimensions where the INCREMENT operator is applicable. However, string typed dimensions would typically need to be enumerated explicitly.

The syntax of Q29 and Q30 can be used to address array computations in which the left-hand and the right-hand sides define identically shaped arrays. For example, the following query could be used:

Q31 s[d1='A', d2 between 1 and 10 increment 1] = TREND(s[d1='B', d2 between 11 and 20 increment 1], s[d1='C', d2 between 31 and 40 increment 1])

In this example, the TREND function takes as an input two arrays of cells and outputs identically shaped array of cells. The input arrays are [d1='B', d2 between 11 and 20 increment 1] and [d1='C', d2 between 31 and 40 increment 1]. Both are vectors containing ten elements. The output array is [d1='A', d2 between 1 and 10 increment 1]. It also is a vector containing 10 elements. This syntax can be also used for a range of arguments for a binary aggregate (i.e., one that takes two arguments), such as linear regression slopes and intercepts. For example, suppose we have measures X and Y dimensioned by year (i.e., a table (year, x, y)). The slope of X & Y may be determined even if (x,y) doesn't come from the same row.

For example:

reg_slope(x[year IN (1990,1991,1992)],y[year IN (1991,1992,1993)])

The above syntax using INCREMENT is compile time verifiable and simple to understand. However, it suffers from not being able to specify the existing data. For example, observe that 'd2 between 11 and 20' includes all values of d2 in that interval. However, 'd2 between 11 and 20 increment 1' allows for 10 values only: 11, 12, ..., 30.

Thus as previously shown, the concepts illustrated in Q25, which guarantees that ranges are the same, will cover most of the cases. The syntax of Q29 and Q30 covers the case when the ranges can be different but their shape is the same, and the ranges can be discovered at compile time as all range values are effectively enumerated using either IN or INCREMENT operator. Finally, for the syntax of Q27, the ranges can be different but their shape must be the same, and ranges will be determined at run time.

Looping Constructs

Several examples have been provided that illustrate the use of looping constructs. A number of examples illustrate declarative looping constructs. Others illustrate programmatic looping constructs. In general, the looping constructs work well for cells with numeric indexing. However, they typically do not work as well for other data types.

For example, given that t is of numeric type, the construct:

s[p='beer',t between 2000 and 2005 increment 1]=s['beer',t=current(t)-2]+s['beer',t=current(t)-1]

generates assignments for 'beer' in year 2000, 2001, 2002, 2003, 2004 and 2005 to be a sum of the previous two years. The construct would not work if "t" is a string type of the form 'year200', 'year2001', 'year2002', etc., as "t" could not be converted to a numeric value and thus used to perform the increments.

In one embodiment, to address this problem, a general programmatic looping construct is provided. For example, the following programmatic construct may be used:

for i=2000,i<=2005,i++s[p='beer',t='year'||i]=s['beer',t=current(t)-2]+s['beer',t=current(t)-1]

Data Driven Computation—Relaxing Cell Addressing

In general, cells are specified using boolean conditions on individual dimensions. The conditions reference single dimension and constants.

For example, in the query:

```
Q32     select p, r, t, s
        from f
        where p in ('wine', 'beer', 'coke')
        partition by r dimension by p, t
        (
            s[p='wine', t=2000] = 0.2 * avg(s)['wine',
            t between 1996 and 1999],
            s[p='beer', t=2000] = 0.5 * avg(s)['beer',
            t between 1995 and 1999],
            s[p='coke', t=2000] = 0.6 * avg(s)['coke',
            t between 1994 and 1999],
        )
``` the production of wine, beer and coke is projected for the year 2000. For each product, there are three parameters: weight and start and end time for the prediction. For example, for wine, the weight is 0.2, and the start and end times are 1996 and 1999 respectively. Since the parameters are per product, it may be desirable to put them in a look up table which associates a product with its prediction parameters. In this case the lookup table would be lookup p, weight, syear, eyear):

| p    | Weight | syear | eyear |
|------|--------|-------|-------|
| wine | 0.2    | 1996  | 1999  |
| beer | 0.5    | 1995  | 1999  |
| coke | 0.6    | 1994  | 1999  |

The challenge here is how to use the spreadsheet clause to address the cells by data from the lookup table rather than constants like in Q32. In one embodiment, the restrictions could be relaxed on the Boolean conditions for addressing dimensions. Currently such condition can reference a single dimension d and constants. In addition, certain measures may be allowed (i.e., columns not in the PARTITION BY/DIMENSION BY list).

For example, for the following expression:

$s['wine',2000]=s['wine',t=syear['wine',1999]]$ cell temp=syear['wine', 1999] may be retrieved first, and then used to qualify t in s['wine', t=temp]. Thus the above query (Q32) could be rewritten as:

```
Q33     select p, r, t, s
        from f, lookup
        where f.p in ('wine', 'beer', 'coke')
            and f.p = lookup.p
        partition by r dimension by p, t
        (
            s[*, t=2000] = avg(s*weight)[. , t between syear[...]
            and eyear[...]]
        )
```

In this example, product p determines the weight, syear, and eyear. Thus, for every pair (p, t), these parameters are determinable as the spreadsheet clause guarantees that the above query is unambiguous.

In certain embodiments, the ITERATE clause is extended to iterate over a table (or query). Here, the idea is to take every row from the lookup table (p, weight, syear, eyear) and to base the results on the construct of the spreadsheet clause as illustrated in the following query:

```
Q34     select p, r, t, s
        from f, lookup
        where f.p in ('wine', 'beer', 'coke')
            and f.p = lookup.p
        partition by r dimension by p, t
        iterate over
            (select p, weight, syear, eyear from lookup 1 order by p)
        (
            s[1.p, t=2000] =
                avg(s*1.weight)[1.p , t between 1.syear and 1.eyear]
        )
```

In this example, the spreadsheet clause executes as many times as there are rows in the lookup table. Each row provides parameters for the next iteration. Of note, the ORDER BY clause has been inserted into the ITERATE OVER subquery as the execution of the spreadsheet clause will depend on the order of rows from the lookup table. A unique ordering could be required for deterministic results.

A variation of the above example is to cause looping over the lookup table per rule, as in the following example:

```
Q35     select p, r, t, s
        from f, lookup
        where f.p in ('wine', 'beer', 'coke')
            and f.p = lookup.p
        partition by r dimension by p, t
        (
            for l in (select p,weight,syear,eyear from lookup order by p)
                s[l.p, t=2000] =
                    avg(s*l.weight)[l.p , t between l.syear and l.eyear]
        )
```

UPDATE|UPDATEIF|UPSERT Options on Individual Rules

The UPDATE, UPDATEIF, and UPSERT options are provided on the spreadsheet clause level. In addition, in certain embodiments, the UPDATE, UPDATEIF, and UPSERT options are provided on the individual rule level. For example, consider the following query:

```
select p, r, t, sum(m) as s
from fact
group by p, r, t
partition by r dimension by p, t
(
    update: s['wine', 2000] = s['wine', 1998] + s['wine', 1999],
    updateif: s['beer', 2000] = s['beer', 1998] + s['beer', 1999]
)
```

More General Indexing of Cells

In certain embodiments, a more general indexing method is provided for indexing a cell or range of cells that are identified by a boolean condition on all dimensions. For example, in the expression:

$s[where\ x^2+y^2=10]=20$ the condition $x^2+y^2=10$ designates points on a circle within a radius 10. The assignment would then assign a value of 20 to the cells on the radius.

In addition, another example is in the creation of an identity matrix for 2 dimensions (x, y), which can be expressed as follows:

$m[where\ x=y]=1, m[where\ x<>y]=0$

In this example, the order of evaluation is not specified, thus it is possible to write rules that are non-deterministic, as for example in:

$m[\text{where } x=y]=2*m[x=\text{current}(x)+1, y=\text{current}(y)+1]$

This example produces different results that are dependent on the order in which the cells are evaluated. In certain embodiments, to help users to control this non-determinism, an ORDER BY capability is provided to allow the ordering of selected rows. For example, the following syntax may be used to control the ordering of selected rows:

$m[\text{where } x=y \text{ order by } x]=2*m[x=\text{current}(x)+1, y=\text{current}(y)+1]$ Using general subscripts can make it difficult to sort the rules into an order based on their dependencies. As a consequence, if a user specifies a general subscript, the user must specify an ORDERED set of rules as unordered rules can typically only be used within the special subscripts. In one embodiment, the following is an ORDERED set of rules that may be specified by a user:

1. there are two kinds of subscripts: those beginning with WHERE ("general subscripts") and those that do not ("special subscripts");
2. special subscripts are equivalent to general subscripts by combining the subscripts with AND;
3. the left hand side of a rule specifies a set of cells that the rule will be applied to. The set of cells is effectively determined before executing the rule on any cell. (This does not prevent optimizations that recognize when it is legal to execute a rule as soon as a qualified cell is detected);
4. an operator is available on the right hand side of a rule that returns the current value of a dimension;
5. a cell reference on the right hand side which is within an argument to an aggregate specifies a set of cells that the aggregate is applied to;
6. any cell reference on the right hand side outside an aggregate must reference a single cell, else an exception is raised;
7. general subscripts on the left hand side also provide an ORDER BY clause for within-rule ordering, so that you can specify the order of evaluation of a rule that selects more than one cell;
8. general subscripts can only be used on the left hand side if the rules are ORDERED.

Window Functions and Aggregates with Order By

In one embodiment, the SQL is extended to provide a syntax for performing window functions or aggregates using ORDER BY like percentile_cont, in the spreadsheet clause. For example, the following syntax:

$s[\text{'beer'}, 2000] = \text{percent\_cont}(0.5) \text{ within group (order by } s)[\text{'beer'}, t \text{ between 1998 and 1999}]$ Additionally, a possible syntax for window function, for example moving sum over one month, is as follows:

$s[\text{'beer'}, t \text{ between 1998 and 1999}] = \text{sum}(s) \text{over (order by } t \text{ range between '1' month proceeding)}[\text{'beer'}, t \text{ between 1998 and 1999}]$ and an example of rank is:

$r[\text{'beer'}, t \text{ between 1998 and 1999}] = \text{rank}() \text{over (order by } s)[\text{'beer'}, t \text{ between 1998 and 1999}]$

XI. COMPRESSION METHODS

According to an embodiment of the invention, data compression is performed on stored data by reducing or eliminating duplicate values in a database block. An identification is made of duplicated values within the set of data that is to be stored within a particular data storage unit. Rather than writing all of these duplicated data values to the data storage unit, a symbol table is created that stores each duplicated data value only once. Each portion of the data item that refers to the duplicated data values are configured to effectively reference the single version of that data value located in the symbol table. As illustrated herein, the data storage units are shown as database blocks or disk pages, but other data storage units may likewise be used in the invention. In one embodiment, the database block is self-contained such that the information that is needed to recreate the uncompressed data in a block is available within the block.

FIG. 5 illustrates this embodiment of the invention. Shown is a database table 500 that is to be stored to a block 514 on disk 512. Each row in table 500 includes four columns of information, including an order number column 520, a customer column 522, an item column 524, and a price column 526. Three rows of data are shown in table 500. Row 502a has the value "1251" in the order column 520, the value "Joe" in the customer column 522, the value "Book" in the item column 524, and the value "10" in the price column 526. Row 504a has the value "1252" in the order column 520, the value "Tom" in the customer column 522, the value "Book" in the item column 524, and the value "10" in the price column 526. Row 506a has the value "1253" in the order column 520, the value "Joe" in the customer column 522, the value "Tape" in the item column 524, and the value "20" in the price column 526.

It is noted that the value "Joe" is repeated in the customer column 522 for both rows 502a and 506a. Similarly, the value "Book" is repeated in the item column 524 for rows 502a and 504a. The value "10" is repeated in the price column 526 for rows 502a and 504a.

A symbol table 510 is created to store each duplicated data value. In particular, the duplicated value "Joe" is stored in symbol table entry 530, the duplicated value "10" is stored in symbol table entry 532, and the duplicated value "Book" is stored in symbol table entry 534.

When each row of data in table 500 is stored to block 514 on disk 512, the repeated data values are not again written to disk. Instead, corresponding portions of each row are configured to reference the appropriate symbol entry in symbol table 510 that contains the correct data value, e.g., using pointer or linking structures.

To illustrate, consider row 502a in table 500 which has includes the following column values: "1251" "Joe" "Book" and "10". It is noted that the symbol table 510 includes an entry for the "Joe" "Book" and "10" values, which are the duplicated data values in table 500 that appear in row 102a.

As row 502a is written to disk, only the unique value "1251" is individually written to disk. This is shown in the on-disk row structure 502b which corresponds to row 502a in table 500. On-disk row structure 502b includes a first portion 542 corresponding to the order number column 520, which includes the unique data value "1251" for row 502a.

For the duplicated data values, pointers or links are inserted into the appropriate portions of the on-disk row structure to point to the appropriate entry in symbol table 510. On-disk row structure 502b includes a portion 544 corresponding to the customer column 522, which has a duplicated data value "Joe" in the original row 502a, that is configured in the on-disk row structure 502b to include a pointer 536 to the symbol table entry 530 that matches this duplicated data value. On-disk row structure 502b includes a portion 546 corresponding to the item column 524, which has a duplicated data value "Book" in the original row 502a, that is configured in the on-disk row structure 502b to include a pointer 538 to the symbol table entry 534 that matches this duplicated data value. On-disk row structure 502b includes a portion 548 corresponding to the price column 526, which has a duplicated data value "10" in the original row 502a, that is configured in the on-disk row structure 502b to include a pointer 540 to the symbol table entry 532 that matches this duplicated data value.

Each of the other rows 504a and 506a in table 500 is similarly represented when stored into block 514 on disk 512. Thus, row 504a in table 500 is written to disk as on-disk row structure 504b. In row 504a, the unique data values are "1252" and "Tom," which are individually written into on-disk row structure 504b. Row 504a also includes duplicated row values "Book" and "10." The portion 550 of on-disk row structure 504b corresponding to data value "Book" is configured to include a pointer 554 to entry 534 in symbol table 510, which corresponds to this duplicated data value. The portion 552 of on-disk row structure 504b corresponding to data value "10" is configured to include a pointer 556 to entry 532 in symbol table 510, which corresponds to this duplicated data value. Row 506a in table 500 is written to disk as on-disk row structure 506b. In row 506a, the unique data values are "1253", "Tape", and "20", which are individually written into on-disk row structure 506b. Row 506a also includes the duplicated row value "Joe". The portion 560 of on-disk row structure 506b corresponding to data value "Joe" is configured to include a pointer 562 to entry 530 in symbol table 510, which corresponds to this duplicated data value.

Figure 6:
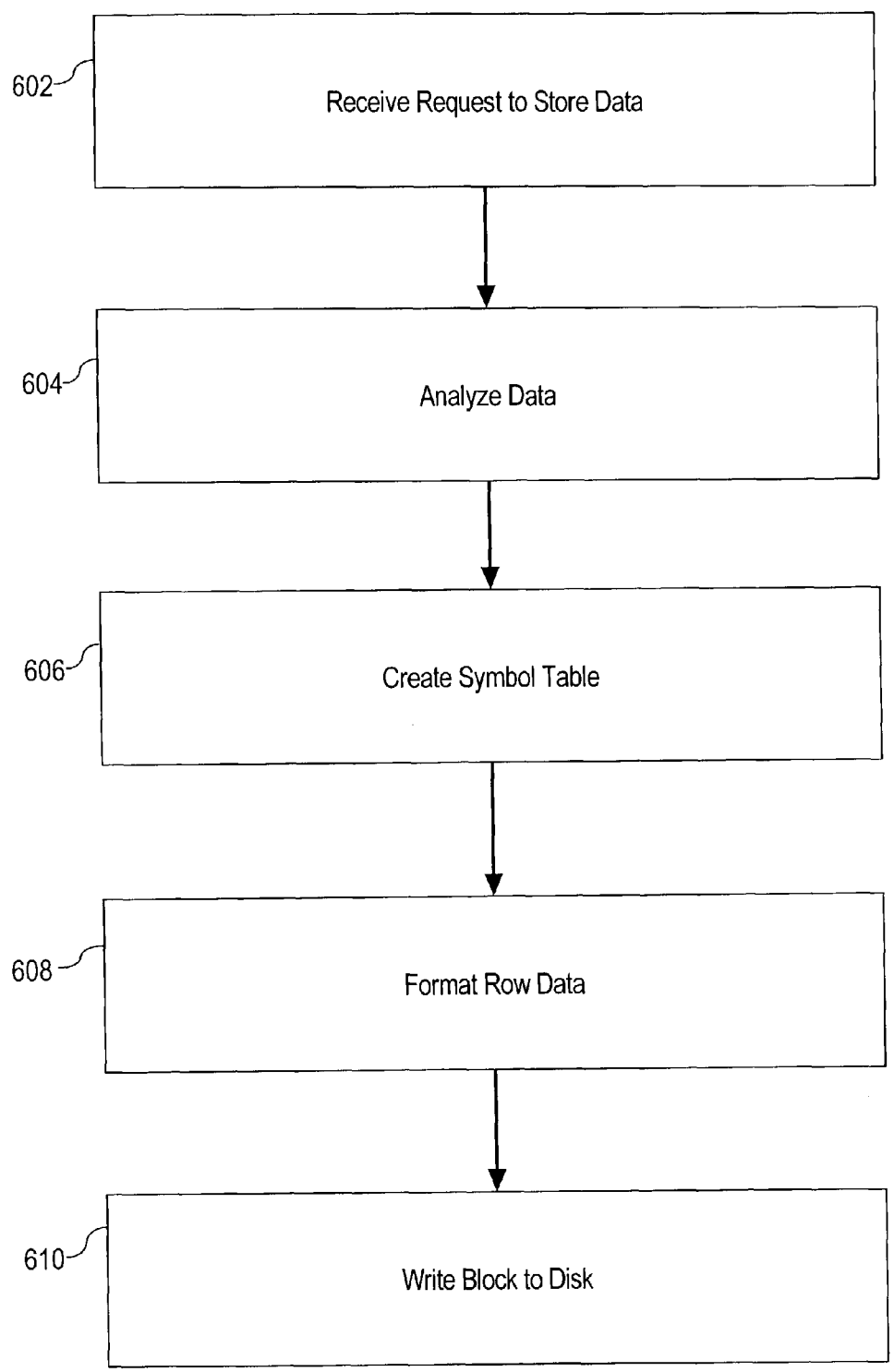
FIG. 6 shows a flowchart of an embodiment of a process for storing data.

FIG. 6 shows a flowchart of an embodiment of a process for storing data onto disk. At 602, a request is received to store data onto disk. In an embodiment, it is a user/system option to determine whether the data is compressed. If compression is turned on, at 604, the data is analyzed to identify repetitive data values for the portions of the data that is to be stored within a given database block. Based upon the identified data duplicates, a symbol table is generated that includes some or all of the duplicate data values (606). Each on-disk row structure in the database block is thereafter created. The on-disk row structures are formatted to exclude some or all of the duplicated data values (608). In particular, on-disk row structures that are associated with a duplicated data value are configured to reference the appropriate entry(s) in the symbol table that stores the relevant data value. If the present compression approach is performed off-line, then the analysis and formatting of rows are performed in batch mode, such that the entire contents of a database block is pre-organized before writing to disk. Off-line processing allows precise determination of the number of rows that will fit into a given database block. Alternatively, the compression approach can be performed on-line, with each on-disk row structure individually prepared and written to disk. In either case, the block metadata is configured to indicate whether the data on the block, or portions of the data in the block, have been compressed. In an embodiment, the header of the block includes a data structure that indicates whether the block or data in the block are compressed. In one embodiment, a single bit is sufficient to indicate whether data on the block is compressed.

If the likelihood of data repetitions within a single block is low, the expected compression ratio will likely also be fairly low. If the likelihood of such repetitions is higher, the expected compression ratio will be higher. Thus, rows can be reorganized to increase the likelihood of such repetitions. One way to do this for a single column table is to order table rows by the column value. This can be achieved in the Structured Query Language (SQL) by executing the statement "CREATE TABLE AS SELECT" with an order by clause. This type of technique can be also applied to a table where one column has low cardinality and other columns have high cardinalities, by ordering table rows by low cardinality column.

For a table with multiple low cardinality columns, tuning to achieve a better compression ratio can be performed using the following approach in one embodiment of the invention. First, determine the column with the lowest cardinality. The cardinality of a column can be determined by executing the following statement: "SELECT COUNT(DISTINCT(c)) from T;". Once the lowest cardinality column is determined (assume it is column C1), the next step is to determine cardinalities of other columns for fixed values of the chosen column. This can be measured by executing the statement "SELECT SUM(count(*) * COUNT(DISTINCT(cK))) from T group by C1;" for all columns cK other than C1. Assume column C2 has the lowest such measure. Then determine the column with the lowest cardinality when the first two are fixed. This can be measured by executing the statement "SELECT SUM(count(*) * COUNT(DISTINCT(cK))) from T group by C1, C2;" for all columns cK other than C1 and C2. By continuing this process, one would determine some column sequence C1, C2, . . . CN. This sequence can be used as the sequence of columns in the ORDER BY clause of the create table compress statement.

Figure 7:
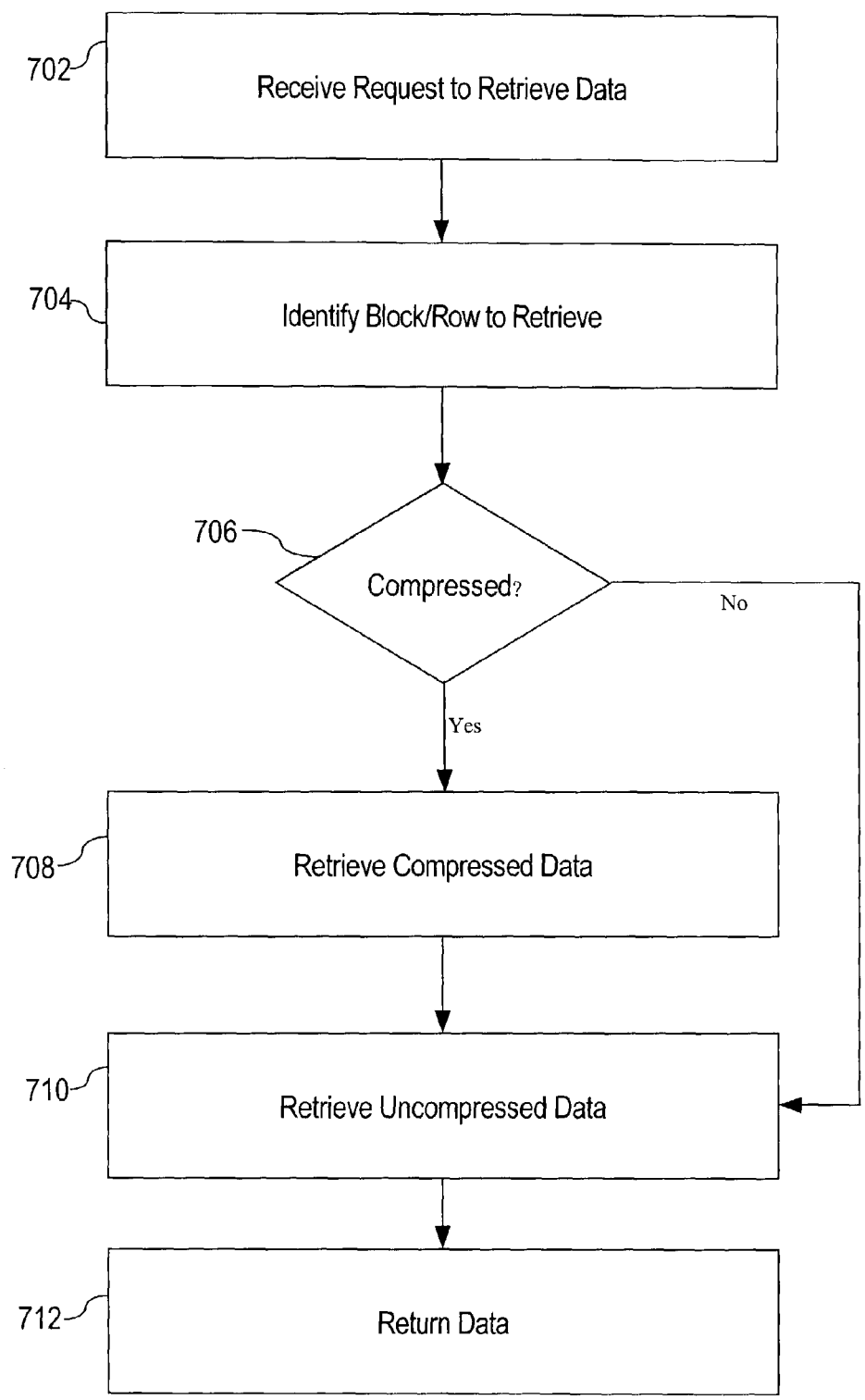
FIG. 7 shows a flowchart of an embodiment of a process for retrieving data.

FIG. 7 shows a flowchart of an embodiment of a process for retrieving data from disk. At 702, a request is received to retrieve data from disk. The specific block/row that is being sought is identified at 704. Any conventional indexing or search techniques may be employed to perform step 704. At 706, a determination is made whether the relevant database block is being stored in compressed format. In an embodiment, the block header is accessed to make this determination. If the block is not compressed, then the requested row information is immediately retrieved from disk (710) and returned to the requesting entity (712). If the block is compressed, then the relevant on-disk row structure for the requested row is accessed to retrieve duplicated data values from the symbol table (708). In addition, the individually stored data values from the on-disk row structure is also retrieved (710). At 712, the complete set of requested data is returned to the requesting entity.

Recursive symbol entries may be used in the symbol table. A recursive symbol entry is an entry in the symbol table that itself references one or more other symbol table entries.

Figure 8:
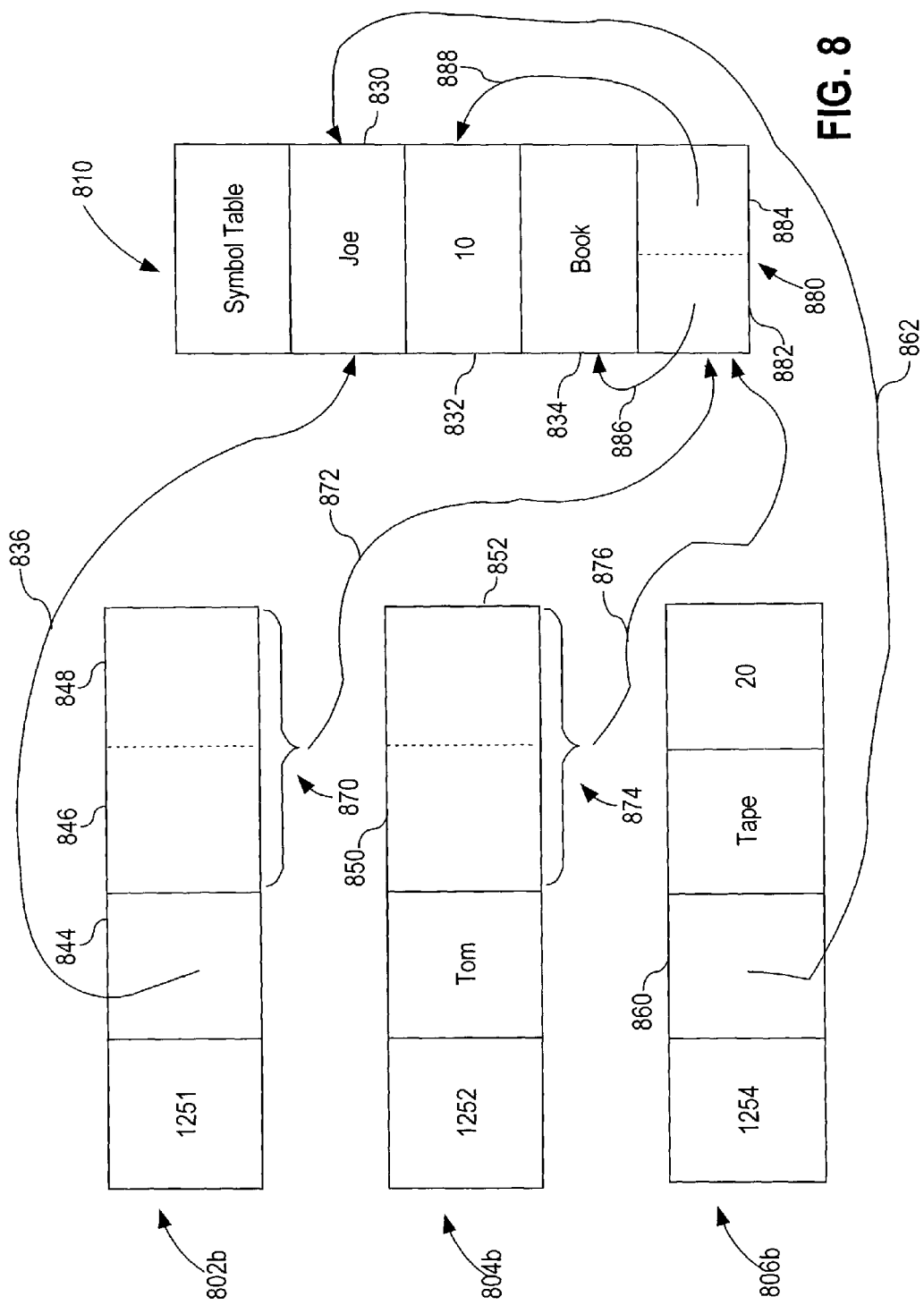
FIG. 8 illustrates recursive referencing of entries in a symbol table according to an embodiment of the invention.

FIG. 8 illustrates the use of recursive symbol entries to format a database block to store table 500 of FIG. 5. Like the standard symbol table 510 of FIG. 5, recursive symbol table 810 includes an entry 830 to store the "Joe" data value, an entry 832 to store the "10" data value, and an entry 834 to store the "Book" data value.

Unlike the standard symbol table 510 of FIG. 5, recursive symbol table 810 includes a recursive symbol entry 880 that references other entries within symbol table 810. In particular, recursive symbol entry 880 includes a first portion 882 that is associated with a link 886 to the data value "Book" in entry 834. Recursive symbol entry 880 also includes a second portion 884 that is associated with a link 888 to the data value "10" in entry 832. By combining first portion 882 and second portion 884, entry 880 logically creates an entry that includes both referenced data values in sequence, i.e., having the data value of "Book" directly before the data value "10".

The advantage of combining multiple symbol entries in this manner is that there are sequences of column values for rows stored in the block that may match these combinations. Rather than having multiple links or pointer structures between an on-disk row structure and the individual data values in a symbol table, a single link or pointer structure can be used to point to a combined symbol entry that recursively links to multiple other entries.

Referring to table 500 in FIG. 5, columns 524 and 526 in both row 502a and row 504a present the data values "Book" and "10" in sequence. In FIG. 5, the on-disk row structure 502b (which corresponds to row 502a) includes a link 538 to the data value "Book" and a separate link 540 to the data value "10". Similarly, the on-disk row structure 504b (which corresponds to row 504a) includes a link 554 to the data value "Book" and a separate link 556 to the data value "10". This is a total of four links from these on-disk row structures to entries in the symbol table 510.

In the recursive approach of FIG. 8, the on-disk row structure 802b (which corresponds to row 502a) includes single link 872 to the combined, sequential data values "Book" and "10" represented by recursive symbol entry 880. This single link 872 allows the values of both portions 846 and 848 (corresponding to columns 524 and 526 in row 502a) to be represented in on-disk row structure 802b. Similarly, the on-disk row structure 804b (which corresponds to row 502a) includes single link 876 to the combined, sequential data values "Book" and "10" represented by recursive symbol entry 880. This, again, allows the values of both portions 850 and 852 in on-disk row structure 504b (corresponding to columns 524 and 526 in row 502a) to be represented with a single link or pointer structure. The end result is that the approach of FIG. 8 requires fewer link/pointers between the on-disk row structures and the symbol table as is required by the approach of FIG. 5.

The approach of FIG. 8 to reduce the number of links/pointers may also be employed with non-recursive combinational entries in symbol table 810. In particular, entry 880 can be configured such that portion 882 explicitly stores the data value "Book", rather than being associated with a recursive link 886 to entry 834. Portion 884 of entry 880 can be configured to explicitly store the data value "10", rather than being associated with a recursive link 888 to entry 832. This approach still allows a reduction in the number of links between the on-disk row structures and the symbol table 810, at the cost of possibly increasing the amount of disk space needed to explicitly store the duplicated values in symbol table 810. Entries in symbol table 810 may also include various combinations of recursive links and explicitly stored data values. While the example of FIG. 8 shows only two data values combined into a recursive symbol entry 880, the inventive concepts can be extended to include any number of data values in a combined symbol table entry.

In one embodiment, column reordering may be performed to improve compression ratios. As noted in the last section, if there are repeating sequences of column values for rows stored in a given block, then the number of links between the symbol table and on-disk row structures can be reduced by creating links to combined entries in the symbol table. Column reordering can be performed to increase the number of duplicated sequences of column values. In an embodiment, column reordering is performed at the granularity level of the database block. Alternatively, column reordering can be performed at other granularities, e.g., across multiple blocks.

Figure 9:
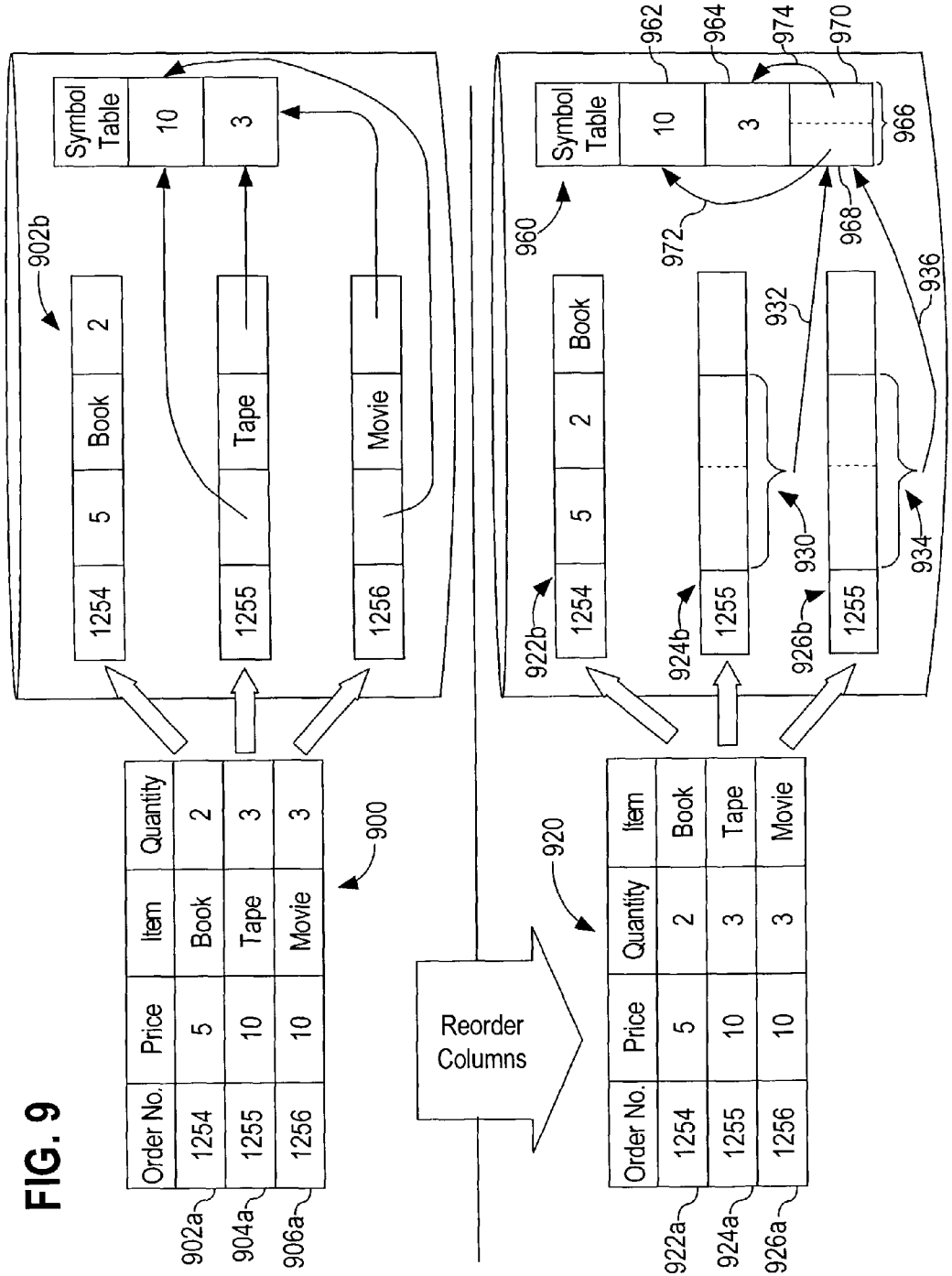
FIG. 9 illustrates column reordering and recursive referencing of entries in a symbol table according to an embodiment of the invention.

To illustrate, consider database table 900 shown in FIG. 9. Table 600 includes three rows of data, with each row having an Order Number column, a Price column, an Item column, and a Quantity column. Row 902a has the following sequence of data values: "1254", "5", "Book", and "2". Row 904a has the following sequence of data values: "1255", "10", "Tape", and "3". Row 906a has the following sequence of data values: "1256", "10", "Movie", and "3".

Consider first the situation if columns are not reordered. It is noted that the data values "10" and "3" are duplicated among these rows. Thus, when this table is written to disk, a symbol table 950 can be created having a first entry 952 with the data value "10" and a second entry 954 with the data value "3". As the rows 902a, 904a, and 906a are written to disk, each on-disk row structure for these rows that is associated with these duplicated data values are configured to reference the appropriate entry in symbol table 950. Thus, on-disk row structure 904b, which corresponds to row 904a, has a portion 941 (corresponding to the data value in the Price column) that is associated with a link 940 to entry 952 in symbol table 950 for the data value "10". On-disk row structure 904b also has a portion 943 (corresponding to the data value in the Quantity column) that is associated with a link 942 to entry 954 in symbol table 950 for the data value "3". On-disk row structure 906b, which corresponds to row 906a, has a portion 945 (corresponding to the data value in the Price column) that is associated with a link 946 to entry 952 in symbol table 950 for the data value "10". On-disk row structure 906b also has a portion 947 (corresponding to the data value in the Quantity column) that is associated with a link 944 to entry 954 in symbol table 950 for the data value "3". Because row 902a does not include any of the duplicated data values, its associated on-disk row structure 902b explicitly stores each column value and does not include any references to the symbol table.

Consider if column reordering is performed against table 900. The column reordering is performed to increase the possibility of repeating sequences of column values for the rows in the table. In the present example, by switching the ordering between the Item column and Quantity column in table 900, it can be seen that a repeating sequence of values is created between the Price column and the Quantity Column. The result of this column reordering is shown as table 920 in FIG. 9. In particular, both rows 624a and 626a now have the same sequence of data values "10" and "3" for the Price and Quantity columns. Thus, when symbol table 960 is created on disk, a combined entry 966 can be inserted that includes, whether directly or indirectly, the data values "10" and "3" in the sequence shown in table 920 for rows 924a and 926a. If the combined entry 966 indirectly includes these values, then entry 966 includes a first portion 968 that recursively references entry 962 and a second portion 970 that recursively references entry 964.

When row 924a is written to disk, its on-disk row structure 924b is associated with a single link 932 to combined entry 966 for the sequence of values "10" and "3". This is in contrast to the approach taken by on-disk row structure 904a for this same row without column reordering, which uses two links 940 and 942 to reference the same two data values. Likewise, when row 926a is written to disk, its on-disk row structure 926b is associated with a single link 936 for the sequence of values "10" and "3". Again, this is in contrast to the approach taken by on-disk row structure 906a for this same row without column reordering, which uses two links 946 and 944 to reference the same two data values.

Figure 10:
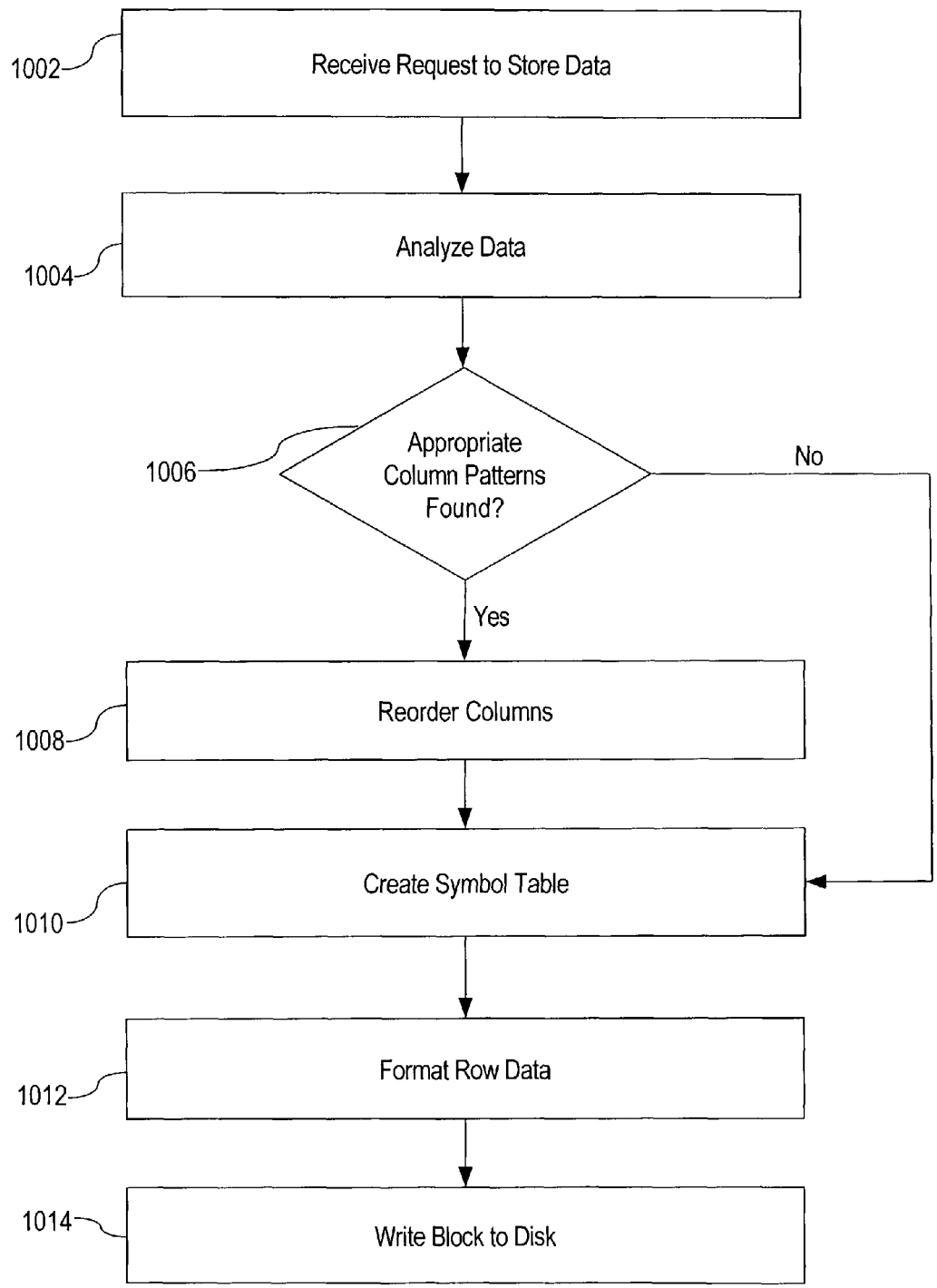
FIG. 10 shows a flowchart of an alternate embodiment of a process for storing data.

FIG. 10 shows a flowchart of an embodiment of a process for storing data to disk utilizing column reordering. At 1002, a request is received to store data onto disk. If compression is turned on, at 1004, the data is analyzed to identify repetitive data values for the portions of the data that is to be stored within a given database block. The data analysis step also includes an analysis of possible column reordering combinations that may be performed to increase the likelihood of repeating sequences of data values. A determination is made whether there exists column sequences that may be advantageously obtained through column reordering (1006). If so, then the appropriate columns are reordered (1008). Based upon the identified data duplicates, a symbol table is generated that includes some or all of the duplicate data values (1010). Each on-disk row structure in the database block is thereafter created and formatted to exclude the duplicated data values (1012) and are written to disk (614). In particular, each on-disk row structure that is associated with a duplicated data value is configured to include or reference a link to the appropriate entry(s) in the symbol table that stores the relevant data value. The block metadata is configured to indicate whether the data on the block, or portions of the data in the block, have been compressed. In addition, the block metadata is also configured to indicate whether and how column reordering was performed to the stored data. In an embodiment, the header of the block includes a data structure that indicates whether the block or data in the block are compressed and/or reordered. When the data is retrieved from the block, the header information is accessed to allow the data to be reordered and uncompressed back to its original form.

An optimization that can be applied is to remove trailing NULL values from the on-disk versions of stored rows. Rows in a database table may include NULL values in the one or more columns at the end of the row. When these rows are written to disk, additional compression can be achieved by not allocating or writing any space to disk for these NULL values. Instead, the storage system is configured to recognize that if the on-disk version of a particular database row does not include one or more stored values for columns at the end of the row, then those column values are assumed to be NULL values.

Figure 11:
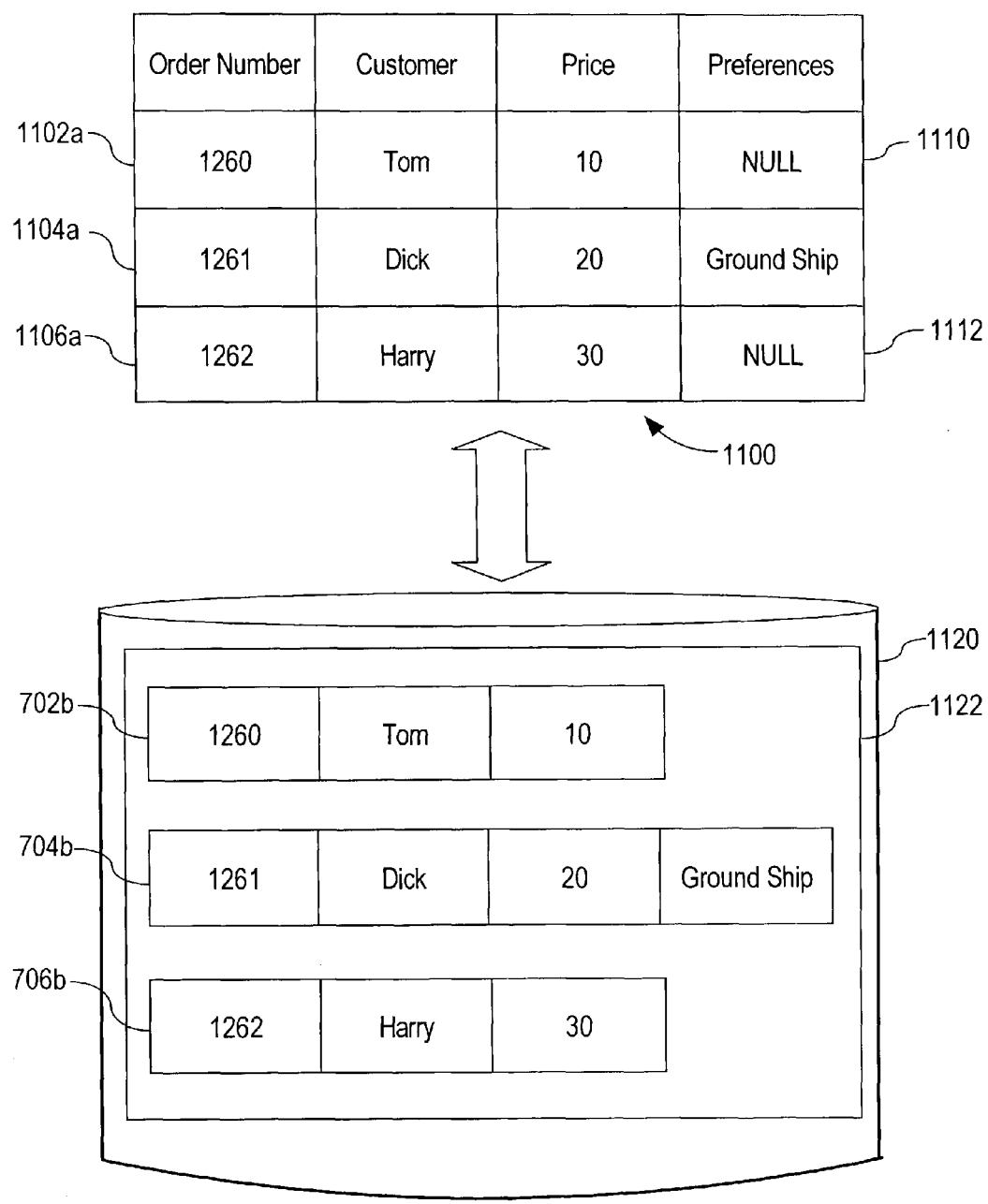
FIG. 11 illustrates removal of trailing NULL values according to an embodiment of the invention.

To illustrate, consider table 1100 in FIG. 11, which is to be stored to block 1122 on disk 1120. It is noted that rows 1102*a* and 1106*a* both have a NULL value in the last column of each row. When these rows are written to disk, the on-disk row structures for these rows are configured to exclude the trailing NULL values. On-disk row structure 1102*b*, which corresponds to row 1102*a*, does not contain a space allocated for the trailing NULL value in the Preferences column. Instead, it only includes allocated space for the leading "1260", "Tom", and "10" values that appear in row 1102*a*. On-disk row structure 1106*b*, which corresponds to row 1106*a*, does not contain a space allocated for the trailing NULL value. Instead, it only includes allocated space for the leading "1262", "Harry", and "30" values that appear in row 1106*a*.

Column reordering can be performed to increase the likelihood of trailing NULL values appearing in rows to be stored on disk. The column values for a set of data is analyzed to sort the columns based upon the number of NULL values in each column. The columns are reordered so that the columns with the largest numbers of NULL values are ordered to the end of the rows, and the columns with the smaller numbers of NULL values are ordered closer to the beginning of the rows. Thus, the column with the largest number of NULL values may be reordered to the end of the table. The column with the next-largest number of NULL values may be reordered as the second-to-last column of the table, with these sequences of actions continued until an efficient ordering of columns is achieved.

Figure 12:
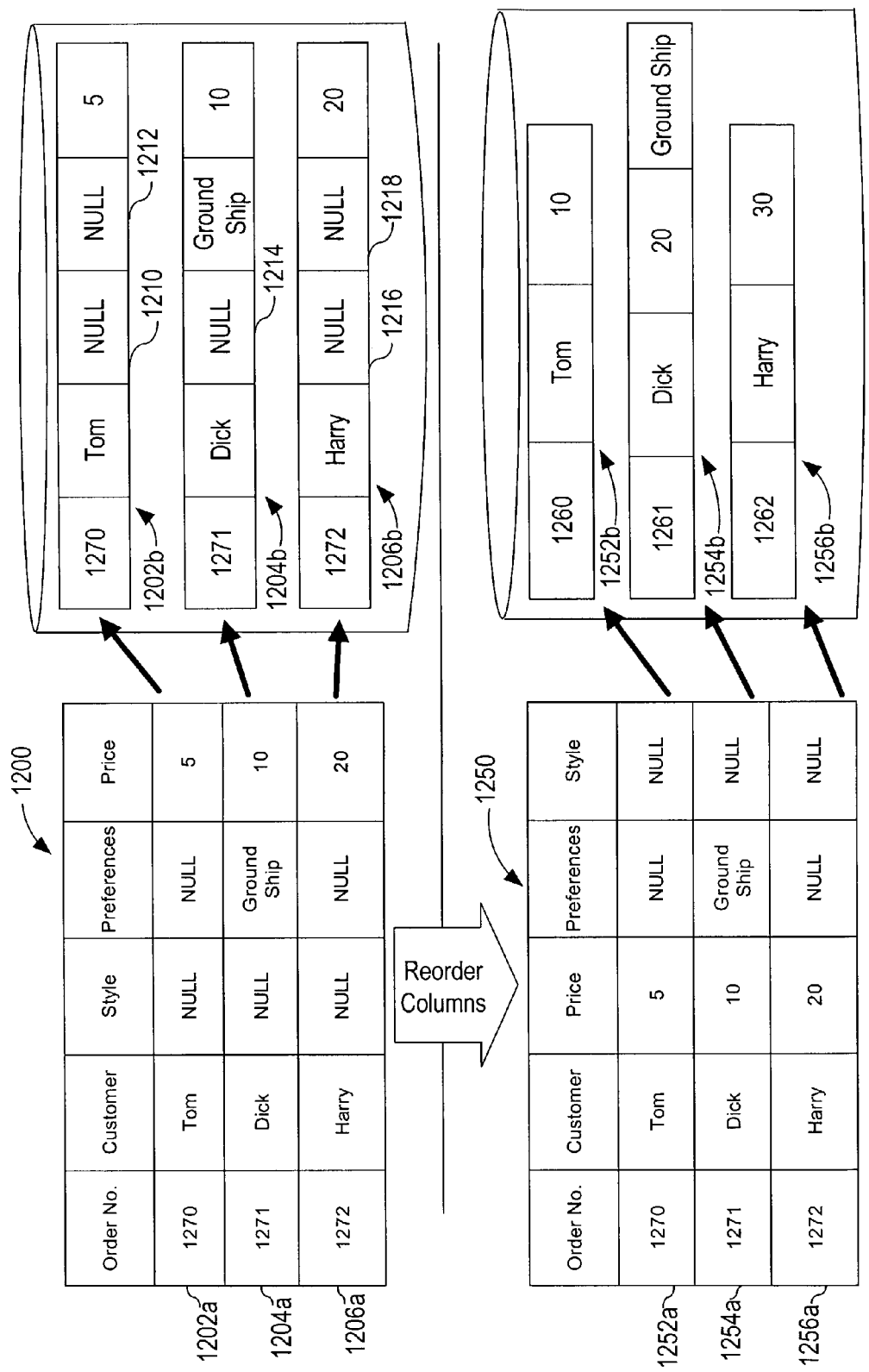
FIG. 12 illustrates column reordering and removal of trailing NULL values according to an embodiment of the invention.

To illustrate possible inefficiencies if column reordering is not performed, reference is made to table 1200 in FIG. 12. Table 1200 includes a set of rows 1202*a*, 1204*a*, and 1206*a* that is to be written to disk. Each row includes one or more NULL values. Row 1202*a* includes NULL values in the Style column and Preferences column. Row 1204*a* includes a NULL value in the Style column. Row 1206*a* includes NULL values in the Style column and Preferences column. Since none of the NULL values in these rows are trailing NULLs, when these rows are written to disk, space may be wasted in each corresponding on-disk row structure because of the NULL values. As shown, on-disk row structure 1202*b*, which corresponds to row 1202*a*, includes two spaces 1210 and 1212 that have been allocated for the NULL values corresponding to the values in the Style and Preferences columns for row 1202*a*. On-disk row structure 1204*b*, which corresponds to row 1204*a*, includes a space 1214 that has been allocated for the NULL value corresponding to the value in the Style column of row 1202*a*. On-disk row structure 1206*b*, which corresponds to row 1206*a*, includes two spaces 1216 and 1218 that have been allocated for the NULL values corresponding to the values in the Style and Preferences columns for row 1206*a*.

Column reordering can be performed to increase the compression efficiency of storing table 1200 to disk. The first step is to sort the columns to identify specific columns having larger numbers of NULL values. Here, it can be seen that the Style column in table 1200 has the largest number of NULL values (with NULL values for every row). The Preferences column has the next largest number of NULL values (with NULL values in rows 1202*a* and 1206*a*). None of the other columns include NULL values.

The columns are reordered to place the columns with the larger number of NULL values closer to the end of the rows. Table 1250 illustrates the result of performing this action on table 1200. In particular, the columns are reordered such that the Style column, with the largest number of NULL values, is placed at the end of the rows. The Preferences column, with the next largest number of NULL values, is placed second-to-last in the sequence of columns. None of the other columns are reordered since they do not contain NULL values.

This type of reordering has maximized the number of trailing NULL values in the table. Now, rows 1252*a* and 1256*a* in table 1250, which correspond to rows 1202*a* and 1206*a* respectively in table 1200, both include two trailing NULL values. Rows 1202*a* and 1206*a* did not originally contain any trailing NULL values. Row 1254*a* in table 1250, which corresponds to row 1204*a* in table 1200, includes one trailing NULL value. Rows 1204*a* did not originally contain any trailing NULL values.

When the rows 1252*a*, 1254*a*, and 1256*a* in table 1250 are written to disk, the trailing NULL values can be removed from the on-disk versions of each row. Thus, on-disk row structure 1252*b*, which corresponds to row 1252*a* in table 1250, excludes the NULL values for the Preferences and Style columns. On-disk row structure 1252*b* only includes three fields to store the data values "1270", "Tom", and "5" for the Order Number, Customer, and Price columns, respectively. This is contrast to the on-disk row structure 1202*b*, its equivalent before column reordering, which includes five fields to store the data values "1270", "Tom", "NULL", "NULL", and "5" for the Order Number, Customer, Style, Preferences, and Price columns, respectively.

On-disk row structure 1254*b*, which corresponds to row 1254*a* in table 1250, excludes the NULL value for the Style column. On-disk row structure 1254*b* only includes four fields to store the data values "1270", "Dick", "10", and "Ground Ship" for the Order Number, Customer, Price, and Preferences columns, respectively. This is contrast to the on-disk row structure 1204*b*, its equivalent before column reordering, which includes five fields to store the data values "1270", "Dick", "NULL", "Ground Ship", and "10" for the Order Number, Customer, Style, Preferences, Price columns, respectively.

Like on-disk row structure 1252b, on-disk row structure 906b, which corresponds to row 1256a in table 1250, excludes the NULL values for the Preferences and Style columns. On-disk row structure 1256b only includes three fields to store the data values for the Order Number, Customer, and Price columns, which is in contrast to the on-disk row structure 806b, its equivalent before column reordering, which includes five fields to store the data values for the Order Number, Customer, Style, Preferences, and Price columns.

Illustrative Example

In this example, a block data format is employed that allows for various data compression schemes. The data block format can be applied as an extension to existing block formats for existing systems. The data block format defines how row pieces are stored in data blocks. The block header includes fields that indicate whether any or all of the following features are used in a particular block:
- block level compression
- block level column reordering
- intra-row run-length NULL compression

Column Reordering

If the column reordering indicator is set, the block uses block-level column reordering. Having a set of row pieces N columns each, a block-level permutation of the column numbers provides column reordering. If a block uses column reordering, two arrays can be stored directly after the block header. The first array stores the lengths of leading columns (ub2 Lens[fixed_width_column_count]). The first fixed_width_column_count>=0 columns in a block in the present embodiment are fixed length columns within the block. In this embodiment, the value of fixed_width_column_count can be zero. The second array stores column number permutation for the block (ub1Perms[block-level_column_count]).

Column reordering provides at least two advantages. First, column reordering allows higher compression by grouping appropriate columns together. Second, column reordering improve Nth column access by moving fixed-length columns in front of variable-length columns. If the first set of columns have fixed length within the block, these lengths can be stored once in the block instead of in each row. These lengths can be stored in the length array. These arrays can be considered part of block header for space computations purposes.

Another advantage of column reordering is that if a column is NULL in all row pieces in a block, then it is can be effectively "compressed out" from all row pieces because a NULL column does not have any data and its length can be stored in the length array. Moving block-level fixed column lengths from row pieces to a block-level array may provide relatively cheap compression, which can be particularly effective if column values are short, which occur if the data is highly numeric.

In one embodiment, rows that are column reordered should have equal column counts and the corresponding columns should have equal lengths. However, it is not necessary in all embodiments that all row pieces in a given block have these properties, since Insert and Update operations that violate this requirement may become inefficient under this approach. Therefore, in alternate embodiment, row pieces are allowed in a column-reordered block that do not satisfy the reordering requirement. For column-reordered block, these row pieces are excluded from reordering. These row pieces are not excluded from compression if the block is both reordered and compressed. Therefore, rows are allowed that only partially satisfies the fixed length requirement. Each row in column-reordered block is associated with a designated field identifying how many leading columns in the row have lengths obeying the block-level column length array parameter. In one embodiment, column reordering does not apply to forwarding row pieces and deleted row pieces. Column reordering also does not apply to row pieces that are explicitly excluded from reordering.

The variable part of the new data layer header includes permutations stored in the perms array and fixed width column lengths stored in the lens array. For a block with N column rows having M fixed length columns, the variable part takes sizeof(ub1)×N+sizeof(ub2)×M bytes. Assuming sizeof (ub1)×N+sizeof(ub2)×M_3×N the space taken (referred to as VARSPACE(M,N)) does not exceed 3×N. By not storing fixed width column lengths inside row pieces, at least M bytes per row can be saved. For a block with K column-reordered rows the savings can be at least (M−1)×K bytes (M−1 because there is a per-row piece fixed length column count in a ub1). In an embodiment, the break-even point is at K=5, with additional saving occurring for K>5.

In one embodiment, the process should be configured such that column-reordered data does not consume more space than uncompressed data.

As noted above, the first array lens (ub2 lens[fixed_width_column_count]) contains fixed column lengths for the block for the first n columns (where n=fixed_width_column_count). Instead of storing column lengths in each element of the array, prefix sums can be stored for the column lengths using a non-commutative summation to work around possible NULL values, as follows:

$$lens[0] \leftarrow SIZEOF(column[0]),$$

$$lens[k] \leftarrow lens[k-1] \oplus SIZEOF(column[k]), k>0$$

where SIZEOF(col)=0x8000 if the column is NULL, and the summation ⊕ operation carries 0x8000 bit from the right operand only, i.e. ⊕ is not commutative.

For example, consider a sequence of 10 fixed width column lengths as follows:
5, 5, 12, 7, NULL, NULL, 4, NULL, 4, 6,
the array will contain the following values:
5, 10, 22, 29, 32797, 32797, 33, 32801, 37, 43

Extracting Nth column length from this array is performed as follows. First, for k<fixed_width_column_count, lens[k]& 0x8000 is tested to detect if the column k is NULL. If it is not NULL, then its length is:

$$len \leftarrow lens[k]-(lens[k-1]\&0x7FFF), k>0$$

or $$len \leftarrow lens[0], k=0$$

If there are many fixed width columns in a block, then the array can consume a significant amount of space. There are potential advantages for using fixed length column reordering, e.g., to compress out long sequences of NULL columns by rotating globally NULL columns to the end and subsequently performing truncation of trailing NULL values. In general, the more fixed length columns in a block, the higher the probability that several columns will have the same column lengths.

Block Formats

If the row compression indicator is set in the block header, then this indicates that all or part of the rows in the block is compressed. For only the purpose of the following explanation, assume that a given block is column reordered, the block's columns 0 through (fixed_width_column_count−1) are of fixed length and the rest of the columns are of variable length. Further assume that columns 0 through (fixed_width_column_count−1) have their lengths removed and stored in the block—level array lens. The rest of the columns have their lengths stored within the row itself. In an embodiment, the following are defined to the row piece formats for the block:

define SHORT_INDEX 200
    #define SHORT_LENGTH 250
    #define LONG_INDEX 251
    #define LONG_LENGTH SHORT_LENGTH The value of SHORT_INDEX is an index into the symbol table. For values L∈[SHORT_INDEX, SHORT_LENGTH), len←(L−KDRCS SHORT INDEX) is the length of an in-place stored column (i.e., uncompressed column). The value of LONG_INDEX indicates that the next 2 bytes contain an index value into the symbol table. The value of LONG_LENGTH indicates that an uncompressed column (with length bytes first) follows.

The column count field in the row header contains count of column length first bytes present in the row.

In one embodiment, a symbol table is table[0] with rows in data layer sense. Rows in the symbol table do not have flag bytes or lock bytes. For the flag byte, locking of symbol table entries can be implemented, e.g., by obtaining data block locks. In one embodiment, concurrency loss can be incurred for symbol table operations if operations on the symbol table are not unduly frequent. Flag and lock bytes of symbol table rows can contain a reference count stored as ub2. In an embodiment, symbol table rows are similar to row piece formats, except for the following constants used to partition first length byte values into ranges:

define SYMTAB_SHORT_INDEX 200
    #define SYMTAB_SHORT_LENGTH 250
    #define SYMTAB_LONG_INDEX 251
    #define SYMTAB_LONG_LENGTH SYMTAB_SHORT_LENGTH Interpretation for the first length bytes is the same as for row pieces for blocks as explained above. In addition, multiple column entries are allowed in the symbol table.

In an embodiment, compression of prefix, fixed length columns differs from compression of other columns. The difference occurs because the lengths are removed from these columns. The following can be performed for compression of prefix fixed length columns by using stop bytes Bi. The first byte B0 of a row piece data is an index into the symbol table, if B0<SHORT_INDEX. Otherwise, (B0−SHORT_INDEX) is the number of in-place stored (i.e. not compressed) fixed length columns that follow. The next byte B1 either directly follows B0, or directly follows the data for pre-ceding (B0−SHORT_INDEX) columns correspondingly. This definition continues recursively while the column(s) that follow Bk are still fixed length.

Compressor

In an embodiment, at least two different approaches to compression are available. Online compression will form compressed blocks incrementally. Offline compression buffers sufficient number of rows into buffers first, and then places as many rows as practicable into a compressed block. Online compression is attractive because it does not have to maintain additional buffers or perform additional memcopy operations. However, under certain circumstances, online compression could be very inferior to offline compression in terms of compression quality. For example, forming blocks incrementally could prevent complete pre-analysis of columns before processing, which could negatively impact the ability to efficiently perform block-level column reordering. Trying to work-around these limitations by performing block reorganizations (re-compressions) after a large portion of the block has already been formed could be excessively expensive.

The following description is with respect to offline compression, in which a bulk set of rows are processed to format one or more full data blocks. Each data column can be described as a pointer to its data in a buffer, e.g., in a source table's data blocks.

The present embodiment of the compressor is described using the following

Terms:
  SingleEntry (SE) is a representation of a column that has a pointer to data, data length and a few reference counts.
  RowModel (RM) is a representation of a row as an array of pointers to SE and a count of SE (column count).
  RowSetModel (RSM) is a representation of a set of rows as an array of pointers to RM and row count.

RSM Construction

As the Compressor module buffers rows for offline compression, it builds an RSM for the set of rows. Each row column is looked up in a hash table, and if not present, a new SE is allocated for the column, otherwise a pointer to an existing SE is used. Dynamic memory managers can be used to reduce fragmentation and memory allocation overheads. In one embodiment, the memory managers are for per-block temporary allocations that persist only for compression of a single block and per-segment memory that persists for the duration of segment compression.

RSM represents a set of rows as a matrix of SE pointers, where equal columns point to the same SEs. Each SE is a candidate to become a single column symbol table entry. Once the RSM is built, the symbol table can be generated consisting of single column entries based on SE reference counts. For some data sets, this will provide efficient compression as repeated SEs will be encoded through small byte indexes into the symbol table. To achieve higher compression, column sequences can be replaced with indexes into the symbol table and create multiple-column symbol table entries.

MultiEntry (ME) is a representation of a mutiple-column symbol table entry candidate. It is described using a (row, column) pair of its first column, column count a few more fields. In the present embodiment, the act of compression is related to the act of identifying a set of useful MEs for a given RSM.

Several steps can be taken to perform block-level column reordering computation. In a first step (Step (A)), an empirical rule can be used to compute block-level column reordering: order columns by (column cardinality, column length cardinality). The compressor determines block-level column reordering once per RSM using this rule. In one embodiment, the following two columns c1 and c2 are considered either equal c1≡c2 by this ordering rule, or column c1 can alternatively be considered more acceptable than c2:

1 1
1 2

1 1
1 2
1 1
1 2
1 1
1 2
1 1
1 2
1 1
2 2

Once step (A) is done, dictionary build-up can be performed (step (C)). This step involves identifying {ME} for RSM. An RSM can be thought of as a text over an alphabet consisting of pointers to SEs. For 8 k blocks in an embodiment, the lengths of the text are approximately within 5000-10000 symbols (200-400 rows 25 columns each) and the number of distinct symbols per block is approximately within 700-900. The problem of identifying {ME} can therefore be thought of as a substitutional compression problem over an integer alphabet with alphabet size about 3 times larger than regular 1-byte alphabet (256·3 2 [700, 900]).

In an embodiment, the Compressor uses an extra step (B) between steps (A) and (C), and is also referred to herein as the "Prefix Detection" step. This step captures distinctive properties of the data set being compressed, e.g., the property of the data set including a set of rows. A distinctive property of the data set is that it is a set of rows, where columns are ordered by column cardinality in step (A).

An N-ary digital compressed search tree can be built for the set of rows $\{r_i\}_{i=1}^n$. This search tree has exactly N leaves for N rows, a root node and several branch nodes. The tree can be described by the following tree construction procedure:

An empty tree contains a root node only.

After adding the first row $r_1$ to the tree, the tree contains root node, one leaf node and one edge connecting the root with the leaf. The edge is labeled with all symbols in $r_1$.

When adding row $r_2$ to the tree, add one leaf node.

If the first symbol in $r_2$ is the same as the first symbol in $r_1$, delete the old edge, add a new branch node to the tree, connect root with the new branch and connect new branch node with both leaves. Label the edge from the root to the new branch node with the longest common prefix of rows $r_1$ and $r_2$. Label edges connecting new branch node with leaves with suffixes of rows $r_1$ and $r_2$ correspondingly.

If the first symbol in $r_2$ is not the same as the first symbol in $r_1$, simply add a new edge from the root to the new leaf, labeling it with all symbols from $r_2$. Tree construction proceeds recursively for all rows in RSM.

Figure 13:
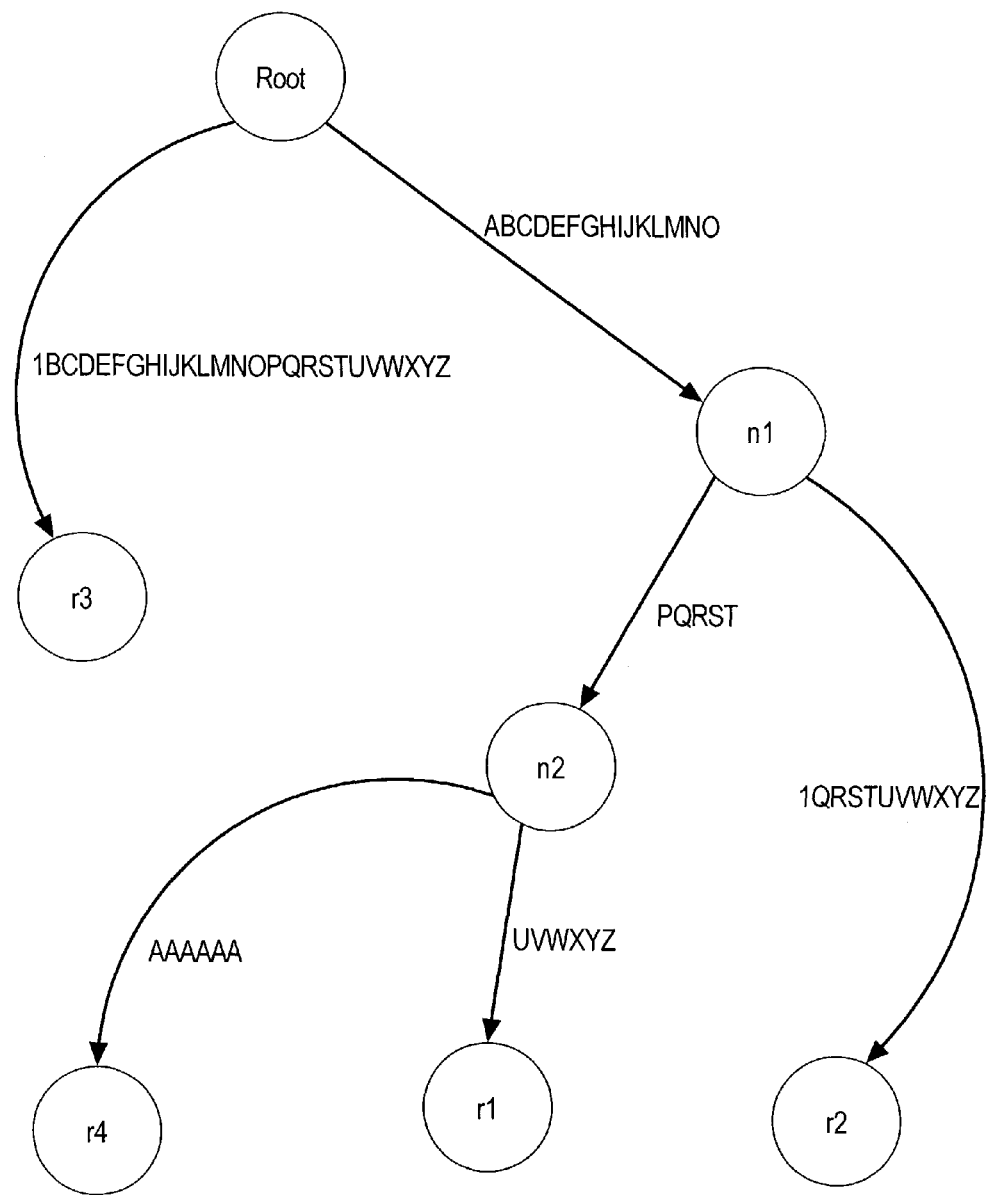
FIG. 13 shows an example search tree according an embodiment of the invention.

As an example, suppose that 4 rows are added to the tree:
ABCDEFGHIJKLMNOPQRSTUVWXYZ
ABCDEFGHIJKLMNOlQRSTUVWXYZ
BCDEFGHIJKLMNOPQRSTUVWXYZ
ABCDEFGHIJKLMNOPQRSTAAAAAA The tree will have two edges coming from the root node, one of them connecting root with leaf node for r3 and labeled with all symbols in r3, the other edge connecting root with branch node, edge labeled with symbols
ABCDEFGHIJKLMNO
The two edges coming out of this branch node will be labeled with
1QRSTUVWXYZ
and
PQRST
correspondingly. The first edge will connect the branch with leaf for row r2, the second edge will connect the branch with another branch. Finally that another branch will have two edges connecting it with leaves for r1 and r4, labeled
UVWXYZ
and
AAAAAA
correspondingly. FIG. 13 shows an example illustration of this tree. The tree has certain properties:

Each branch node has at least two outgoing edges

The tree has at most 2·N nodes and 2·N edges

Catenation of edge labels from root to leaf gives the corresponding leaf's row symbols If two rows share a common prefix, then paths from the root to their leaves share common edges with cumulative length equal to the maximal common prefix length.

There is a 1-1 correspondence between branch nodes and prefixes shared by at least two rows.

If each branch node of the tree is labeled with the number of leaf nodes in the subtree rooted in this node and cumulative edge length from the root to this node, then for each branch node we can immediately tell how many rows share the prefix that ends in this node. Once the tree is built, the labeling is possible in a single tree depth-first traversal, which has O(N) complexity in the number of rows N.

Once the tree is built and labeled, proceed with the prefix detection. Prefix detection is based on a simple recursive procedure. Consider the following example for 20 rows:
ABCDEFGHIJKLMNOPac
ABCDEFGHIJKLMNOPad
ABCDEFGHIJKLMNOPae
ABCDEFGHIJKLMNOPaf
ABCDEFGHIJKLMNOPag
ABCDEFGHIJKLMNOPah
ABCDEFGHIJKLMNOPai
ABCDEFGHIJKLMNOPaj
ABCDEFGHIJKLMNOPak
ABCDEFGHIJKLMNOPal
ABCDEFGHIJKLMNOPbm
ABCDEFGHIJKLMNOPbn
ABCDEFGHIJKLMNOPbo
ABCDEFGHIJKLMNOPbp
ABCDEFGHIJKLMNOPbq
ABCDEFGHIJKLMNOPbr
ABCDEFGHIJKLMNOPbs
ABCDEFGHIJKLMNOPbt
ABCDEFGHIJKLMNOPbu
ABCDEFGHIJKLMNOPbv the tree will have root node no with one edge ($n_0$, $n_1$) coming out of it, labeled with
ABCDEFGHIJKLMNOP
node $n_1$ will have two edges ($n_1$, $n_2$) and ($n_1$, $n_3$) coming out of it, edge ($n_1$, $n_2$) labeled with
a
and edge ($n_1$, $n_3$) labeled with
b Nodes $n_2$ and $n_3$ will be labeled with leaf node counts of 10 and their distance from root is 17. Node n1 will be labeled with leaf node count of 20 and distance from root of 16.

For this example, the following choices can be presented in construction of {ME}
Choice 1: {ME}=0 (no MEs in the symbol table)
Choice 2: {ME}={{ABCDEFGHIJKLMNOP}} (one ME)
Choice 3: {ME}={{ABCDEFGHIJKLMNOPa}, {ABCDEFGHIJKLMNOPb}} (two MEs)
Choice 4: {ME}={{ABCDEFGHIJKLMNOP}, {#0a}, {#0b}} (three MEs)

Another tree traversal is performed to help to choose {ME}. The algorithm has a common step. At each step, one branch node is a current node. The common step consists of choosing from the following alternatives:

Alternative 1: Do note create additional MEs for which the current node is a proper prefix.

Alternative 2: Create additional MEs for which the current node is a proper prefix; replicate the prefix that ends in the current node into these MEs.

Alternative 3: Create additional MEs for which the current node is a proper prefix; factor the prefix that ends in the current node into a separate ME and make additional MEs point to it.

Note that for the above 20-row example,

Choice 1: Is given by Alternative 1 when the current node is no;

Choice 2: Is given by Alternative 2 when the current node is no and Alternative 1 when the current node is $n_1$ Choice 3: Is given by Alternative 2 when the current node is no and Alternative 2 when the current node is $n_1$ Choice 4: Is given by Alternative 2 when the current node is no and Alternative 3 when the current node is $n_1$ Therefore, the Prefix Detection algorithm traverses the tree, chooses from the above mentioned 3 alternatives at the current branch nodes by considering
labels in the current node;
labels in all adjacent nodes in the current node's subtree
non-zero cost of creating new symbol table entries
and then proceeds into the subtrees. When this tree traversal reaches a leaf node, it "knows" if any prefix of the corresponding row compresses or not, and, if it compresses, which ME it compresses with. Thus, in one approach, the Prefix Detection finds all prefix MEs from optimal set of {ME} for a given block; or finds no MEs if the optimal set is empty or does not include any prefix MEs.

In an embodiment, the compressor operates by first loading a standard data block and an RSM for it parallel. After that, the compressor compresses the RSM by trying to create a new compressed block. If rows from the standard block do not fit into a new compressed block (i.e. no compression), the compressor writes a standard block and proceeds onto the next set of rows. Otherwise, an estimate is made of compression gain by comparing free space in the standard block to free space in the compressed block. If there is no or minimal compression gain, then the standard block is written and the compressor proceeds onto the next set of rows. Otherwise, if the compression gain is substantial, then estimate the number of rows that will fit into the block through interpolation and switch into buffering mode. In the buffering mode, build RSM without loading any data into blocks. Once the estimated number of rows has been buffered into RSM, try to compress the RSM again. Three possible outcomes are:

RSM does not fit into a single compressed block.

RSM fits into a single compressed block and free space wastage is minimal.

RSM fits into a single compressed block and there is still free space to load more rows.

In the first case, start reducing the number of rows in RSM that the compressor tries to load into a single block by repeatedly bisecting [known2fit, known2notfit] interval with the start condition known2fit=number of rows in uncompressed block, known2notfit=number of rows that we estimated but that did not fit. In the second case write a compressed block and proceed to the next set of rows. In the third case, make a new estimation for the number of rows and continue buffering the RSM.

Each individual block compression involves executing step (A), step (B), substituting detected prefix in RSM and feeding the resulting RSM to step (C).

Decompressor

The present invention allows very fast, low overhead decompression of compressed data. In an embodiment, column values/lengths are readily available in the block. Therefore, the decompression process is a matter of locating these values by interpreting block header bits, fixed column and column permutation arrays if present, and first length bytes in the row and symbol table entries this row references. These referenced data values can be returned without performing any costly decompression or reconstruction algorithms.

XII. GROUP PRUNING

Described herein is a system for rewriting queries so that they may be executed more efficiently. Specifically, queries that include an outer query that references the result set of an aggregate query are rewritten so that the set of groupings specified by the aggregate query omit groupings that only produce rows than can never satisfy the predicates of the outer query. Thus, when the inner query is computed, only rows for groupings that might possibly satisfy the criteria of the outer query are generated, conserving resources that would otherwise be wasted generating rows that could not possibly satisfy the criteria.

The term "group pruning" refers to a process of rewriting queries to reduce the number of groupings generated by them.

The term "qualify" refers to determining that it is logically possible for the rows of a grouping to satisfy a set of criteria. Whether any rows generated for a grouping actually satisfy the criteria depends on the values in the rows for the grouping and of course the predicates on group-by columns.

The term "disqualify" refers to determining that it is logically impossible for rows generated for a grouping to satisfy a set of criteria.

Techniques for group pruning are illustrated using the following query SQ. The query SQ is composed of an outer query SO and inner query SI, which is an aggregate query. Query SO references the result set of query SI. The result set of inner query SI is assigned the alias V as shown below.

```
select D1L2,D1L3,D1L4,D2L2,D2L3, sum_s from
    (select D1L1, D1L2, D1L3, D1L4,D2L1, D2L2, D2L3, sum(s)
        sum_s,
            grouping(D1L1) as gD1L1,
            grouping(D1L2) as gD1L2,
            grouping(D1L3) as gD1L3,
            grouping(D2L4) as gD1L4,
            grouping(D1L1) as gD2L1,
            grouping(D1L2) as gD2L2,
            grouping(D1L3) as gD2L3
    from t
        group by rollup(D1L1,D1L2,D1L3,D1L4),
        rollup(D2L1,D2L2,D2L3)) V
    where
        ((D1L2=v0 and gD1L3=0) or (D1L3 in (v1,v2,v3))) and
        ((D2L2=v4 and D2L3=v5) or (D2L2=v6 and D2L3=v7))
```

Figure 14:
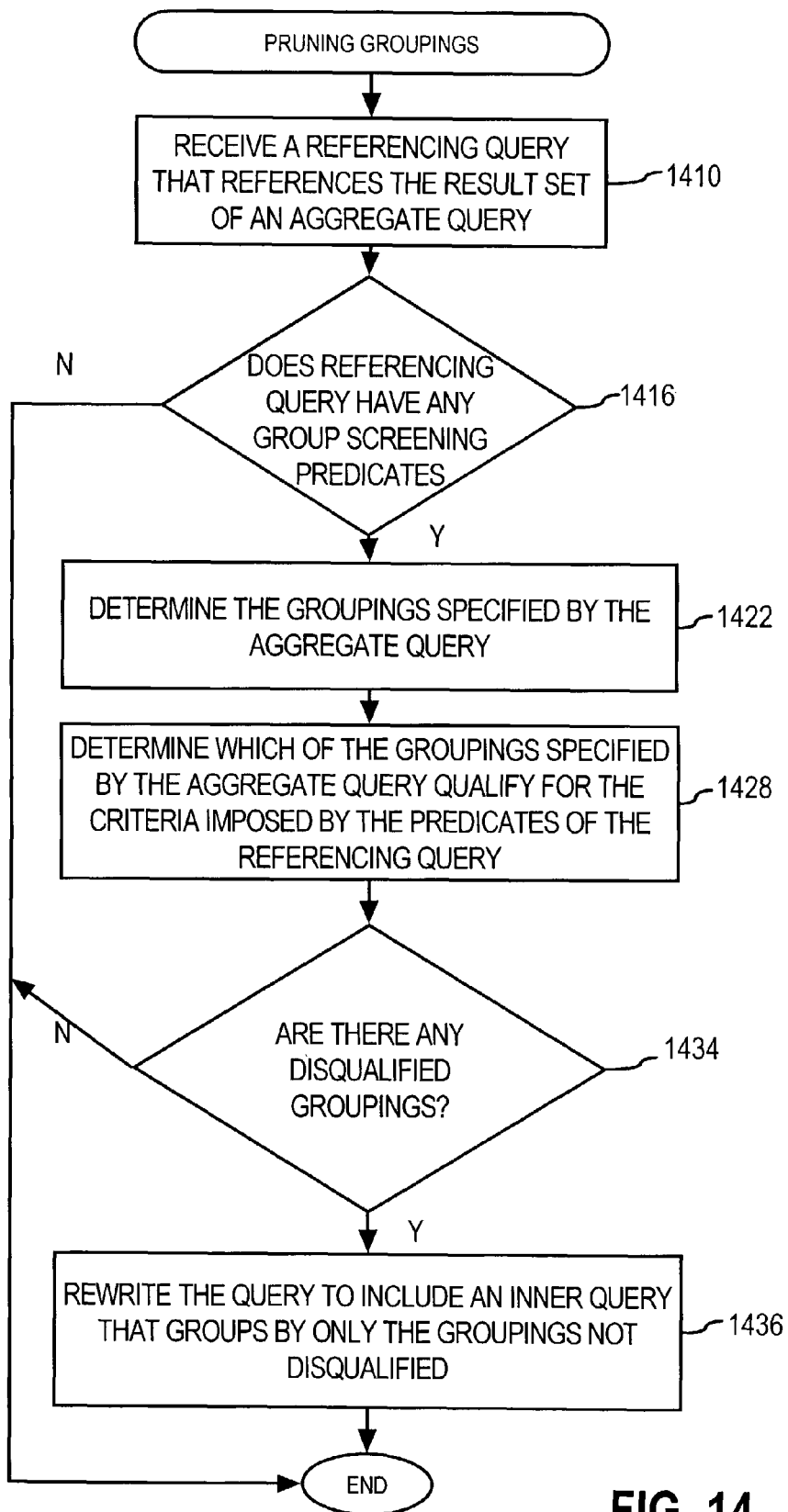
FIG. 14 is a flowchart showing an overview of a group pruning process.

FIG. 14 is a flowchart providing an overview of processes described herein for group pruning.

At step 1410, a query that references the result set of an aggregate query is received. A query that references the result set of an aggregate is referred to as the referencing query. For example, outer query SO is a referencing query because outer query SO explicitly references the result set of query SI, an aggregate query SI.

At step 1416, it is determined whether the referencing query has any group screening predicates. A group screening predicate is one which may possibly disqualify a grouping. Group screening predicates have a variety forms. One form imposes conditions on a group-by column. The predicate "D1L2=v0" in query SO illustrates such a predicate.

Group screening predicates may also impose conditions based on grouping functions. A grouping function indicates whether a particular row represents a grouping based on a particular group-by column. The function grouping (D1L1) (whose alias is gD1L1) indicates whether a row is for a grouping that includes column D1L1. The grouping (D1L1) evaluates to 0 if the row is for a grouping that includes column D1L1.

If it is determined that the query does not contain group screening predicates, then execution of the steps ends. In this example, query SO contains various group screening predicates, as follows.

$D1L2=v0$ $gD1L3=0$ $D1L3$ in $(v1,v2,v3)$ $D2L2=v4$ $D2L3=v5$ $D2L2=v6$ $D2L3=v7$

At step 1422, it is determined what groupings are specified by the aggregate query. This is determined by examining the group-by clauses of the aggregate query to determine what group-by columns are specified. In this example, the group-by clause of inner query SI includes as arguments the extended functions rollup(D1L1,D1L2,D1L3,D1L4) and rollup(D2L1,D2L2,D2L3). The rollup function is used to specify groupings that aggregate information at each level of the hierarchy of columns specified by the arguments in the rollup function. For example, rollup (D2L1, D2L1, D2L3, D2L4) specifies the following groupings:

$D2L1,D2L1,D2L3,D2L4$ $D2L1,D2L1,D2L3$ $D2L1,D2L1$ $D2L1$ ( )

The group-by clause in SI includes two rollup functions. Therefore, the complete set of groupings specified by the group-by clause is the Cartesian product between the groupings specified by each of the two rollup functions.

FIG. 15 is a diagram showing a table 1510, which depicts all the groupings specified by query SI. Columns 1502-1 through 1502-9 each correspond to a group-by column in the result set of SI. Each of rows 1501 in table 1510 corresponds to a particular grouping 1501-1 through 1501-20. For a particular grouping represented by a row in table 1510, the group-by columns present in the grouping are denoted by including an "X" in the cell of the row that belongs to those columns. For example, the row for grouping 1501-10 includes Xs in the cells in columns 1502-1, 1502-etc. because it represents the grouping (D1L1, D1L2, D2L1, D2L2).

At step 1428, it is determined which of the groupings specified by the aggregate query qualify for the filtering criteria imposed by the referencing query. The determination is made by performing a process that determines which groupings are disqualified or qualified. Such a process is referred to as a pruning selection process. A variety of pruning selection processes shall be later described.

At step 1434, it is determined whether there are any disqualified groupings. If there are no disqualified groupings, then execution of the steps ends. Otherwise execution of the steps proceeds to step 1436.

At step 1436, the referencing query is rewritten to produce an outer query that references an inner query that specifies only those groupings that have been qualified at step 1434. A rewrite of query E4 (reproduced below) is provided to illustrate how a query is rewritten.

```
select v_cube.a, v_cube.b, sum(v_cube.sum_m) sum_v_m
    from
        (select a, b, sum(m) sum_m
         from t
         group by cube (a,b)
        ) v_cube
    where v_cube.a = 10 and v_cube.b = 20;
```

In query E4, the inner query is an aggregate query that specifies the groupings (a, b), (a), (b), and ( ). The groupings disqualified by the outer query in query E4 are (a), (b), ( ). A query E4 is rewritten to produce a query E5 by rewriting the inner query as follows.

```
select v_cube.a, v_cube.b, sum(v_cube.sum_m) sum_v_
    from
        (select a, b, sum(m) sum_m
         from t
         group by a,b
        ) v_cube
    where v_cube.a = 10 and v_cube.b = 20;
```

Disjunctive Normal Form

Figure 16:
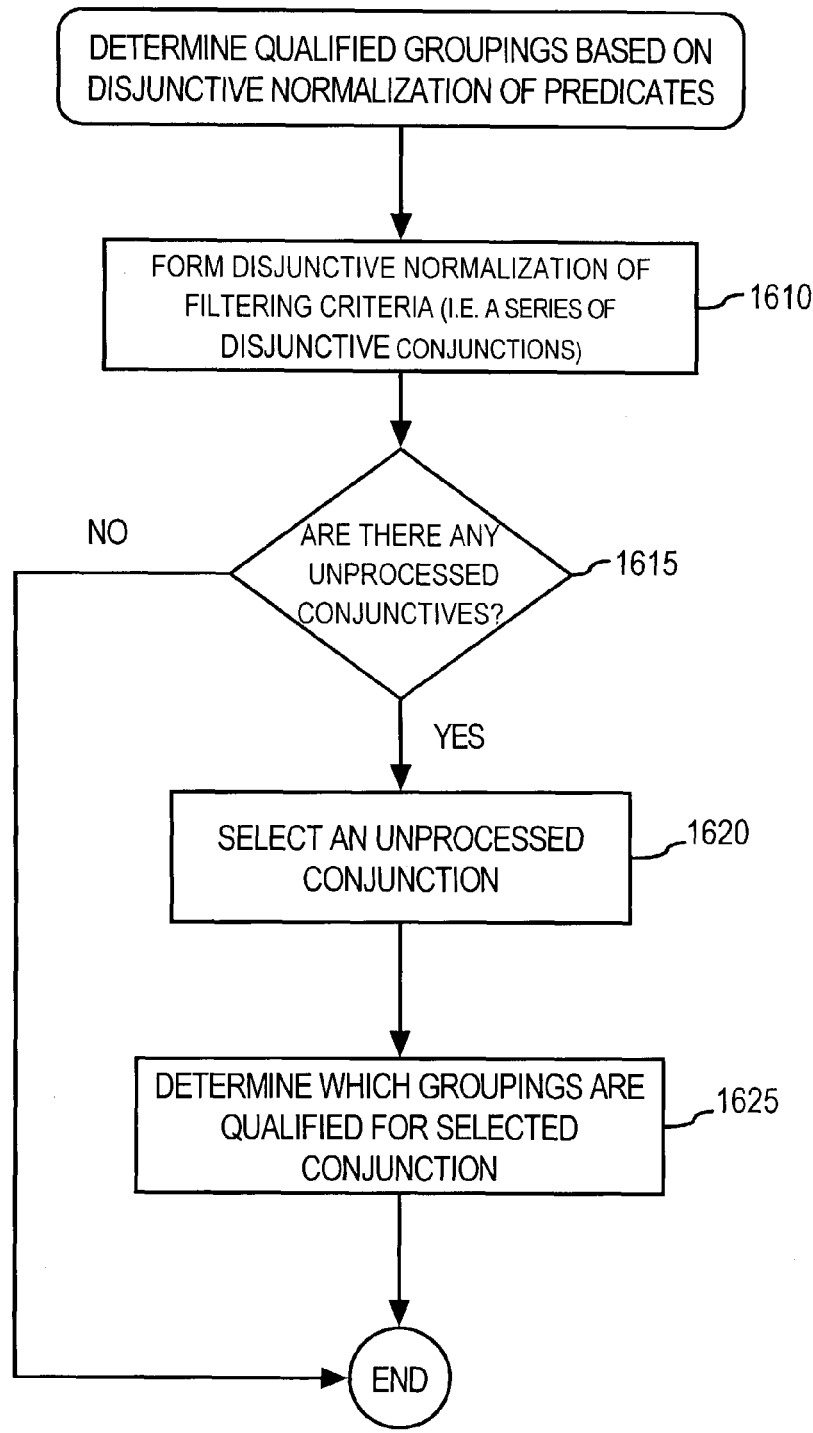
FIG. 16 is a flow chart depicting a pruning selection process based on generating the disjunctive normal form of filtering criteria.

FIG. 16 shows a group pruning selection process according to an embodiment of the present invention. The process is based on forming an expression that is a disjunctive normalization of the filtering criteria in the referencing query. Disjunctive normalization of a boolean AND/OR/NOT expression is well known to those skilled in the art. When the process is initiated, it is assumed that all groupings are disqualified. The disjunctive normalization is examined to determine which groupings are qualified.

Referring to FIG. 16, at step 1610, a disjunctive normalization of the filtering criteria of the referencing query is formed. Specifically, the filtering criteria is normalized into a disjunctive normal form by converting the predicate expressions into a series of expressions joined by disjunctive operators, where each expression in the series is a conjunction, that is, one or more predicates joined by conjunctive operators. The disjunctive normal form of the predicates in SO are as follows:

($D1L2=v0$ and $gD1L3=0$ and $D2L2=v4$ and $D2L3=v5$) or ($D1L2=v0$ and $gD1L3=0$ and $D2L2=v6$ and $D2L3=v7$) or (D1L3 in (v1,v2,v3) and D2L2=v4 and D2L3=v5) or (D1L3 in (v1,v2,v3) and D2L2=v6 and D2L3=v7)

Steps 1615 through 1625 form a loop which iteratively processes conjunctions in the disjunctive normalization. At step 1615, it is determined whether there are any unprocessed conjunctions. If there are none, then execution of the steps ends. Otherwise, execution of the steps flows to steps 1620, where an unprocessed conjunction is selected.

At step 1625, it is determined which groupings are qualified by the selected conjunction. For the purposes of pruning groupings, once a grouping has been determined to be qualified, it is thereafter treated as qualified. If a grouping is not selected in any iteration of the loop, it is treated as disqualified.

In this example, in the first iteration of the loop, the following conjunction is selected.

(D1L2=v0 and gD1L3=0 and D2L2=v4 and D2L3=v5)

At step 1620, the groupings are examined to determine which are qualified for the selected conjunction. The predicate gD1L3=0 requires the presence of D1L3 in a grouping. Only groups 1501-1 through 1501-8 are qualified for the predicate.

The predicate D2L2=v4 requires the presence of D2L2 in a grouping. Thus, of the groups 1501-1 through 1501-8, only groups 1501-1, 1501-2, 1501-5, and 1501-6 are qualified for the predicate.

The predicate D2L3=v5 requires the presence of D2L3 in a grouping. Thus, of groups 1501-1, 1501-2, 1501-5, and 1501-6, only the groups 1501-1 and 1501-5 are qualified for the predicate. Therefore, groups 1501-1 and 1501-5 are selected as qualified in this iteration of step 1625.

After iterating through all the conjunctions, only groups 1501-1 and 1501-5 have been selected as qualified. These groupings are denoted below.

(D1L1,D1L2,D1L3,D2L1,D2L2,D2L3), (D1L1,D1L2,D1L3,D1L4,D2L1,D2L2,D2L3)

Groupings 1501-1 and 1501-5 are treated as qualified and the remaining groupings 1501 are not qualified for purposes of rewriting query SI. Referring to FIG. 14, at step 1434, it is determined that groupings have been qualified. Therefore, at step 1436, the referencing query is rewritten by modifying the group-by clause of SI to form query SQRW, shown below.

```
select D1L2,D1L3,D1L4,D2L2,D2L3, sum_s from
        (select  D1L1, D1L2, D1L3, D1L4,D2L1, D2L2, D2L3,
           sum(s) sum_s,
    grouping(D1L1) as gD1L1,
    grouping(D1L2) as gD1L2,
    grouping(D1L3) as gD1L3,
    grouping(D2L4) as gD1L4,
    grouping(D1L1) as gD2L1,
    grouping(D1L2) as gD2L2,
    grouping(D1L3) as gD2L3
    from t
        group by grouping set
        (
            (D1L1,D1L2,D1L3,D2L1,D2L2,D2L3),
            (D1L1,D1L2,D1L3,D1L4,D2L1,D2L2,D2L3)
        )
```

Qualifying Patterns

Another group pruning selection process involves generating qualifying patterns that describe qualifying groupings. These patterns may be logically represented as bitmaps with ternary bits. Each bit position in the bitmap corresponds to a group-by column of an aggregate query. The value in a bit position specifies whether the corresponding group-by column must be present in a qualifying grouping, must not be present, or may or may not be present. The following grouping GA, and qualifying patterns GB1 and GB2 are provided as an illustration.

GA=(a,b,c)

GB1=1X0

GB2=1X1

For GB1, the first bit pattern specifies that column a should be present, as indicated by value 1, the second bit that b may or may not be present, as indicated by value x, and the third that c should not be present, as indicated by value 0. GA includes a, b, c. Because c is included, GA does not qualify for GB1.

For GB2, the first bit specifies that column a should be present, the second bit that b may or may not be present, and the third that c should be present. GA includes a, b, c, and therefore qualifies for GB2.

A qualifying pattern may also be represented as a pair of bitmaps with binary bits. A pair of bits at the same position in the bitmaps may have the following values: 1/1, 0/1, and 0/0. 1/1 denotes that the corresponding column must be present in the qualifying grouping; 0/1 specifies that the corresponding column should not be present; 0/0 specifies that the corresponding column may or may not be present. The following pair of bitmaps GB3 and GB4 are equivalent to GB1 as representations of qualifying patterns.

GB1=1X0

GB3=100

GB4=110

Generating Qualifying Patterns

Figure 17:
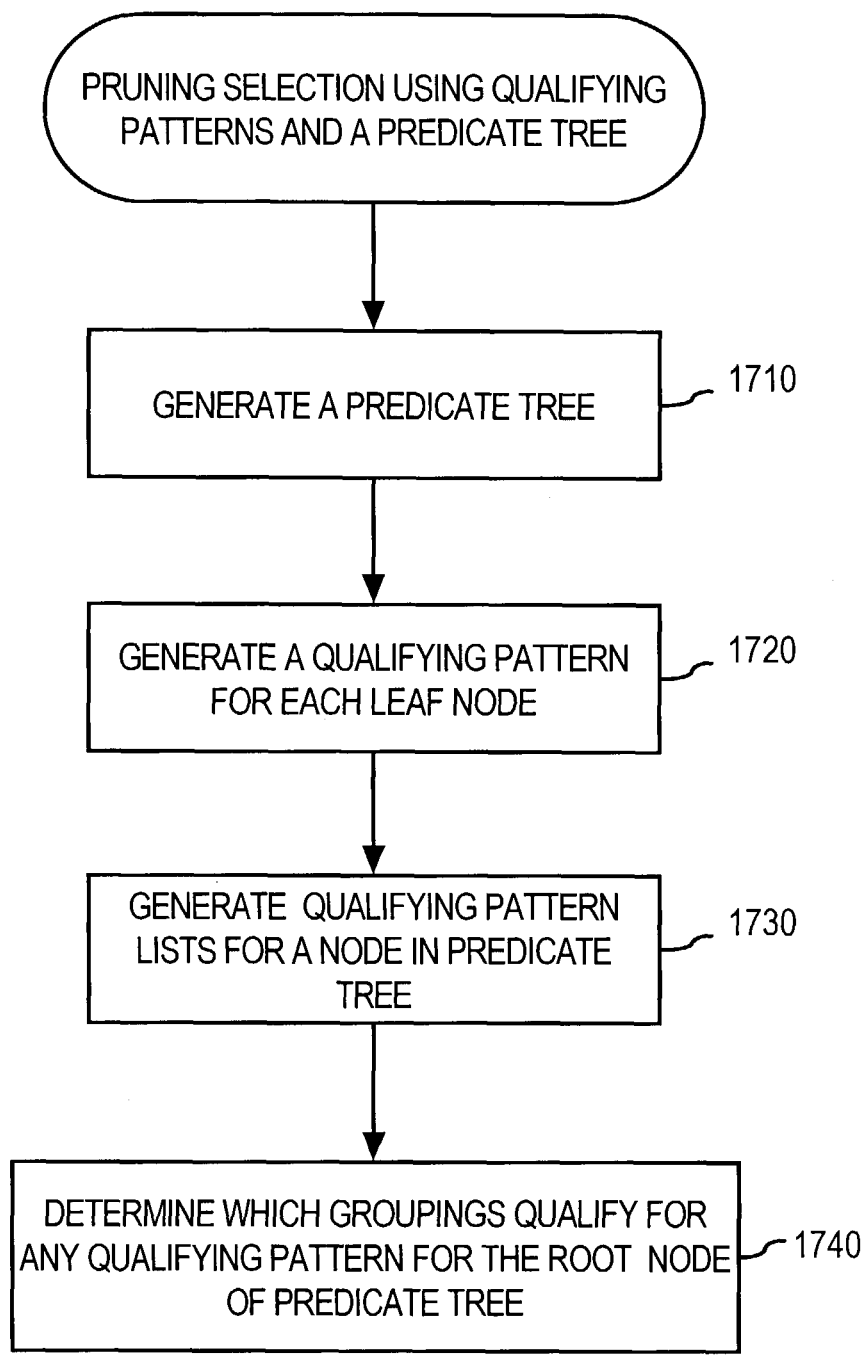
FIG. 17 is a flow chart depicting a pruning selection process based on generating a predicate tree of the filtering criteria.

FIG. 17 is a flowchart showing a process for generating patterns that describe groupings qualified by the filtering criteria of a referencing query. The patterns are computed by generating a predicate tree based on the filtering criteria and generating qualifying patterns for each predicate in the tree. The predicate tree and the qualifying patterns are examined to derive a list of qualifying patterns that describe all qualifying groups for the filtering criteria.

The process depicted in FIG. 17 is illustrated using the following query QPQ shown below.

```
select a, b, c, d, sum_m
    from (
        select a,b,c,d,
            grouping(a) ga, grouping(b) gb,
            grouping(c) gc, grouping(d) gd,
            sum(m) sum_m
        from T
        group by grouping sets((a,b,c,d), (a,b), (a,b,d))
        ) V
    where
        (a>3) AND (b>1 OR b=0) AND (gc=1 OR
        (gc=0 AND d>0) OR (c=0
        and d<0));
```

Query QPQ yields the following groupings shown in table T1.

TABLE T1

| GROUPING |
| --- |
| (a,b,c,d) |
| (a,b,c) |
| (a,b,  d) |
| (a,  c,d) |
| (  b,c,d) |
| (a,b    ) |
| (a,  c) |
| (a,    d) |
| (  b,c) |
| (  b,  d) |
| (  c, d) |
| (a) |
| (  b) |
| (    c) |
| (      d) |
| ( ) |

Referring to FIG. 17, at step 1710, a predicate tree is generated for the filtering criteria of the referencing query. A predicate tree for the filtering criteria of a query is a node graph with leaf nodes and parent nodes. Leaf nodes have no branches extending from them, parent nodes have branches extending to child nodes. A child node may be a leaf node or another parent node. The leaf nodes of a predicate tree correspond to the predicates. The parent nodes correspond to conjunctive and disjunctive operators of conjunctive and disjunctive expressions in the filtering criteria. The predicate tree generated for the current example is shown in FIG. 18.

FIG. 18 is a graph that shows predicate tree 1801 for the filtering criteria of query QPQ. Predicate tree 1801 includes leaf nodes 1821, 1822, 1823, 1824, 1825, 1826, 1827, and 1828, each of which corresponds to a predicate in the filtering criteria as denoted in FIG. 18. For example, leaf node 1822 corresponds to the predicate b>1 and leaf node 1823 to b=0.

Parent nodes 1811, 1812, 1813, 1814, and 1815 correspond to disjunctive and conjunctive operators between disjunctive and conjunctive expressions in the filtering criteria. Node 1812 corresponds to the OR operator for the predicate expression (b>1 OR b=1). The node at the root of a predicate tree is referred to as the root node. Thus, node 1811 is the root node for predicate tree 1801.

At step 1720, a qualifying pattern is generated for each leaf node in the predicate tree. The qualifying pattern generated for a leaf node describes the groupings that qualify for the predicate of the leaf node. The pattern generated for each of the leaf nodes is shown in FIG. 18. For example, the qualifying pattern generated for leaf node 1821 is 1xxx, and for leaf node 1825 is xx1x.

At step 1730, a qualifying pattern list is generated for each of the parent nodes. The list describes the groupings that would be qualified by the expression formed by the operator that corresponds to the leaf node.

The qualifying patterns for the parent nodes are created recursively, beginning with the root node. If a parent node corresponds to an OR operator, then the qualifying pattern is simply the list of non-redundant qualifying patterns of child nodes. If the node corresponds to the AND operator, then the list of qualifying patterns are those that satisfy all the qualifying patterns of the child nodes. If the qualifying pattern list of a child node has not been created, then it is generated before creating the list for the parent node. At the end of this step, the qualifying pattern list created for the root node defines the groupings that are qualified by the filtering criteria.

In this example, the qualifying pattern list is formed according to the description in the following Table T2. Each entry in Table T2 corresponds to a parent node in predicate tree 1801. For a particular parent node, the first column in Table T2 lists the parent node's child nodes and their qualifying patterns. The second column describes how the qualifying pattern is generated for the parent node. The qualifying pattern list generated for each of the parent nodes is shown in FIG. 18. For example, the grouping pattern list for parent node 513 is xx0x,

TABLE T2

| | |
| --- | --- |
| Parent Node 1812, has child nodes: | Qualifying pattern list is simply all the non-redundant qualifying patterns of the child, i.e. |
| Node 1822 (xx1x) | |
| | (x1xx) OR (x1xx) => (x1xx) |
| Node 1823 (xx1x) | |
| Parent Node 1814, has child nodes: | Qualifying patterns list are those do not conflict with the patterns of all the child nodes, i.e. |
| Node 1825 (xx1x) | |
| | xx1x AND xxx1 => (xx11) |
| Node 1826 (xxx1) | |
| Parent Node 1815, has child nodes: | xx1x AND xxx1 => (xx11) |
| Node 1827 (xx1x) | |
| Node 1838 (xxx1) | |
| Parent Node 1813, has child nodes: | (xx0x) OR (xx11) OR (xx11) => xx0x OR xx11 |
| Node 1824 (xx0x) | |
| Node 1814 (xx11) | |
| Node 1815 (xx11) | |
| Root Node 1811 has child nodes: | (1xxx) AND (x1xx) AND (xx0x,xx11) => |
| Node 1821 (1xxx) | (11xx) AND (xx0x, xx11) => |
| Node 1812 (x1xx) | ((11xx AND xx0x)) OR ((11xx AND xx11) => |
| Node 1813 (xx0x,xx11) | (110x) OR (1111) => (110x,1111) |

At step 1740, it is determined which groupings specified by the aggregate query are qualified by any patterns created for the root node. In this example, the qualifying patterns for root node 1811 are (110x, 1111). Among the 16 groupings specified by query QPQ, only three are qualified by (110x, 1111). Specifically, (a, b) and (a,b,d) are qualified by (110x), and (a,b,c,d) is qualified by (1111).

At step 1436, query QPQ is rewritten to QPQRW, as follows.

```
select a, b, c, d, sum_m
    from (
        select a,b,c,d,
            grouping(a) ga, grouping(b) gb,
            grouping(c) gc, grouping(d) gd,
            sum(m) sum_m
        from T
        group by grouping sets((a,b,c,d), (a,b),
            (a,b,d))
        ) V
    where
            (a>3) AND (b>1 OR b=0) AND (gc=1 OR
            (gc=0 AND d>0) OR
    (c=0 and d<0)
```

VIII. IMPLEMENTATION MECHANISMS

The approach for OLAP operations and access structures for data stored in an RDB described herein may be implemented in a variety of ways and the invention is not limited to any particular implementation. The approach may be integrated into a system or a device, or may be implemented as a stand-alone mechanism. Furthermore, the approach may be implemented in computer software, hardware, or a combination thereof.

Figure 2:
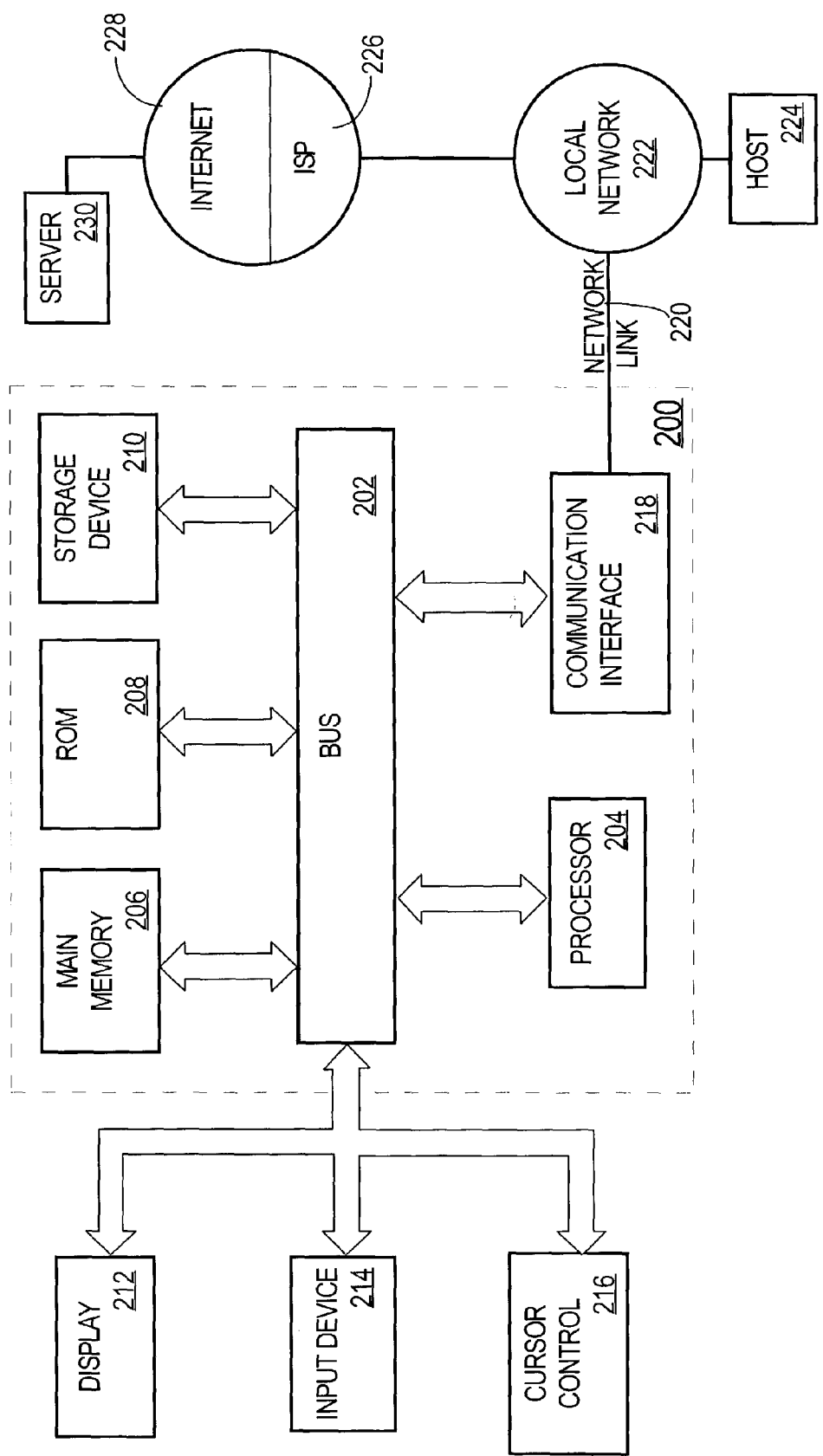
FIG. 2 is a block diagram that illustrates a computer system 200 upon which an embodiment of the invention may be implemented.

FIG. 2 is a block diagram that illustrates a computer system 200 upon which an embodiment of the invention may be implemented. Computer system 200 includes a bus 202 or other communication mechanism for communicating information, and a processor 204 coupled with bus 202 for processing information. Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Computer system 200 further includes a read only memory (ROM) 208 or other static storage device coupled to bus 202 for storing static information and instructions for processor 204. A storage device 210, such as a magnetic disk or optical disk, is provided and coupled to bus 202 for storing information and instructions.

Computer system 200 may be coupled via bus 202 to a display 212, such as a cathode ray tube (CRT), for displaying information to a computer user. An input device 214, including alphanumeric and other keys, is coupled to bus 202 for communicating information and command selections to processor 204. Another type of user input device is cursor control 216, such as a mouse, a trackball, or cursor direction keys for communicating direction information and command selections to processor 204 and for controlling cursor movement on display 212. This input device typically has two degrees of freedom in two axes, a first axis (e.g., x) and a second axis (e.g., y), that allows the device to specify positions in a plane.

Embodiments of the invention are related to the use of computer system 200 for the techniques described herein. According to one embodiment of the invention, those techniques are performed by computer system 200 in response to processor 204 executing one or more sequences of one or more instructions contained in main memory 206. Such instructions may be read into main memory 206 from another computer-readable medium, such as storage device 210. Execution of the sequences of instructions contained in main memory 206 causes processor 204 to perform the process steps described herein. One or more processors in a multi-processing arrangement may also be employed to execute the sequences of instructions contained in main memory 206. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 204 for execution. Such a medium may take many forms, including but not limited to, non-volatile media, volatile media, and transmission media. Non-volatile media includes, for example, optical or magnetic disks, such as storage device 210. Volatile media includes dynamic memory, such as main memory 206. Transmission media includes coaxial cables, copper wire and fiber optics, including the wires that comprise bus 202. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 204 for execution. For example, the instructions may initially be carried on a magnetic disk of a remote computer. The remote computer can load the instructions into its dynamic memory and send the instructions over a telephone line using a modem. A modem local to computer system 200 can receive the data on the telephone line and use an infrared transmitter to convert the data to an infrared signal. An infrared detector coupled to bus 202 can receive the data carried in the infrared signal and place the data on bus 202. Bus 202 carries the data to main memory 206, from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to a local network 222. For example, communication interface 218 may be an integrated services digital network (ISDN) card or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the worldwide packet data communication network now commonly referred to as the "Internet" 228. Local network 222 and Internet 228 both use electrical, electromagnetic or optical signals that carry digital data streams. The signals through the various networks and the signals on network link 220 and through communication interface 218, which carry the digital data to and from computer system 200, are exemplary forms of carrier waves transporting the information.

Computer system 200 can send messages and receive data, including program code, through the network(s), network link 220 and communication interface 218. In the Internet example, a server 230 might transmit a requested code for an application program through Internet 228, ISP 226, local network 222 and communication interface 218.

The received code may be executed by processor 204 as it is received, and/or stored in storage device 210, or other non-volatile storage for later execution. In this manner, computer system 200 may obtain application code in the form of a carrier wave.

IX. EXTENSIONS AND ALTERNATIVES

In the foregoing and following description, the invention is described with reference to specific embodiments thereof. It will, however, be evident that various modifications and changes may be made thereto without departing from the broader spirit and scope of the invention. Thus, the description and drawings are, accordingly, to be regarded in an illustrative rather than a restrictive sense. The invention includes other contexts and applications in which the mechanisms and processes described herein are available to other mechanisms, methods, programs, and processes.

In addition, in this disclosure, certain process steps are set forth in a particular order, and alphabetic and alphanumeric labels are used to identify certain steps. Unless specifically stated in the disclosure, embodiments of the invention are not limited to any particular order of carrying out such steps. In particular, the labels are used merely for convenient identification of steps, and are not intended to imply, specify or require a particular order of carrying out such steps.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A computer-implemented method comprising:
    storing multidimensional data in a relational database, wherein the multidimensional data that is stored in the relational database includes a plurality of dimensions, and wherein at least one dimension of the plurality of dimensions includes a hierarchy having two or more levels of granularity;
    receiving a particular query that requests to retrieve multidimensional data from the relational database via a certain view referred to by a reference within said particular query, said particular query conforming to a database language supported by a relational database system;
    wherein a partial materialized view includes a portion of said multidimensional data aggregated at one or more particular levels of granularity of said hierarchy;
    wherein said particular query requests data aggregated at a number of levels of granularity of:
        said hierarchy, and
        another dimension different than the dimension of said hierarchy; and
    rewriting said particular query to translate said certain view into a view defined by an inner subquery that returns data aggregated at said number of levels of granularity, and
    rewriting said inner subquery; and
    wherein (1) said rewriting said particular query to translate said certain view into a view defined by an inner subquery that returns and (2) said rewriting said inner subquery both do not involve rewriting said particular query to access said partial materialized view;
    after rewriting said inner subquery, rewriting said particular query to access said partial materialized view; and
    wherein the method is performed by one or more computers.

2. The method of claim 1, wherein:
    the inner subquery references a union of branch subqueries, at least one branch subquery of said branch subqueries referencing said partial materialized view;
    and wherein rewriting said inner subquery includes rewriting a plurality of said branch subqueries.

3. The method of claim 2, wherein the method further includes rewriting said at least one branch subquery of said branch subqueries by pushing a predicate into said at least at one branch subquery.

4. The method of claim 2, wherein rewriting said inner subquery includes pruning one or more groupings declared by said inner subquery.

5. The method of claim 1, wherein the partial materialized view includes lineage for at least one level of said two or more levels.

6. The method of claim 1, wherein the partial materialized view does not include lineage for any of said two or more levels.

7. The method of claim 1, wherein the inner subquery includes a union of branch subqueries, wherein at least one of branch subquery of said branch subqueries referencing said partial materialized view, and at least one of said branch subqueries referencing another materialized view.

8. A non-transitory computer-readable storage medium storing one or more sequences of instructions, wherein execution of the one or more sequences of instructions by one or more processors causes:
    storing multidimensional data in a relational database, wherein the multidimensional data that is stored in the relational database includes a plurality of dimensions, and wherein at least one dimension of the plurality of dimensions includes a hierarchy having two or more levels of granularity;
    receiving a particular query that requests to retrieve multidimensional data from the relational database via a certain view referred to by a reference within said particular query, said particular query conforming to a database language supported by a relational database system;
    wherein a partial materialized view includes a portion of said multidimensional data aggregated at one or more particular levels of granularity of said hierarchy;
    wherein said particular query requests data aggregated at a number of levels of granularity of:
        said hierarchy, and
        another dimension different than the dimension of said hierarchy; and
    before rewriting said particular query to access said partial materialized view:
        rewriting said particular query to translate said certain view into a view defined by an inner subquery that returns data aggregated at said number of levels of granularity, and
        rewriting said inner subquery; and
    rewriting said particular query to access said partial materialized view.

9. The non-transitory computer-readable storage medium of claim 8, wherein:
    the inner subquery references a union of branch subqueries, at least one branch subquery of said branch subqueries referencing said partial materialized view; and
    wherein rewriting said inner subquery includes rewriting a plurality of said branch subqueries.

10. The non-transitory computer-readable storage medium of claim 9, wherein the one or more sequences of instructions further include instructions for rewriting said at least one branch subquery of said branch subqueries by pushing a predicate into said at least at one branch subquery.

11. The non-transitory computer-readable storage medium of claim 8, wherein rewriting said inner subquery includes pruning one or more groupings declared by said inner subquery.

12. The non-transitory computer-readable storage medium of claim 8, wherein the partial materialized view includes lineage for at least one level of said two or more levels.

13. The non-transitory computer-readable storage medium of claim 8, wherein the partial materialized view does not include lineage for any of said two or more levels.

14. A computer-implemented method comprising:
   storing multidimensional data in a relational database, wherein the multidimensional data that is stored in the relational database includes a plurality of dimensions, and
   wherein at least one dimension of the plurality of dimensions includes a hierarchy having two or more levels of granularity;
   receiving a particular query that requests to retrieve multidimensional data from the relational database via a certain view referred to by a reference within said particular query, said particular query conforming to a database language supported by a relational database system;
   wherein a partial materialized view includes a portion of said multidimensional data aggregated at one or more particular levels of granularity of said hierarchy;
   wherein said particular query requests data aggregated at a number of levels of granularity of:
   said hierarchy, and
   another dimension different than the dimension of said hierarchy; and
   rewriting said particular query to translate said certain view into a view defined by an inner subquery that returns data aggregated at said number of levels of granularity, and
   rewriting said inner subquery, wherein rewriting said inner subquery comprises performing at least one of the following transformations:
   group pruning,
   predicate pushdown,
   expansion into a union of branch queries, and elimination of one or more branches in a union of branch queries;
   wherein (1) said rewriting said particular query to translate said certain view into a view defined by an inner subquery that returns and (2) said rewriting said inner subquery both do not involve rewriting said particular query to access said partial materialized view;
   after rewriting said inner subquery, rewriting said particular query to access said partial materialized view; and
   wherein the method is performed by one or more computers.

15. A non-transitory computer-readable storage medium storing one or more sequences of instructions, wherein execution of the one or more sequences of instructions by one or more processors causes:
   storing multidimensional data in a relational database, wherein the multidimensional data that is stored in the relational database includes a plurality of dimensions, and wherein at least one dimension of the plurality of dimensions includes a hierarchy having two or more levels of granularity;
   receiving a particular query that requests to retrieve multidimensional data from the relational database via a certain view referred to by a reference within said particular query, said particular query conforming to a database language supported by a relational database system;
   wherein a partial materialized view includes a portion of said multidimensional data aggregated at one or more particular levels of granularity of said hierarchy;
   wherein said particular query requests data aggregated at a number of levels of granularity of:
   said hierarchy, and
   another dimension different than the dimension of said hierarchy; and rewriting said particular query to translate said certain view into a view defined by an inner subquery that returns data aggregated at said number of levels of granularity, and
   rewriting said inner subquery, wherein rewriting said inner subquery comprises performing at least one of the following transformations:
   group pruning,
   predicate pushdown,
   expansion into a union of branch queries, and
   elimination of one or more branches in a union of branch queries;
   wherein (1) said rewriting said particular query to translate said certain view into a view defined by an inner subquery that returns and (2) said rewriting said inner subquery both do not involve rewriting said particular query to access said partial materialized view; and
   after rewriting said inner subquery, rewriting said particular query to access said partial materialized view.

* * * * *

UNITED STATES PATENT AND TRADEMARK OFFICE
CERTIFICATE OF CORRECTION

| | | |
|---|---|---|
| PATENT NO. | : 8,868,544 B2 | Page 1 of 2 |
| APPLICATION NO. | : 10/423356 | |
| DATED | : October 21, 2014 | |
| INVENTOR(S) | : Witkowski et al. | |

It is certified that error appears in the above-identified patent and that said Letters Patent is hereby corrected as shown below:

On the Title Page

On page 2, column 2, item (56), under Other Publications, line 6, delete "Mateiralized" and insert -- Materialized --, therefor In the Specification In column 4, line 25, delete "queries" and insert -- queries. --, therefor.

In column 17, line 9, delete "prunning" and insert -- pruning --, therefor.

In column 20, line 7, delete "lineag" and insert -- lineage --, therefor.

In column 35, line 53, delete "expression" and insert -- expression: --, therefor.

In column 38, line 33, delete "expression" and insert -- expression: --, therefor.

In column 38, line 39, delete "expression" and insert -- expression: --, therefor.

In column 41, line 29, delete "millenium" and insert -- millennium --, therefor.

In column 46, line 48, delete "build" and insert -- built --, therefor.

In column 47, line 64, delete "individuals" and insert -- individual's --, therefor.

In column 48, line 31, delete "60-ies" and insert -- 60's --, therefor.

In column 49, line 59, delete "DIMIMENSION" and insert -- DIMENSION --, therefor.

Signed and Sealed this
Twenty-third Day of June, 2015

Michelle K. Lee
*Director of the United States Patent and Trademark Office*

CERTIFICATE OF CORRECTION (continued)
U.S. Pat. No. 8,868,544 B2

In column 52, line 53, delete "'year200,'" and insert -- 'year2000,' --, therefor.

In column 66, line 2, delete "memcopy" and insert -- memcpy --, therefor.

In column 76, line 10, delete "xx0x," and insert -- xx0x. --, therefor.

In the Claims

In column 82, line 25, in Claim 15, delete "defmed" and insert -- defined --, therefor.

In column 82, line 37, in Claim 15, delete "defmed" and insert -- defined --, therefor.